(12) United States Patent
Ng et al.

(10) Patent No.: US 12,508,289 B2
(45) Date of Patent: Dec. 30, 2025

(54) PROBIOTIC COMPOSITIONS FOR LONG COVID

(71) Applicant: The Chinese University of Hong Kong, Shatin (CN)

(72) Inventors: Siew Chien Ng, Hong Kong (CN); Ka Leung Francis Chan, New (CN); Qin Liu, Ma on Shan (CN)

(73) Assignee: The Chinese University of Hong Kong, Hong Kong SAR (CN)

(*) Notice: Subject to any disclaimer, the term of this patent is extended or adjusted under 35 U.S.C. 154(b) by 0 days.

(21) Appl. No.: 17/973,449

(22) Filed: Oct. 25, 2022

(65) Prior Publication Data
US 2023/0127830 A1    Apr. 27, 2023

Related U.S. Application Data

(60) Provisional application No. 63/272,608, filed on Oct. 27, 2021.

(51) Int. Cl.
| | |
|---|---|
| *A61K 35/745* | (2015.01) |
| *A61K 9/00* | (2006.01) |
| *A61K 35/741* | (2015.01) |
| *A61P 43/00* | (2006.01) |
| *C12Q 1/689* | (2018.01) |

(52) U.S. Cl.
CPC .......... *A61K 35/741* (2013.01); *A61K 9/0053* (2013.01); *A61P 43/00* (2018.01); *C12Q 1/689* (2013.01)

(58) Field of Classification Search
CPC ..... A61K 35/741; A61K 9/0053; A61P 43/00; C12Q 1/689
See application file for complete search history.

(56) References Cited

FOREIGN PATENT DOCUMENTS

| CN | 113005060 A | * | 6/2021 | ............ A23K 10/18 |
|---|---|---|---|---|
| KR | 20160049376 A | * | 5/2016 | |
| KR | 102169794 B1 | * | 10/2020 | |
| KR | 102296290 B1 | * | 9/2021 | ............... C12N 1/20 |
| WO | WO-2008053444 A2 | * | 5/2008 | ........... A61K 35/745 |
| WO | WO-2021211620 A1 | * | 10/2021 | |

OTHER PUBLICATIONS

Hilpert, Kai, and Ralf Mikut. "Is there a connection between Gut microbiome dysbiosis occurring in COVID-19 patients and post-COVID-19 symptoms?" Frontiers in Microbiology (2021): 2564 (Year: 2021).*

(Continued)

*Primary Examiner* — Louise W Humphrey
*Assistant Examiner* — Mary A Crum
(74) *Attorney, Agent, or Firm* — Kilpatrick Townsend & Stockton LLP

(57) ABSTRACT

The present invention provides for compositions and methods for treating long COVID symptoms or reducing the risk of developing such symptoms. More specifically, the present invention provides for compositions that comprises an effective amount of one or more beneficial bacterial species such as *Bifidobacterium pseudocatenulatum* and are useful for treating long COVID. Also provided are methods of using the compositions to treat long COVID.

17 Claims, 24 Drawing Sheets

(56) References Cited

OTHER PUBLICATIONS

Ouwehand, A. C. "A review of dose-responses of probiotics in human studies." Beneficial Microbes 8.2 (2017): 143-151 (Year: 2017).*

Zhou, Yaya, et al. "Linking the gut microbiota to persistent symptoms in survivors of COVID-19 after discharge." Journal of Microbiology 59.10 (2021): 941-948 (Year: 2021).*

Basholli-Salihu, M., et al. "Prebiotics as Excipients for Enhancement of Stability and Functionality of *Bifidobacterium longum* ssp. infantis with Potential Application as Symbiotics in Food and Pharmaceuticals." Die Pharmazie—An International Journal of Pharmaceutical Sciences 74.6 (2019): 326-333 (Year: 2019).*

Hilpert, Kai, and Ralf Mikut. "Is there a connection between gut microbiome dysbiosis occurring in COVID-19 patients and post-COVID-19 symptoms ?." Frontiers in Microbiology 12 (2021): 732838 (Year: 2021).*

Benítez-Páez, Alfonso, et al. "Depletion of Blautia species in the microbiota of obese children relates to intestinal inflammation and metabolic phenotype worsening." Msystems 5.2 (2020): 10-1128 (Year: 2020).*

Watanabe, S., Y. Naito, and T. Yamamoto. "Host factors that aggravate COVID-19 pneumonia." Int J Fam Med Prim Care. 2020; 1(3) 1011 (2020) (Year: 2020).*

Chen, et al., "Six-Month follow-up of gut microbiota richness in patients with COVID-19," Gut, vol. 70, pp. 222-225 (2021).

Yeoh, et al., "Gut microbiota composition reflects disease severity and dysfunctional immune responses in patients with COVID-19," Gut, vol. 70, pp. 698-706 (2021).

Zuo, et al., "Alterations in Gut Microbiota of Patients with COVID-19 During Time of Hospitalization," Gastroenterology, vol. 159, pp. 944-955 (2020).

Zuo, et al., "Depicting SARS-CoV-2 faecal viral activity in association with gut microbiota composition in patients with COVID-19," Gut, vol. 70, pp. 276-284 (2021).

* cited by examiner

● 1-month follow-up  ● 6-month follow-up  ● 9-month follow-up

PROBIOTIC COMPOSITIONS FOR LONG COVID

RELATED APPLICATIONS

This application claims priority to U.S. Provisional Patent Application No. 63/272,608, filed Oct. 27, 2021, the contents of which are hereby incorporated by reference in the entirety for all purposes.

BACKGROUND OF THE INVENTION

In recent years, viral and bacterial infection is becoming more prevalent worldwide and presents a serious public health threat. For example, the Coronavirus-2019 (COVID-19) global pandemic of a respiratory disease caused by severe acute respiratory syndrome coronavirus 2 (SARS-CoV-2) has affected over 435 million people worldwide, including nearly 6 million deaths, and is exacerbated by a lack of officially approved therapeutics as well as a lack of thoroughly tested, proven safe and effective vaccines. Several promising therapeutic agents are currently undergoing active investigation and development for prophylactic or therapeutic use in the treatment for COVID-19 to prevent or ameliorate its damaging effects to the afflicted patients, while in the meantime experimental vaccines are widely distributed to the general population.

Accordingly, there exists an urgent need for new and meaningful methods to supplement therapeutic and vaccination efforts by way of preventing or treating symptoms of long COVID or post-acute COVID syndrome (PACS) among patients who are recovering from the disease, including adults and children, to achieve reduction or elimination of long lingering clinical symptoms and their associated effects. The purpose of this study is to identify gut microbial species that can potentially provide the beneficial effects of preventing or treating PACS as well as to identify gut microbial species that can be monitored among patients suffering from active COVID to indicate individuals who are likely to develop PACS symptoms in the future, who can then be given treatment accordingly in a prophylactic manner. Direct supplementation of these beneficial gut microbial species is a potentially effective means to achieve these goals in the efforts of reducing or eliminating the long-term ill effects of infectious diseases such as COVID-19. The present invention fulfills this and other related needs by identifying beneficial gut microorganisms so as to allow formulation of new compositions and application of new methods that are effective for addressing lingering clinical symptoms among recovered COVID patients, as well as by identifying gut microorganisms that can serve as markers to indicate COVID patients who have an increased risk of developing PACS as to allow these patients to be treated prophylactically to prevent the onset of long COVID symptoms.

BRIEF SUMMARY OF THE INVENTION

The present inventors discovered in their studies the certain gut microbial species and their metabolites can help prevent and treat the symptoms of long COVID or post-acute COVID syndrome (PACS) among patients who have been diagnosed of COVID-19, including those having recovered from the disease (e.g., having had at least one negative test report for SARS-CoV2, the virus causing the infection), thus provide an important utility in facilitating patients' complete recovery from the disease and elimination of potential lingering ill effects caused by this pathogen. The microorganisms so identified now serve to provide new methods and compositions as an integral part of the COVID-19 therapy and long-term management.

In a first aspect, the present invention provides a composition that is useful for use in treating PACS in a subject comprising an effective amount of (1) one or more beneficial bacterial species selected from Table 1 and *Bifidobacterium longum, Blautia wexlerae*, and *Bifidobacterium pseudocatenulatum*; and (2) a physiologically acceptable excipient. In some embodiments, the composition further comprises one or more of beneficial bacterial species selected from Table 3. In some embodiments, the composition comprises a total of about $10^6$ to about $10^{12}$ colony-forming unit (CFU) of the beneficial bacterial species. In some embodiments, the composition comprises no detectable amount of any bacterial species in Table 4 including *Scardovia wiggsiae* and *Bacteroides xylanisolvens*. In some embodiments, the composition comprises an effective amount of one or more different beneficial bacterial species of *Bifidobacterium longum, Blautia wexlerae, Bifidobacterium pseudocatenulatum, Faecalibacterium prausnitzii*, and *Fusicatenibacter saccharivorans*. In some embodiments, the composition comprises an effective amount of one or more different butyrate-producing bacterial species of *Roseburia inulinivorans, Faecalibacterium prausnitzii*, and *Roseburia Hominis*. In some embodiments, the composition consists essentially of an effective amount of (1) one or more of the beneficial bacterial species selected from Table 1 and *Bifidobacterium longum, Blautia wexlerae*, and *Bifidobacterium pseudocatenulatum*; (2) one or more physiologically acceptable excipients. In some embodiments, the composition is formulated for oral ingestion, such as in the form of a food or beverage item. In some embodiments, the composition is formulated for direct deposit to the subject's gastrointestinal tract. Optionally, the composition may further includes one or more agents known to enhance immunity, for example, effective in suppressing an infectious agent, such as SARS-CoV-2, and reducing disease severity (e.g., ivermectin, hydroxychloroquine, Zinc, vitamin C, vitamin D, quercetin, melatonin, fluvoxamine or fluoxetine, proxalutamide, azithromycin, doxycycline, or any combination thereof).

In the second aspect, the present invention provides a method for treating or preventing PACS in a subject by administering to the subject an effective amount of the composition described above and herein. In some embodiments, the subject has already developed PACS. In some embodiments, the subject has been diagnosed of COVID but has not yet developed PACS. In some embodiments, the administering step comprises administering to the subject one composition comprising one or more of the beneficial bacterial species. In some embodiments, the administering step comprises administering to the subject two or more compositions, each comprising one or more of the beneficial bacterial species. In some embodiments, the administering step comprises oral ingestion of the composition(s), which may be prior to or with food intake, or shortly after food intake (e.g., a meal or snack). In some embodiments, the administering step comprises direct deposit to the subject's gastrointestinal tract. For example, the technique knowns as fetal microbiota transplant (FMT) is used wherein a composition made from processed suitable donor fecal material containing the desirable amount of the beneficial bacterial species may be used to introduce the bacteria into a COVID or PACS patient's gastrointestinal tract. Optionally, the method also includes administering to the subject, either in the same composition(s) containing the beneficial bacteria, may further includes one or more agents known to enhance immunity, for example, effective in suppressing an infectious agent, such as SARS-CoV-2, and reducing disease severity (e.g., ivermectin, hydroxychloroquine, Zinc, vitamin C, vitamin D, quercetin, melatonin, fluvoxamine or fluoxetine, provalutamide, azithromycin, doxycycline, or any combination thereof).

In a related aspect, the present invention provides a novel use of a composition in treating or preventing PACS in a subject. The composition comprising an effective amount of (1) one or more beneficial bacterial species selected from Table 1 and *Bifidobacterium longum, Blautia wexlerae*, and *Bifidobacterium pseudocatenulatum*; and (2) a physiologically acceptable excipient. In some embodiments, the composition further comprises one or more of beneficial bacterial species selected from Table 3. In some embodiments, the composition comprises a total of about $10^6$ to about $10^{12}$ colony-forming unit (CFU) of the beneficial bacterial species. In some embodiments, the composition comprises no detectable amount of any bacterial species in Table 4 including *Scardovia wiggsiae* and *Bacteroides xylanisolvens*. In some embodiments, the composition comprises an effective amount of one or more different beneficial bacterial species of *Bifidobacterium longum, Blautia wexlerae, Bifidobacterium pseudocatenulatum, Faecalibacterium prausnitzii*, and *Fusicatenibacter saccharivorans*. In some embodiments, the composition comprises an effective amount of one or more different butyrate-producing bacterial species of *Roseburia inulinivorans, Faecalibacterium prausnitzii*, and *Roseburia Hominis*. In some embodiments, the composition consists essentially of an effective amount of (1) one or more of the beneficial bacterial species selected from Table 1 and *Bifidobacterium longum, Blautia wexlerae*, and *Bifidobacterium pseudocatenulatum*; (2) one or more physiologically acceptable excipients. In some embodiments, the composition is formulated for oral ingestion, such as in the form of a food or beverage item. In some embodiments, the composition is formulated for direct deposit to the subject's gastrointestinal tract. Optionally, the composition may further includes one or more agents known to enhance immunity, for example, effective in suppressing an infectious agent, such as SARS-CoV-2, and reducing disease severity (e.g., ivermectin, hydroxychloroquine, Zinc, vitamin C, vitamin D, quercetin, melatonin, fluvoxamine or fluoxetine, proxalutamide, azithromycin, doxycycline, or any combination thereof).

In a third aspect, the present invention provides a kit for treating or preventing PACS in a subject. The kit includes multiple containers, each containing a distinct composition comprising an effective amount of one or more beneficial bacterial species selected from Table 1 and *Bifidobacterium longum, Blautia wexlerae*, and *Bifidobacterium pseudocatenulatum*. In some embodiments, the kit comprises a plurality of containers, each containing a distinct composition comprising an effective amount of one or more different beneficial bacterial species selected from *Bifidobacterium longum, Blautia wexlerae, Bifidobacterium pseudocatenulatum, Faecalibacterium prausnitzii*, and *Fusicatenibacter saccharivorans*. In some embodiments, the kit includes a plurality of containers, each containing a distinct composition comprising an effective amount of one or more different butyrate-producing bacterial species of *Roseburia inulinivorans, Faecalibacterium prausnitzii*, and *Roseburia Hominis*. In some embodiments, the compositions are in the form of a powder, liquid, paste, cream, tablet, or capsule. The kit may further include one or more additional containers, each containing one or more agents known to effectively suppress an infectious agent such as SARS-CoV-2 and/or to reduce disease severity or facilitate patient recovery from COVID-19 (e.g., ivermectin, vitamin C, vitamin D, quercetin, melatonin, Zinc, azithromycin, doxycycline, hydroxychloroquine, fluvoxamine or fluoxetin, proxalutamide, or any combination thereof). Moreover, a user instruction manual may be included in the kit for the proper use of the kit, providing information such as suitable subjects for treatment and time, dosing etc.

In a fourth aspect, the present invention provides a method for assessing risk of PACS in a subject. The method includes these steps: (1) determining, in a stool sample from the subject, the level or relative abundance of one or more of the bacterial species set forth in Table 2: (2) determining the level or relative abundance of the same bacterial species in a stool sample obtained at the time of initial diagnosis of COVID-19 (such as at the time of first positive test report for COVID-19 or at the time of admission to a hospital) from a reference cohort comprising COVID-19 patients who would or would not eventually develop PACS; (3) generating decision trees by random forest model using data obtained from step (2) and running the level or relative abundance of one or more of the bacterial species from step (1) down the decision trees to generate a score; and (4) determining the subject with a score greater than 0.5 as having an increased risk for PACS, and determining the subject with a score no greater than 0.5 as having no increased risk for PACS. In some embodiments, each of steps (1) and (2) comprises metagenomics sequencing. In some embodiments, each of steps (1) and (2) comprises a polymerase chain reaction (PCR), e.g., a quantitative PCR (qPCR). In some embodiments, the bacterial species comprise one or more of *Bifidobacterium longum, Blautia wexlerae, Bifidobacterium pseudocatenulatum, Faecalibacterium prausnitzii*, and *Fusicatenibacter saccharivorans*.

BRIEF DESCRIPTION OF THE DRAWINGS

FIG. 1A: Principal Coordinates Analysis of gut microbiota composition of patients with COVID-19 with and without PACS at 6 months. FIG. 1B: Bacteria diversity and richness. FIG. 1C analysis of gut microbiota composition of patients with and without PACS. FIG. 1D: Linear discriminant analysis effect size (LEfSe) analysis of discriminant taxa in gut microbiome of patients with PACS at six months.

FIG. 2A: Effect size of subject metadata on gut microbiome composition determined by PERMANOVA test. FIG. 2B: Overall associations between gut microbiome composition with different subgroups of PACS determined by PERMANOVA test. FIG. 2C: Associations of bacteria species with different categories of PACS at 6 months.

FIG. 3A: The proportion of 30 symptoms at 3 months and 6 months after acute COVID-19. FIG. 3B: Multivariable analysis on factors associated with development of PACS. The centre dot denotes the mean value, the boxes denote the upper and lower interquartile ranges.

FIG. 4A: PACS proportion at different subgroups by COVID-19 severity in 106 patients at 3-month and 6-month follow-up. FIG. 4B: PACS proportion at different subgroups by COVID-19 severity in 68 patients who had stool samples at 3-month and 6-month follow-up.

FIG. 5A: Principal Coordinates Analysis of gut microbiota composition of patients with COVID-19 before and after negative SARS-CoV-2 compared with non-COVID-19 subjects. FIG. 5B: Diversity and richness. FIG. 5C: Analysis of gut microbiota in COVID-19 patients at 1 month and 6 months after virus clearance. FIG. 5D: Average relative abundance of top 5 phyla and top 10 microbial genera. FIG. 5E: top 5 phyla and top 10 microbial genera detected in stools from in-hospital patient and their follow-up within 1 month and longer than 6 months after negative SARS-CoV-2.

FIG. 6A: Principal Coordinates Analysis of gut microbiota composition of COVID-19 patients with antibiotics before and after negative RT-qPCR for SARS-CoV-2 compared with non-COVID-19 subjects. FIG. 6B: Principal Coordinates Analysis of gut microbiota composition of COVID-19 patients with or without antibiotics 6 months after negative RT-qPCR for SARS-CoV-2 compared with non-COVID-19 subjects.

FIG. 7A: Differences of the top 7 phyla in 1 month and 6 months follow-up sample. FIG. 7B: Differences of the top 10 genus in 1 month and 6 months follow-up sample. FIG. 7C: Differences of the top 20 species in 1 month and 6 months follow-up sample. FIG. 7D: Principal Coordinates Analysis of gut microbiota composition of COVID-19 patients at 1 month, 6 months and 9 months after negative RT-qPCR for SARS-CoV-2. FIG. 7E: Diversity and richness of gut microbiota in COVID-19 patients at 1 month, 6 months, and 9 months. FIG. 7F: analysis of gut microbiota in COVID-19 patients at 1 month, 6 months, and 9 months.

FIG. 8A: The morbidity of top 16 symptoms at 6 months after acute COVID-19. FIG. 8B: Multivariable analysis on factors associated with development of PACS. The centre dot denote the mean value, the boxes denote the upper and lower interquartile ranges.

FIG. 9A: Principal Coordinates Analysis of gut microbiota composition of COVID-19 patients with or without PACS before and after negative RT-qPCR for SARS-CoV-2 compared with non-COVID-19 subjects. FIG. 9B: Diversity and richness analysis of gut microbiota in COVID-19 patients at baseline compared with non-COVID-19 subjects. FIG. 9C: Diversity and richness analysis of gut microbiota in COVID-19 patients at 6 months follow-up compared with non-COVID-19 subjects. FIG. 9D: The change of gut microbial composition from baseline to six months follow-up after virus clearance in COVID-19 patients with or without PACS. FIG. 9E: Lefse analysis in gut microbiome of recovered patients with PACS at baseline.

FIG. 10A: The 6MWD in COVID-19 patients with or without PACS. FIG. 10B: Association of bacteria species with 6MWD in COVID-19 patients at 6 months follow-up (from linear mixed models in MaAsLin).

FIG. 11A: Principal Coordinates Analysis of gut microbiota composition of patients with COVID-19 who had or had not any persistent symptoms at month 6 after clearing SARS-CoV-2. FIG. 11B: Gut microbiota composition of first stool samples after confirmed positive RT-qPCR for SARS-CoV-2 during hospitalization. FIG. 11C: Associations between persistent symptoms in recovered patients with COVID-19 and baseline microbial features as determined by MaAsLin with multivariate linear model (P<0.05). FIG. 11D: Schematic summary of associations between gut microbiome and PACS development

DEFINITIONS

Figure 1A:
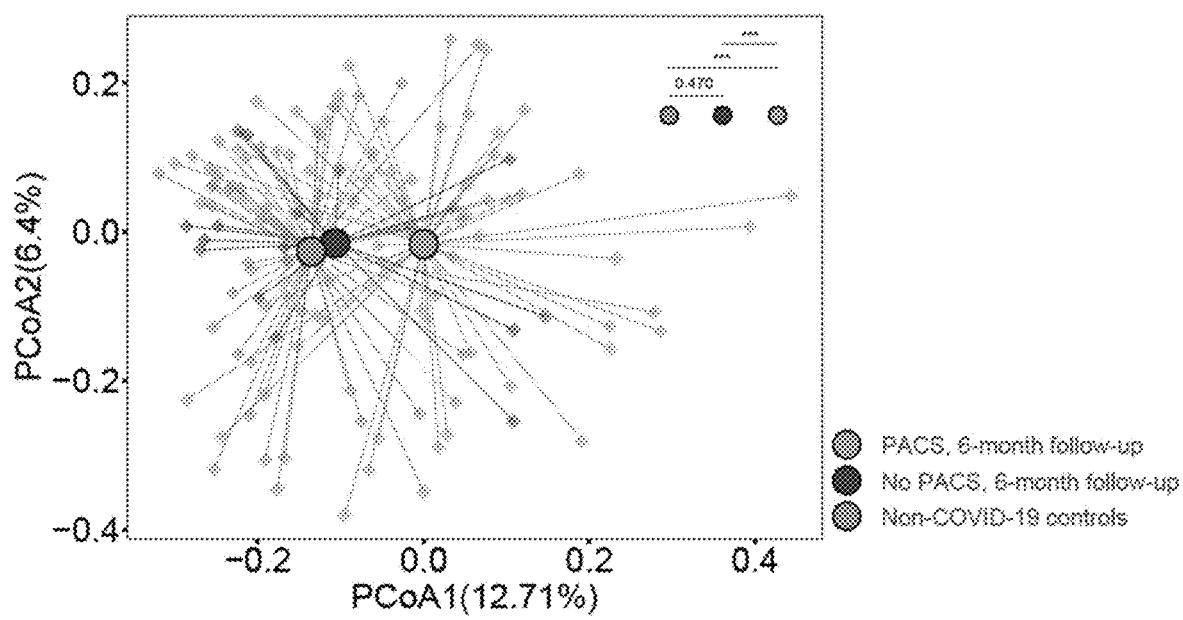
FIG. 1A-FIG. 1D Gut microbiota composition in patients with COVID-19 with and without PACS at 6 months.
Figures 1B, 1C:
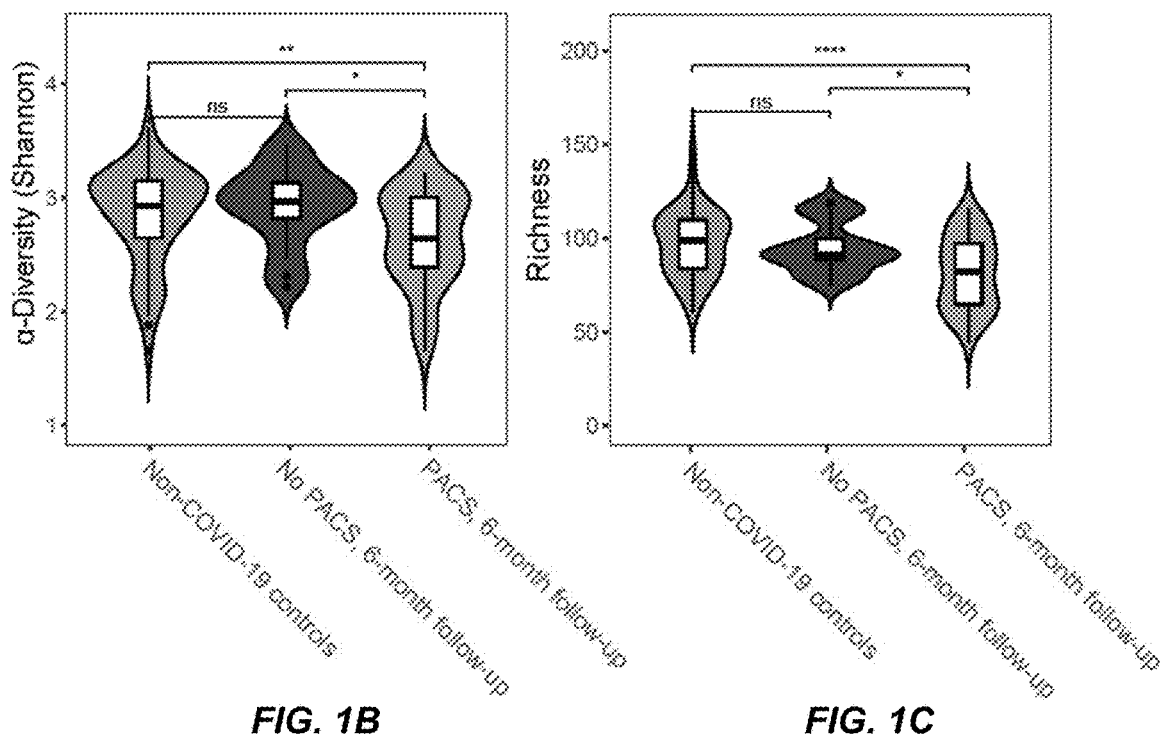

As used herein, the term "SARS-CoV-2 or severe acute respiratory syndrome coronavirus 2," refers to the virus that causes Coronavirus Disease 2019 (COVID-19). It is also referred to as the "COVID-19 virus."

The term "post-acute COVID-19 syndrome (PACS)" or "long COVID" is used to describe a medical condition in which a patient who has recovered from COVID, as indicated by a negative PCR report at least 2 weeks prior (e.g., from at least 3 or 4 weeks earlier), yet continuously and stably exhibits one or more symptoms of the disease without any notable progression. The symptoms may include respiratory (cough, sputum, nasal congestion/runny nose, shortness of breath), neuropsychiatric (headache, dizziness, loss of taste, loss of smell, anxiety, difficulty in concentration, difficulty in sleeping, sadness, poor memory, blurred vision), gastrointestinal (nausea, diarrhoea, abdominal pain, epigastric pain), dermatological (hair loss), or musculoskeletal (joint pain, muscle pain) symptoms, as well as fatigue.

The term "inhibiting" or "inhibition," as used herein, refers to any detectable negative effect on a target biological process, such as RNA/protein expression of a target gene, the biological activity of a target protein, cellular signal transduction, cell proliferation, presence/level of an organism especially a micro-organism, any measurable biomarker, bio-parameter, or symptom in a subject, and the like. Typically, an inhibition is reflected in a decrease of at least 10%, 20%, 30%, 40%, 50%, 60%, 70%, 80%, 90% or greater in the target process (e.g., a subject's bodyweight, or the blood glucose/cholesterol level, or any measurable symptom or biomarker in a subject, such as an infection rate among subjects by a pathogenic infectious agent), or any one of the downstream parameters mentioned above, when compared to a control. "Inhibition" further includes a 100% reduction, i.e., a complete elimination, prevention, or abolition of a target biological process or signal. The other relative terms such as "suppressing." "suppression," "reducing," and "reduction" are used in a similar fashion in this disclosure to refer to decreases to different levels (e.g., at least 10%, 20%, 30%, 40%, 50%, 60%, 70%, 80%, 90% or greater decrease compared to a control level) up to complete elimination of a target biological process or signal. On the other hand, terms such as "activate," "activating," "activation," "increase," "increasing," "promote," "promoting," "enhance," "enhancing," or "enhancement" are used in this disclosure to encompass positive changes at different levels (e.g., at least about 5%, 10%, 20%, 30%, 40%, 50%, 60%, 70%, 80%, 90%, 100%, 200%, or greater such as 3, 5, 8, 10, 20-fold increase compared to a control level in a target process, signal, or parameter.

As used herein, the term "treatment" or "treating" includes both therapeutic and preventative measures taken to address the presence of a disease or condition or the risk of developing such disease or condition at a later time. It encompasses therapeutic or preventive measures for alleviating ongoing symptoms, inhibiting or slowing disease progression, delaying of onset of symptoms, or eliminating or reducing side-effects caused by such disease or condition. A preventive measure in this context and its variations do not require 100% elimination of the occurrence of an event; rather, they refer to a suppression or reduction in the likelihood or severity of such occurrence or a delay in such occurrence.

The term "severity" of a disease refers to the level and extent to which a disease progresses to cause detrimental effects on the well-being and health of a patient suffering from the disease, such as short-term and long-term physical, mental, and psychological disability, up to and including death of the patient. Severity of a disease can be reflected in the nature and quantity of the necessary therapeutic and maintenance measures, the time duration required for patient recovery, the extent of possible recovery, the percentage of patient full recovery, the percentage of patients in need of long-term care, and mortality rate.

A "patient" or "subject" receiving the composition or treatment method of this invention is a human, including both adult and juvenile human, of any age, gender, and ethnic background, who has been diagnosed with COVID-19 (e.g., has had a positive nucleic acid and/or antibody test result for SARS-CoV2) and is in need of being treated to address PACS symptoms or to prevent the onset of such symptoms. Typically, the patient or subject receiving treatment according to the method of this invention to prevent or treat long COVID symptoms is not otherwise in need of treatment by the same therapeutic agents. For example, if a subject is receiving the symbiotic composition according to the claimed method, the subject is not suffering from any disease that is known to be treated by the same therapeutic agents. Although a patient may be of any age, in some cases the patient is at least 20, 30, 40, 45, 50, 55, 60, 65, 70, 75, 80, or 85 years of age: in some cases, a patient may be between 20 and 30, 30 and 40, 40 and 45 years old, or between 50 and 65 years of age, or between 65 and 85 years of age. A "child" subject is one under the age of 18 years, e.g., about 5-17, 9 or 10-17, or 12-17 years old, including an "infant." who is younger than about 12 months old, e.g., younger than about 10, 8, 6, 4, or 2 months old, whereas an "adult" subject is one who is 18 years or older.

The term "effective amount," as used herein, refers to an amount that produces intended (e.g., therapeutic or prophylactic) effects for which a substance is administered. The effects include the prevention, correction, or inhibition of progression of the symptoms of a particular disease/condition and related complications to any detectable extent, e.g., incidence of disease, infection rate, one or more of the symptoms of a viral or bacterial infection and related disorder (e.g., COVID-19). The exact amount will depend on the purpose of the treatment, and will be ascertainable by one skilled in the art using known techniques (see, e.g., Lieberman, *Pharmaceutical Dosage Forms* (vols. 1-3, 1992): Lloyd, *The Art, Science and Technology of Pharmaceutical Compounding* (1999); and Pickar, *Dosage Calculations* (1999)).

The term "about" when used in reference to a given value denotes a range encompassing ±10% of the value.

A "pharmaceutically acceptable" or "pharmacologically acceptable" excipient is a substance that is not biologically harmful or otherwise undesirable, i.e., the excipient may be administered to an individual along with a bioactive agent without causing any undesirable biological effects. Neither would the excipient interact in a deleterious manner with any of the components of the composition in which it is contained.

The term "excipient" refers to any essentially accessory substance that may be present in the finished dosage form of the composition of this invention. For example, the term "excipient" includes vehicles, binders, disintegrants, fillers (diluents), lubricants, glidants (flow enhancers), compression aids, colors, sweeteners, preservatives, suspending/dispersing agents, film formers/coatings, flavors and printing inks.

The term "consisting essentially of," when used in the context of describing a composition containing an active ingredient or multiple active ingredients, refer to the fact that the composition does not contain other ingredients possessing any similar or relevant biological activity of the active ingredient(s) or capable of enhancing or suppressing the activity, whereas one or more inactive ingredients such as physiological or pharmaceutically acceptable excipients may be present in the composition. For example, a composition consisting essentially of active agents (for instance, one or more bacterial species in Table 1) effective for treating PACS in a subject is a composition that does not contain any other agents that may have any detectable positive or negative effect on the same target process (e.g., any one of the PACS symptoms) or that may increase or decrease to any measurable extent of the relevant symptoms among the receiving subjects.

DETAILED DESCRIPTION OF THE INVENTION

I. Introduction

This invention describes specific bacterial species and combination thereof (e.g., beneficial bacterial species listed in Table 1 and Table 3 plus *Bifidobacterium longum, Blautia wexlerae*, and *Bifidobacterium pseudocatenulatum*) for preventing or treating PACS symptoms in a subject, especially when the subject is a human adult or child suffering but recovering from COVID-19. The practical use of the invention includes development and manufacturing of commercial food products or health supplements, for example in the form of a powder, tablet, capsule, or liquid, which can be taken alone or added to food or beverages, as well as any other formulation suitable for use by fecal microbiota transplant (FMT).

II. Pharmaceutical Compositions and Administration

The present invention provides pharmaceutical compositions comprising an effective amount of one or more of the beneficial bacterial species listed in Table 1 and Table 3 plus *Bifidobacterium longum, Blautia wexlerae*, and *Bifidobacterium pseudocatenulatum* for treating a COVID-19 patient to reduce the risk of developing symptom(s) of PACS or to ameliorate the symptom(s) if any already present. Pharmaceutical compositions of the invention are suitable for use in a variety of drug delivery systems. Suitable formulations for use in the present invention are found in *Remington's Pharmaceutical Sciences*, Mack Publishing Company, Philadelphia, PA, 17th ed. (1985). For a brief review of methods for drug delivery, see, Langer, *Science* 249:1527-1533 (1990).

The pharmaceutical compositions of the present invention can be administered by various routes, e.g., systemic administration via oral ingestion or local delivery using a rectal suppository. The preferred route of administering the pharmaceutical compositions is oral administration at daily doses of about $10^6$ to about $10^{12}$ CFU for the combination of all beneficial bacterial species listed in Table 1 and Table 3 plus *Bifidobacterium longum, Blautia wexlerae*, and *Bifidobacterium pseudocatenulatum*. When multiple bacterial species are administered to the subject, they may be administered either in one single composition or in multiple compositions. The appropriate dose may be administered in a single daily dose or as divided doses presented at appropriate intervals, for example as two, three, four, or more subdoses per day. The duration of administration may range from about 1 week to about 8 weeks, e.g., about 2 week to about 4 weeks, or for a longer time period (e.g., up to 6 months) as the relevant symptoms persist.

For preparing pharmaceutical compositions containing the beneficial bacteria identified in this disclosure, one or more inert and pharmaceutically acceptable carriers are used. The pharmaceutical carrier can be either solid or liquid. Solid form preparations include, for example, powders, tablets, dispersible granules, capsules, cachets, and suppositories. A solid carrier can be one or more substances that can also act as diluents, flavoring agents, solubilizers, lubricants, suspending agents, binders, or tablet disintegrating agents: it can also be an encapsulating material.

In powders, the carrier is generally a finely divided solid that is in a mixture with the finely divided active component, e.g., any one or more of the beneficial bacterial species listed in Table 1 and Table 3 plus *Bifidobacterium longum, Blautia wexlerae*, and *Bifidobacterium pseudocatenulatum*. In tablets, the active ingredient is mixed with the carrier having the necessary binding properties in suitable proportions and compacted in the shape and size desired.

For preparing pharmaceutical compositions in the form of suppositories, a low-melting wax such as a mixture of fatty acid glycerides and cocoa butter is first melted and the active ingredient is dispersed therein by, for example, stirring. The molten homogeneous mixture is then poured into convenient-sized molds and allowed to cool and solidify.

Powders and tablets preferably contain between about 5% to about 100% by weight of the active ingredient(s) (e.g., one or more of the beneficial bacterial species listed in Table 1 and Table 3 plus *Bifidobacterium longum, Blautia wexlerae*, and *Bifidobacterium pseudocatenulatum*). Suitable carriers include, for example, magnesium carbonate, magnesium stearate, talc, lactose, sugar, pectin, dextrin, starch, tragacanth, methyl cellulose, sodium carboxymethyl cellulose, a low-melting wax, cocoa butter, and the like.

The pharmaceutical compositions can include the formulation of the active ingredient(s), e.g., one or more of the beneficial bacterial species listed in Table 1 and Table 3 plus *Bifidobacterium longum, Blautia wexlerae*, and *Bifidobacterium pseudocatenulatum*, with encapsulating material as a carrier providing a capsule in which the active ingredient(s) (with or without other carriers) is surrounded by the carrier, such that the carrier is thus in association with the active ingredient(s). In a similar manner, sachets can also be included. Tablets, powders, sachets, and capsules can be used as solid dosage forms suitable for oral administration.

Liquid pharmaceutical compositions include, for example, solutions suitable for oral administration or local delivery, suspensions, and emulsions suitable for oral administration. Sterile water solutions of the active component (e.g., one or more of the beneficial bacterial species listed in Table 1 and Table 3 plus *Bifidobacterium longum, Blautia wexlerae*, and *Bifidobacterium pseudocatenulatum*) or sterile solutions of the active component in solvents comprising water, buffered water, saline, PBS, ethanol, or propylene glycol are examples of liquid or semi-liquid compositions suitable for oral administration or local delivery such as by rectal suppository. The compositions may contain pharmaceutically acceptable auxiliary substances as required to approximate physiological conditions, such as pH adjusting and buffering agents, tonicity adjusting agents, wetting agents, detergents, and the like.

Sterile solutions can be prepared by dissolving the active component (e.g., one or more of the beneficial bacterial species listed in Table 1 and Table 3 plus *Bifidobacterium longum, Blautia wexlerae*, and *Bifidobacterium pseudocatenulatum*) in the desired solvent system, and then passing the resulting solution through a membrane filter to sterilize it or, alternatively, by dissolving the sterile active component in a previously sterilized solvent under sterile conditions. The resulting aqueous solutions may be packaged for use as is, or lyophilized, the lyophilized preparation being combined with a sterile aqueous carrier prior to administration. The pH of the preparations typically will be between 3 and 11, more preferably from 5 to 9, and most preferably from 7 to 8.

Single or multiple administrations of the compositions can be carried out with dose levels and pattern being selected by the treating physician. In any event, the pharmaceutical formulations should provide a quantity of an active agent sufficient to effectively enhance the efficacy of a vaccine and/or reduce or eliminate undesirable adverse effects of a vaccine.

Different combinations of bacteria in the pharmaceutical compositions can be chosen according to Table 1 to target specific categories of symptoms. For example, *Agathobaculum butyriciproducens, Bifidobacterium pseudocatenulatum, Roseburia hominis, Anaerostipes hadrus, Dialister* sp. CAG:357, *Eubacterium rectale* can be used to prevent or alleviate fatigue: *Agathobaculum butyriciproducens, Bifidobacterium pseudocatenulatum, Roseburia hominis, Asaccharobacter celatus* can be used to prevent or alleviate gastrointestinal symptoms: *Agathobaculum butyriciproducens, Roseburia hominis, Anaerostipes hadrus, Coprococcus comes* can be used to prevent or alleviate neurological symptoms: *Agathobaculum butyriciproducens, Bifidobacterium pseudocatenulatum, Roseburia hominis, Anaerostipes hadrus, Alistipes putredinis* can be used to prevent or alleviate respiratory symptoms: *Agathobaculum butyriciproducens, Anaerostipes hadrus, Eubacterium* sp. CAG:274, *Dorea formicigenerans* can be used to prevent or alleviate musculoskeletal symptoms; and *Agathobaculum butyriciproducens, Roseburia hominis, Eubacterium rectale, Gemmiger formicilis, Eubacterium ventriosum, Dorea formicigenerans* can be used to prevent or alleviate hair loss.

III. Additional Therapeutic Agents

Additional known therapeutic agent or agents may be used in combination with an active agent such as one or more of the beneficial bacterial species listed in Table 1 and Table 3 plus *Bifidobacterium longum, Blautia wexlerae*, and *Bifidobacterium pseudocatenulatum* in the practice of the present invention for the purpose of treating or preventing PACS symptom(s) in a patient recovering from COVID-19. In such applications, one or more of the previously known effective prophylactic/therapeutic agents can be administered to patients concurrently with an effective amount of the active agent(s) either together in a single composition or separately in two or more different compositions.

For example, drugs and supplements that are known to be effective for use to prevent or treat COVID-19 include ivermectin, vitamin C, vitamin D, melatonin, quercetin, Zinc, hydroxychloroquine, fluvoxamine/fluoxetine, proxalutamide, doxycycline, and azithromycin. They may be used in combination with the active agents (such as any one or more of the beneficial bacterial species listed in Table 1 and Table 3 plus *Bifidobacterium longum, Blautia wexlerae*, and *Bifidobacterium pseudocatenulatum*) of the present invention to promote safe and full recovery among patients suffering from SARS-CoV2 infection, reduce potential disease severity (including morbidity and mortality), and ensure elimination of any lingering long-term ill effects from the disease. In particular, the combination of Zinc, hydroxychloroquine, and azithromycin and the combination of ivermectin, fluvoxamine or fluoxetine, proxalutamide, doxycycline, vitamin C, vitamin D, melatonin, quercetin, and Zinc have demonstrated high efficacy in both COVID prophylaxis and therapy. Thus, these known drug/supplement or nutritheutical combinations can be used in the method of this invention along with the active components of one or more of the beneficial bacterial species listed in Table 1 and Table 3 plus *Bifidobacterium longum, Blautia wexlerae*, and *Bifidobacterium pseudocatenulatum*.

IV. Kits

The invention also provides kits for treating and preventing PACS symptoms among patients recovering from COVID-19 in accordance with the method disclosed herein. The kits typically include a plurality of containers, each containing a composition comprising one or more of the beneficial bacterial species listed in Table 1 and Table 3 plus *Bifidobacterium longum, Blautia wexlerae*, and *Bifidobacterium pseudocatenulatum*. Further, additional agents or drugs that are known to be therapeutically effective for prevention and/or treatment of the disease, including for ameliorating the symptoms and reducing the severity of the disease, as well as for facilitating recovery from the disease (such as those described in the last section or otherwise known in the pertinent technical field) may be included in the kit. The plurality of containers of the kit each may contain a different active agent/drug or a distinct combination of two or more of the active agents or drugs. The kit may further include informational material providing instructions on how to dispense the pharmaceutical composition(s), including description of the type of patients who may be treated (e.g., human patients, adults or children, who have been diagnosed of COVID-19 and now are in the process of recovering and are therefore seeking to eliminate lingering symptoms of the disease or to reduce the risk of such symptoms becoming persistent and continuous), the dosage, frequency, and manner of administration, and the like.

V. Risk Assessment and Treatment

The present inventors also discovered that the altered level of certain bacterial species can indicate the prospect or likelihood of a COVID patient later develop PACS symptoms and therefore can provide a basis for prophylactic treatment: they revealed that the level or relative abundance of certain bacterial species (such as one or more of the species shown in Table 2) can be analyze to indicate an individual patient's risk or likelihood for later developing PACS symptoms when properly calculated using certain specified mathematic tools.

For example, when a stool sample taken from a COVID patient who is being tested is analyzed, the level or relative abundance of bacterial species in Table 2 in the sample is determined, e.g., by PCR especially quantitative PCR. In the meantime, the level or relative abundance of the same bacterial species is determined by the same method as the bacterial species is/are present in stool samples taken from individual COVID patients at the time of initial diagnosis of COVID-19 from a reference cohort comprising these COVID-19 patients, some of whom would eventually develop PACS whereas others would not develop PACS. Decision trees are then generated by random forest model using data obtained from the reference cohort, and the level or relative abundance of one or more of the bacterial species from the individual patient being tested is run down the decision trees to generate a score. The patient is deemed to have an increased risk for developing PACS when his score is greater than 0.5. In contrast, when his score is no greater than 0.5, the patient is deemed to have no increased risk for PACS.

Once the PACS risk assessment is made, for example, an individual who has been diagnosed as suffering from COVID-19 (e.g., based on a positive PCR or antibody test for SARS-CoV2) and who has been in the process of recovering from the disease is deemed to have an increased risk of developing PACS at a later time, appropriate treatment steps can be taken as a measure to achieve the goal of preventing the onset of the PACS symptoms or reducing their severity or eliminating them altogether. For instance, the patient may be given composition(s) comprising an effective amount of one or more of the beneficial bacterial species listed in Table 1 and Table 3 plus *Bifidobacterium longum, Blautia wexlerae*, and *Bifidobacterium pseudocatenulatum*, e.g., by FMT or by an alternative administration method via oral or local delivery, such that the bacterial profile in the patient's gastrointestinal tract will be modified to one that is favorable for the outcome of prevented, reduced, eliminated, or reversed PACS symptoms.

EXAMPLES

The following examples are provided by way of illustration only and not by way of limitation. Those of skill in the art will readily recognize a variety of non-critical parameters that could be changed or modified to yield essentially the same or similar results.

BACKGROUND

Clinical characteristics of coronavirus 2019 (COVID-19) during the acute infection is well described but little is known of long-term complications of COVID-19. Post-acute COVID-19 syndrome (PACS) characterised by long term complications and/or persistent symptoms beyond four weeks after the onset of COVID-19 is increasingly being recognised[1-3]. Up to three quarters of patients described at least one symptom at six months after recovery and multi-system symptoms including fatigue, muscle weakness and sleep difficulties are commonly reported[4].

Reasons underlying the development of PACS is largely unclear. Perturbations of immune and inflammatory responses, cellular damage by acute viral infection or sequele of post critical illness may contribute to long term symptoms after COVID-19 infection[5]. As the gastrointestinal tract is the largest immunological organ in the body, aberrant immune response to COVID-19 infection induced by resident microorganisms may affect the recovery process. Emerging evidence supports the potential role of gut dysbiosis in severity of COVID-19 infection[6]. The present inventors herein investigated whether gut microbiota composition and to what extent affects risk of persistent symptoms in recovered patients with different severity of COVID-19 infection.

Figure 2A:
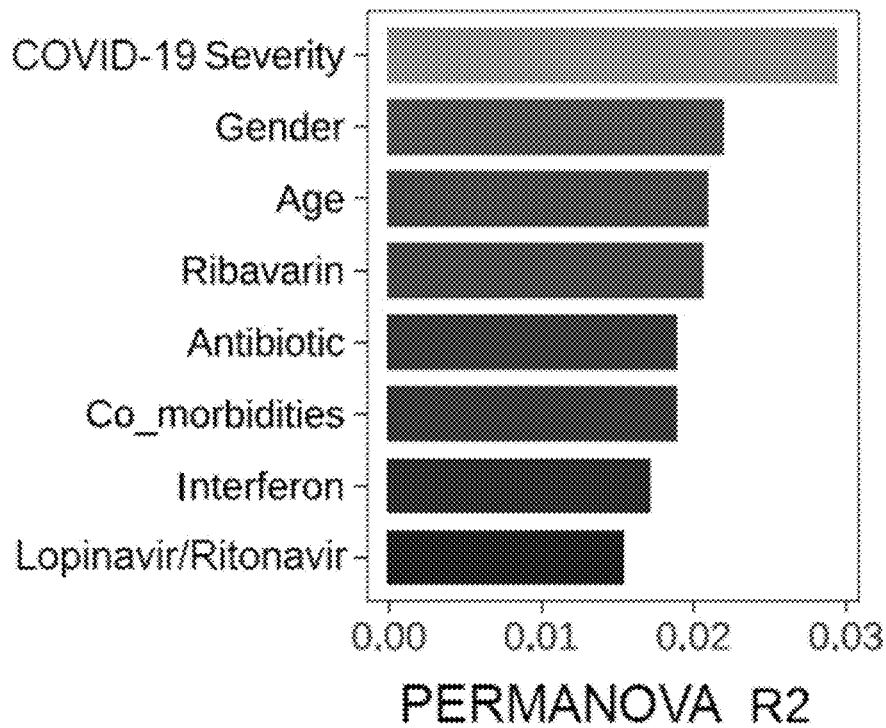
FIG. 2A-FIG. 2C Factors affecting the gut microbiome in follow-up stools from patients after clearing virus.
Figure 2B:
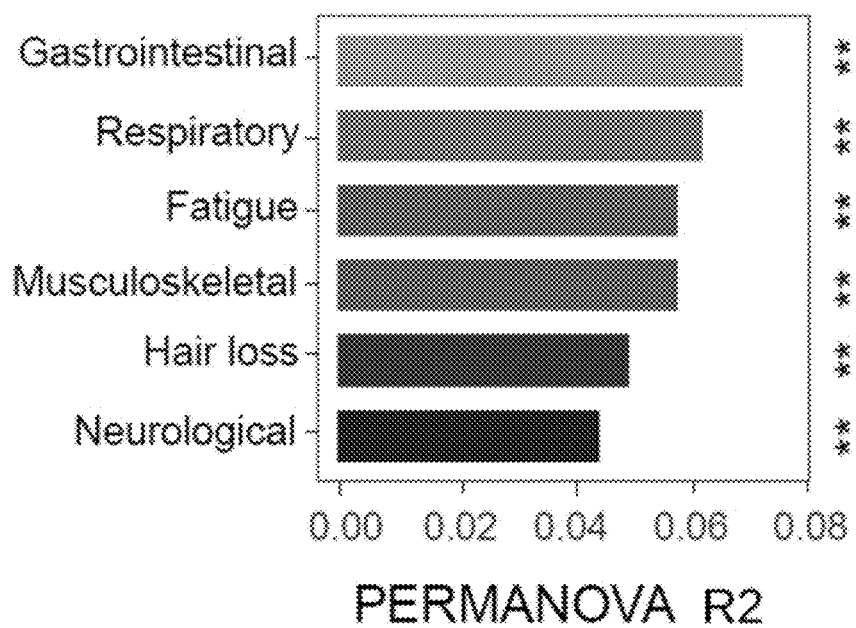

Supplementation of Beneficial Bacterial for Reducing Risk or Alleviating Symptom of PACS Gut microbiome composition and association with different symptoms were examined at six months. Based on permutational multivariate analysis of variance (PERMANOVA), gut composition was not associated with medical therapy during hospitalisation or disease severity (FIG. 2A, Table 14). Symptoms of PACS were categorised into respiratory (cough, sputum, nasal congestion/runny nose, shortness of breath), neuropsychiatric (headache, dizziness, loss of taste, loss of smell, anxiety, difficulty in concentration, difficulty in sleeping, sadness, poor memory, blurred vision), gastrointestinal (nausea, diarrhoea, abdominal pain, epigastric pain), dermatological (hair loss), musculoskeletal (joint pain, muscle pain), and fatigue. Associations of single bacteria taxa with different categories of symptoms were tested using multivariate association with linear model (MaAsLin). Different symptomatology was associated with different gut microbiome patterns (FIG. 2B, Table 15).

Figure 2C:
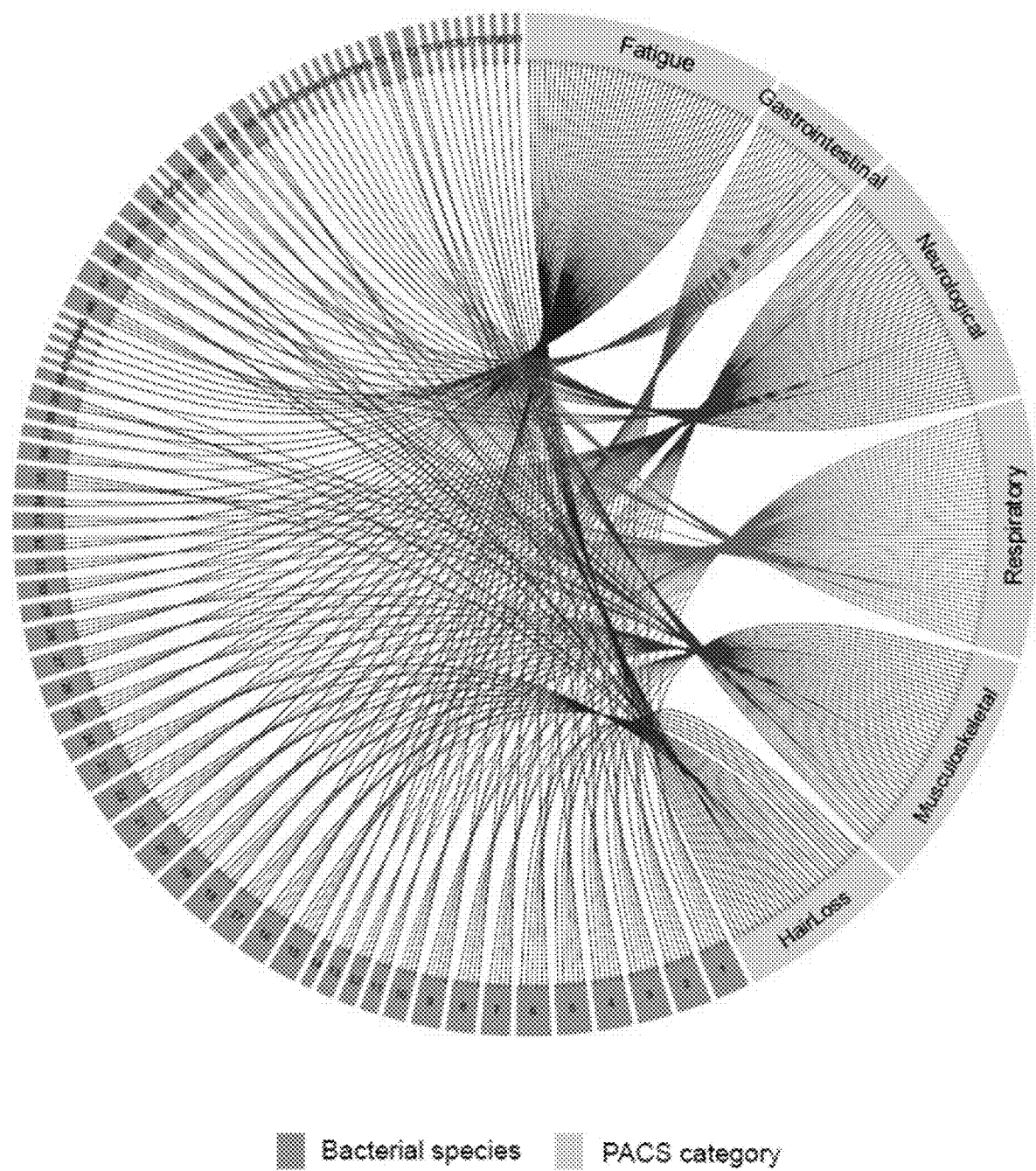
Figure 3A:
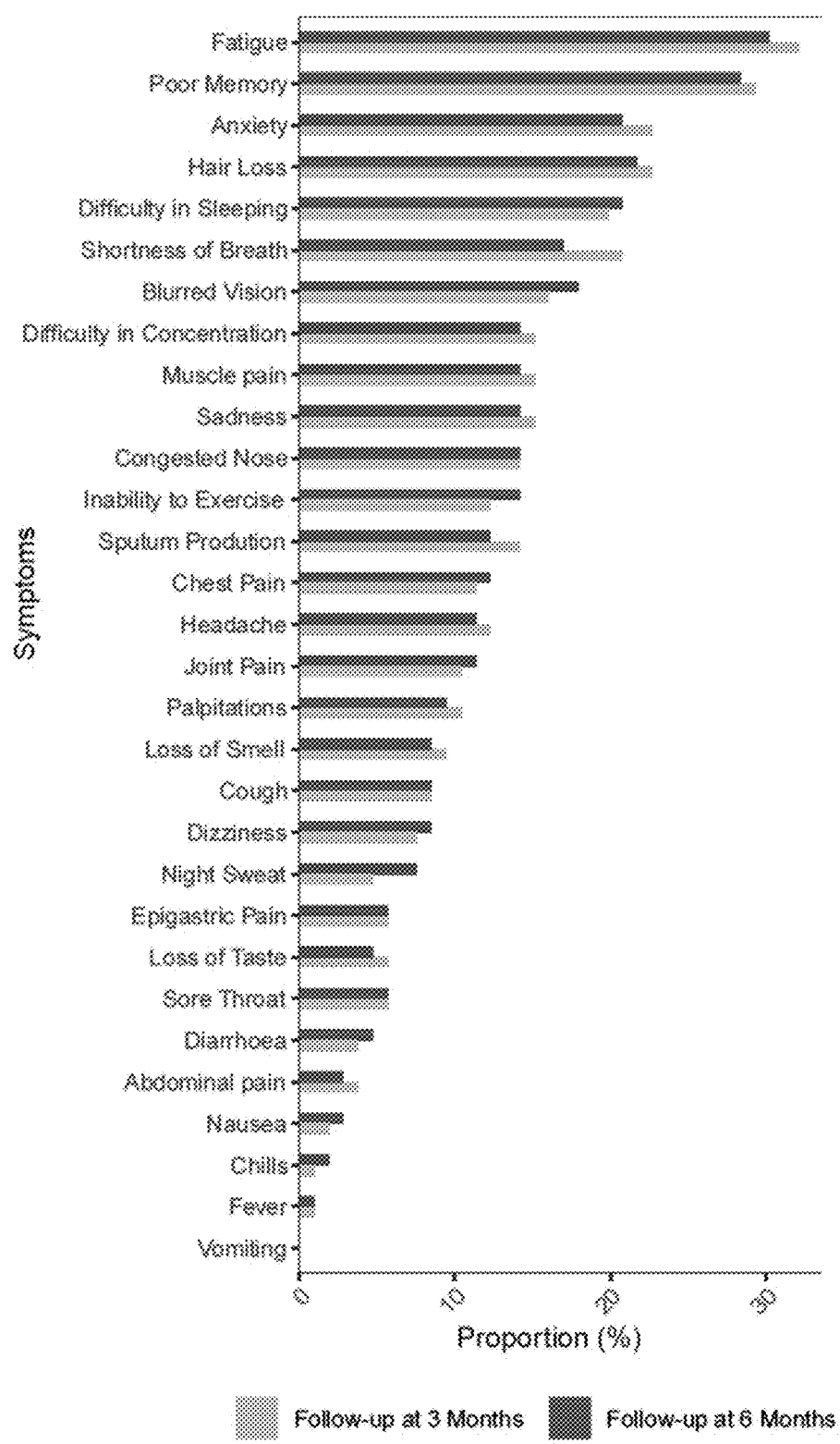
FIG. 3A-FIG. 3B Post-acute COVID-19 syndrome (PACS) after virus clearance.
Figure 3B:
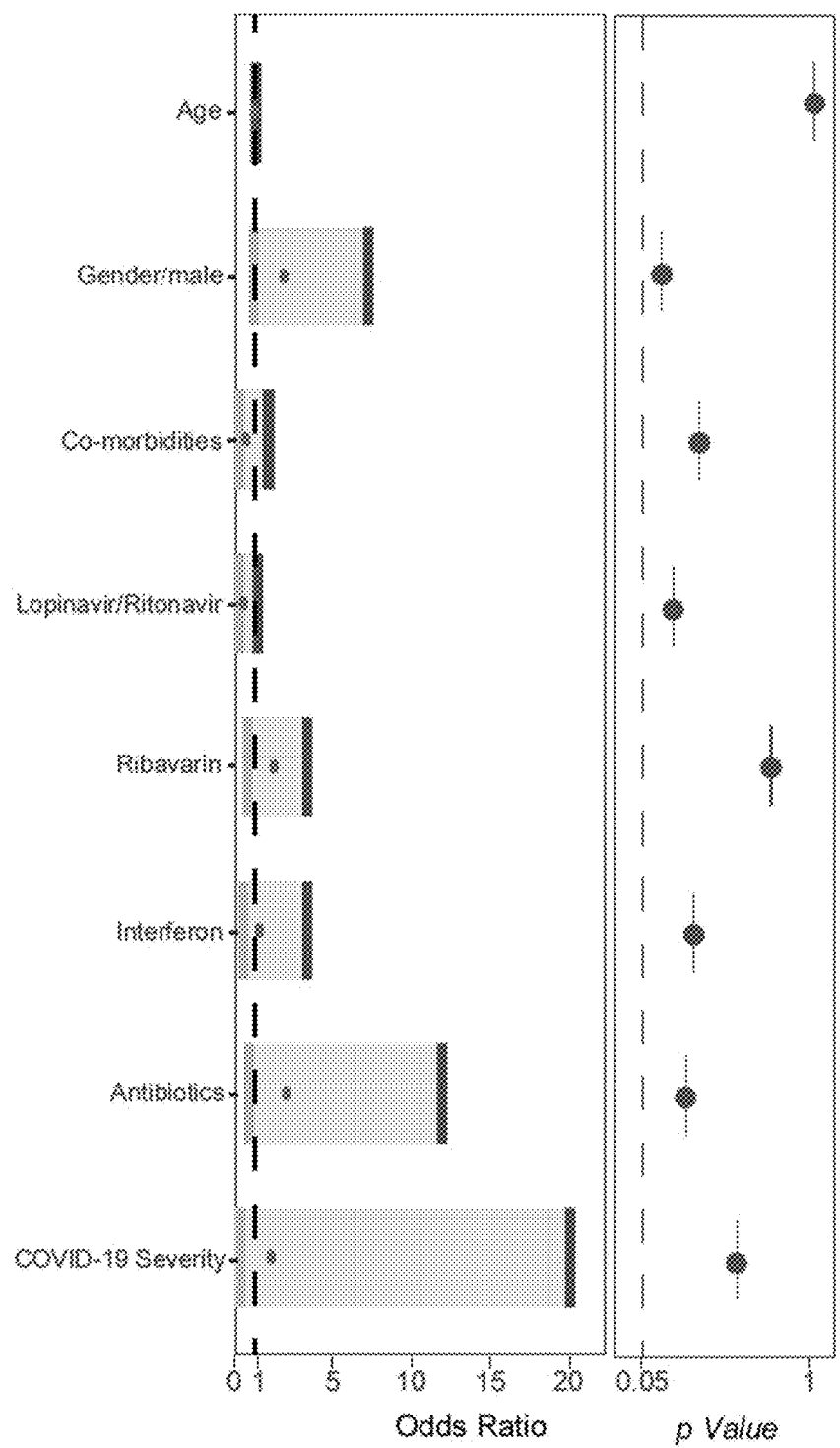
Figure 4A:
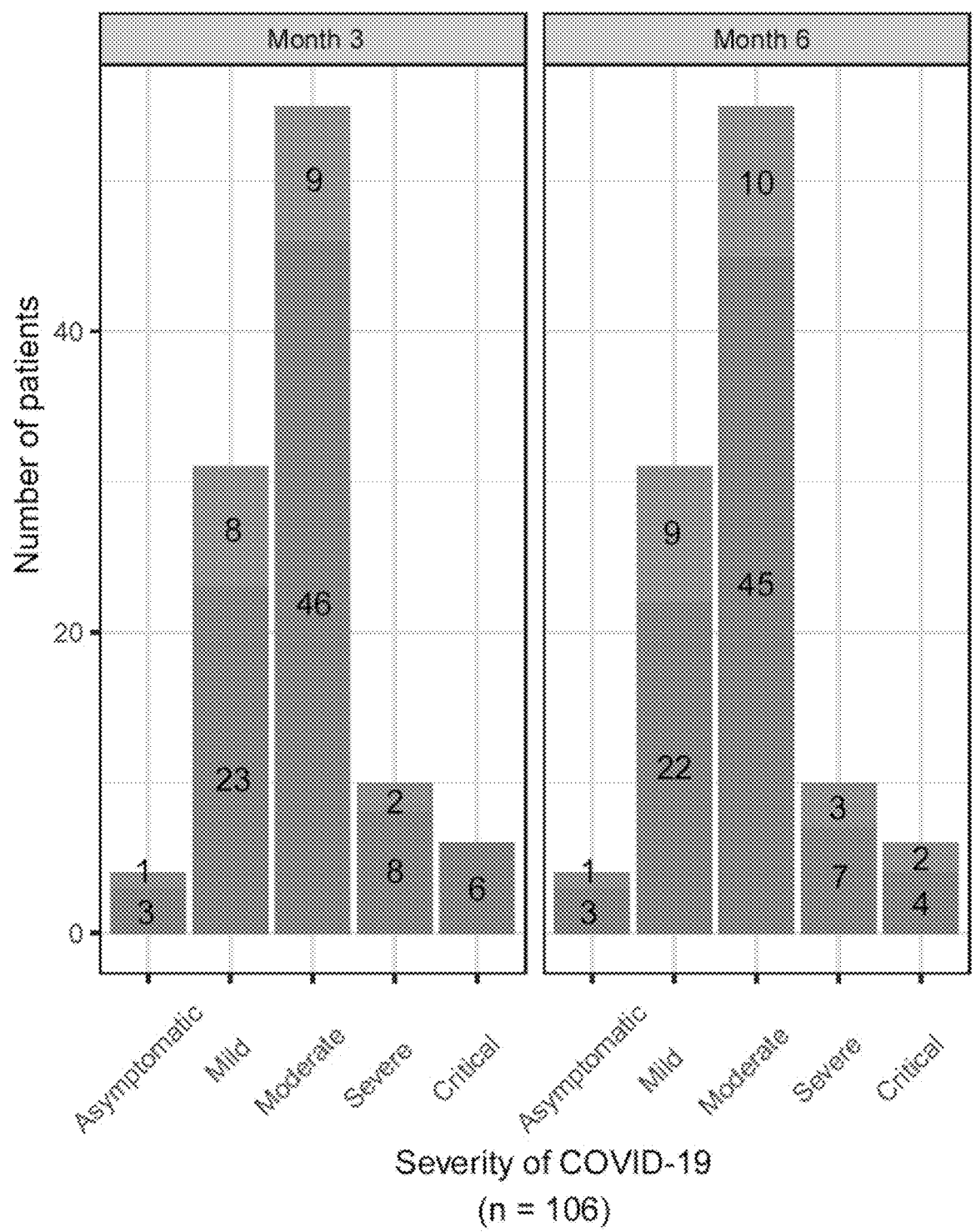
FIG. 4A-FIG. 4B PACS proportion in COVID-19 patients.
Figure 4B:
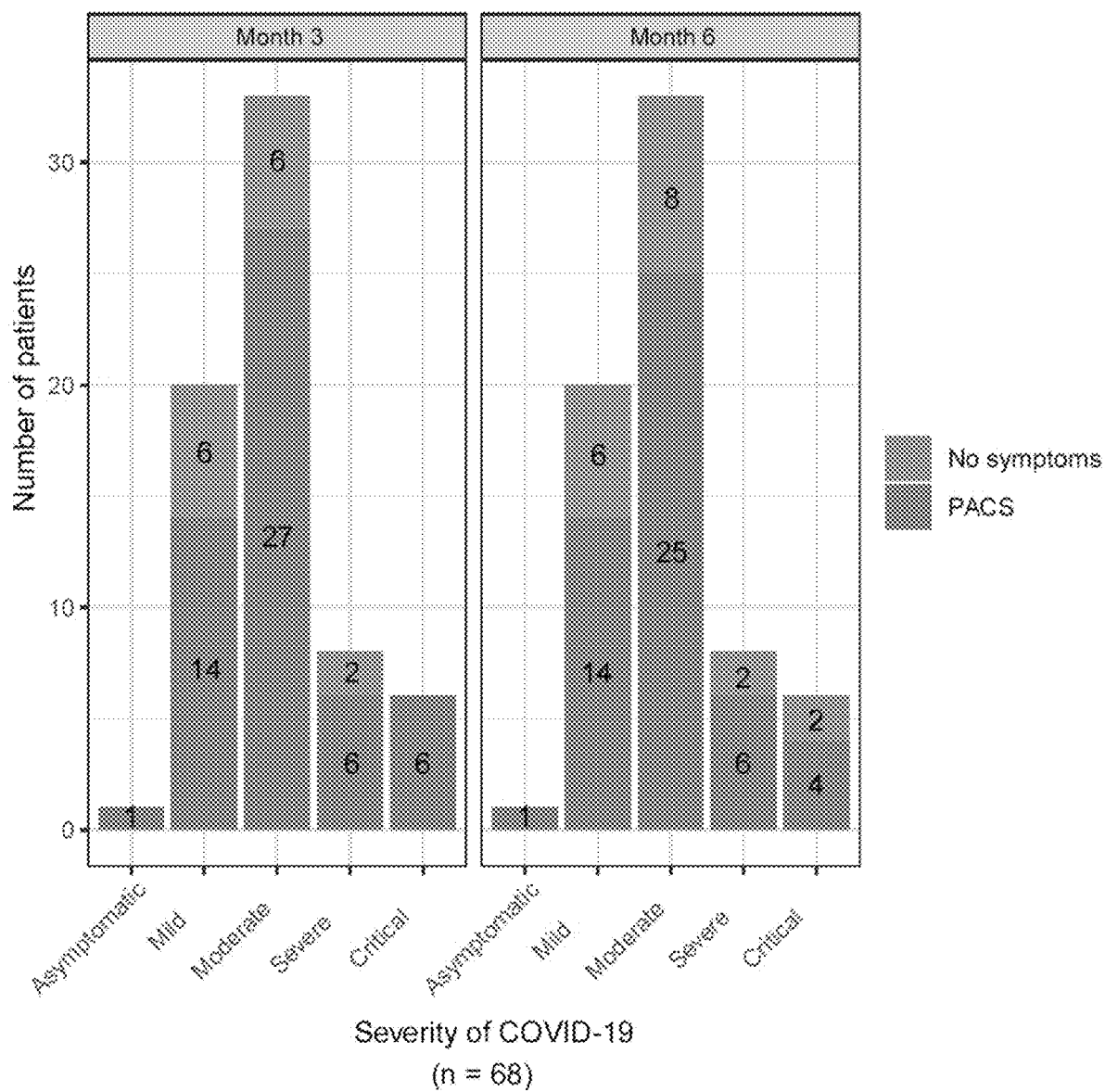
Figure 5A:
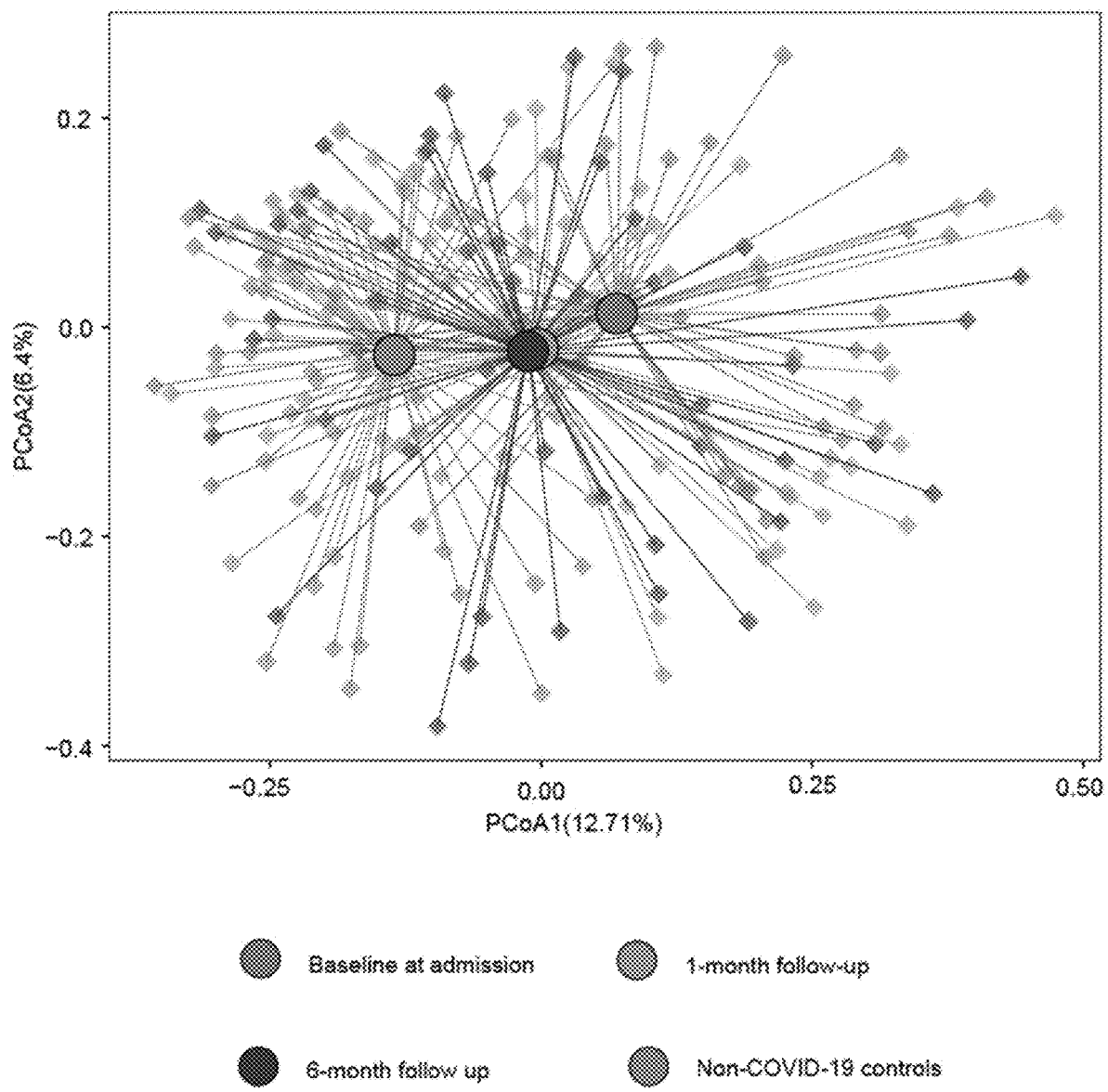
FIG. 5A-FIG. 5E Compositional differences in gut microbiota of in-hospital patients and their follow-up stools after negative SARS-CoV-2, and non-COVID-19 individuals.
Figure 5B:
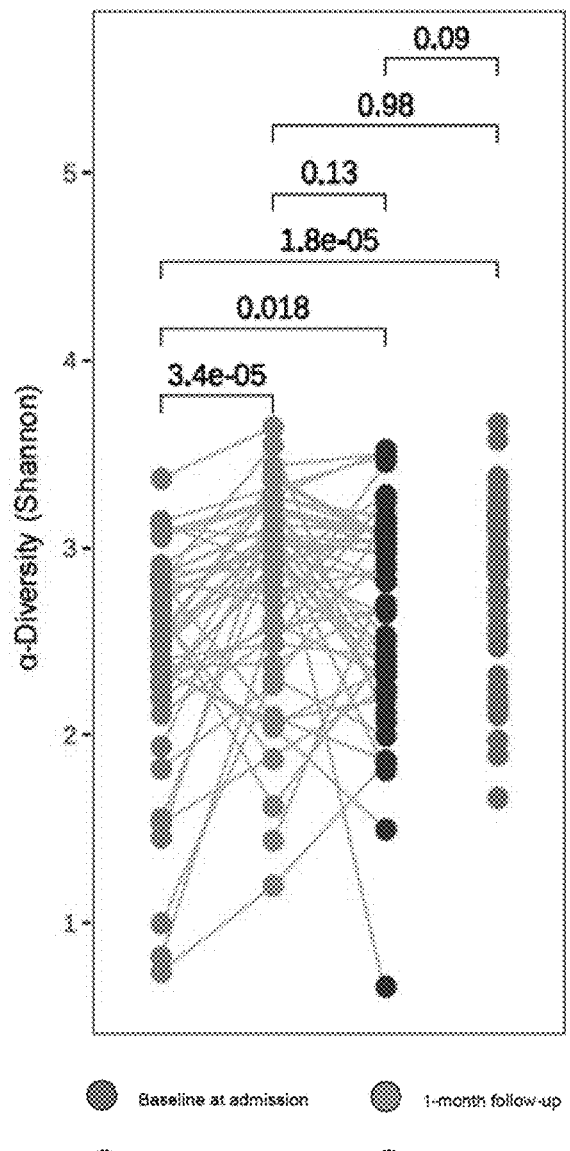
Figure 5C:
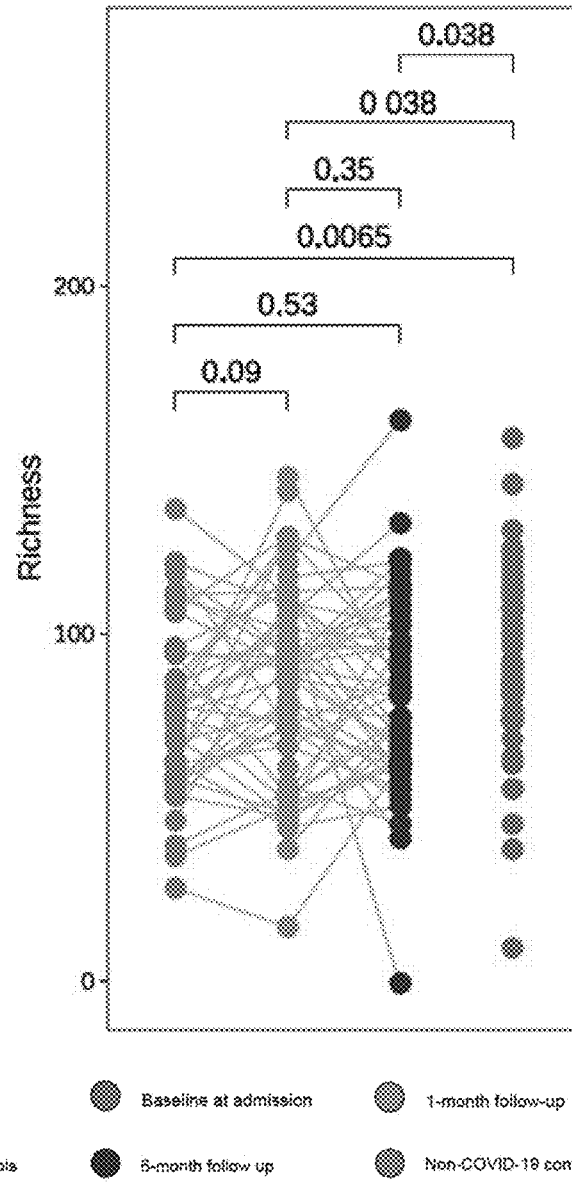
Figure 5D:
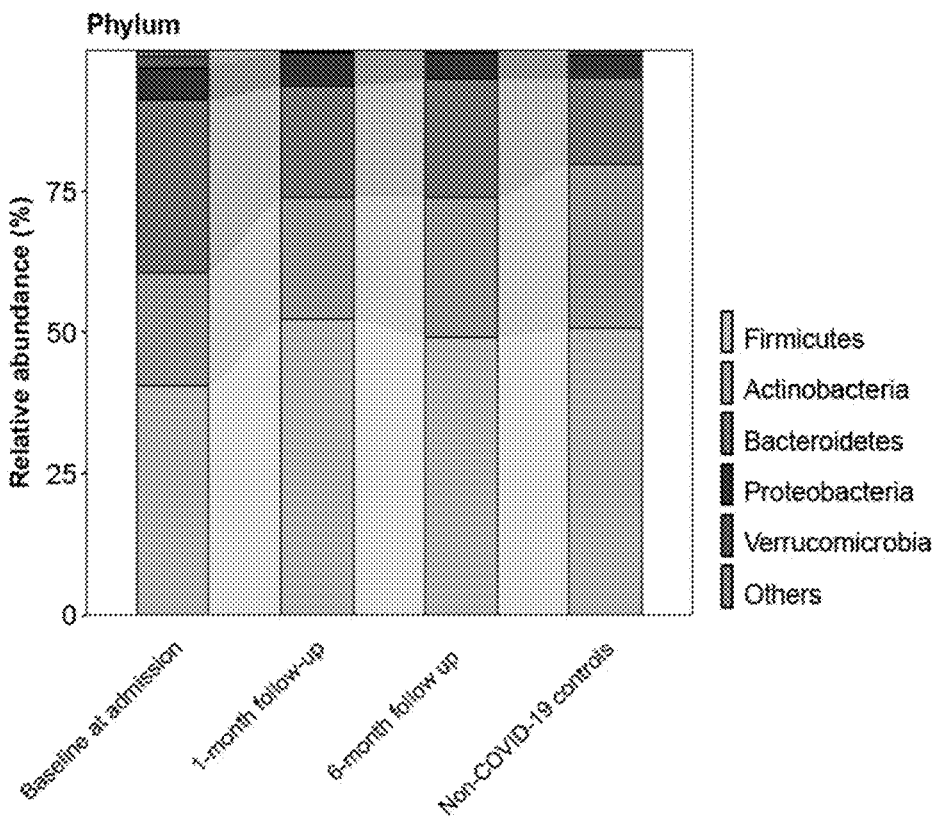
Figure 5E:
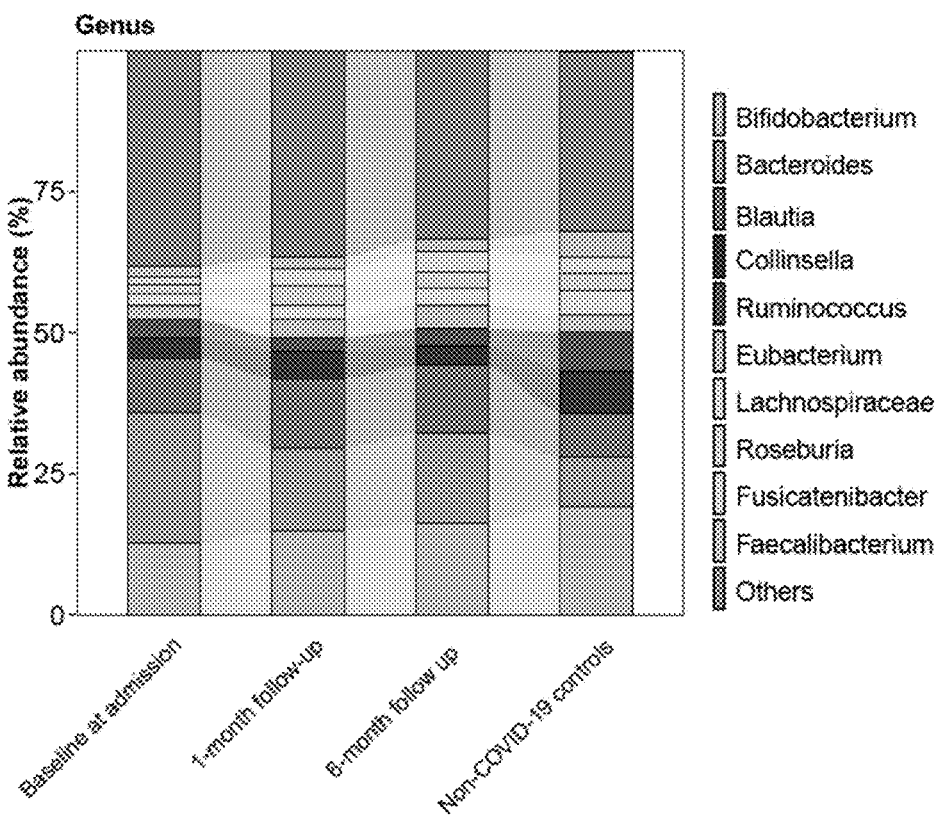
Figure 6A:
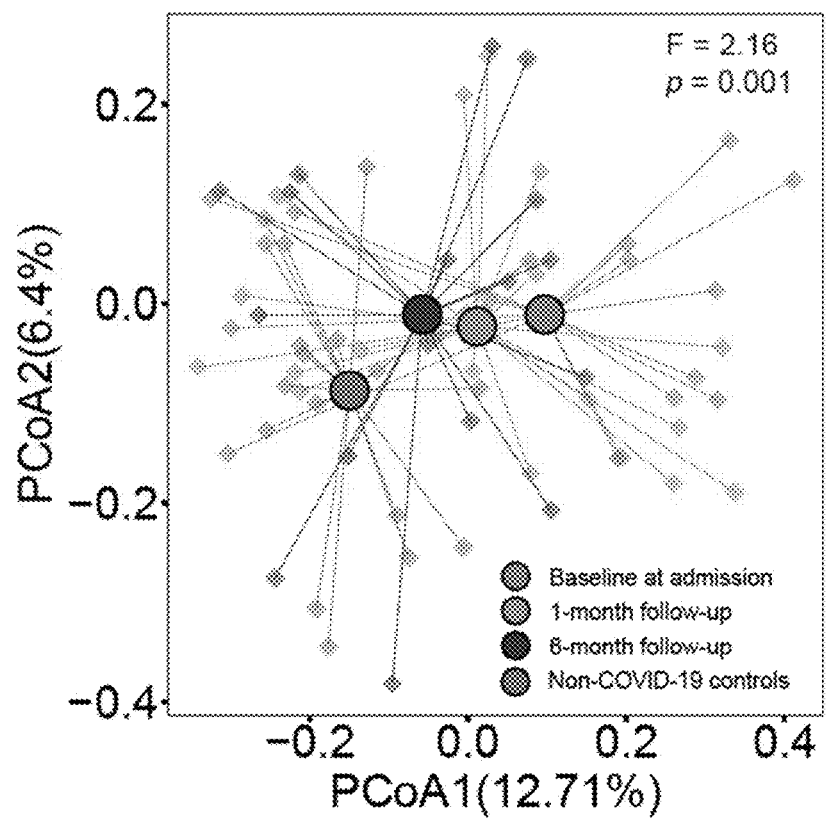
FIG. 6A-FIG. 6B Compositional differences in gut microbiota of in-hospital patients with antibiotics and their follow-up stools after negative RT-qPCR for viral RNA in nasopharyngeal swabs, and non-COVID-19 individuals.
Figure 6B:
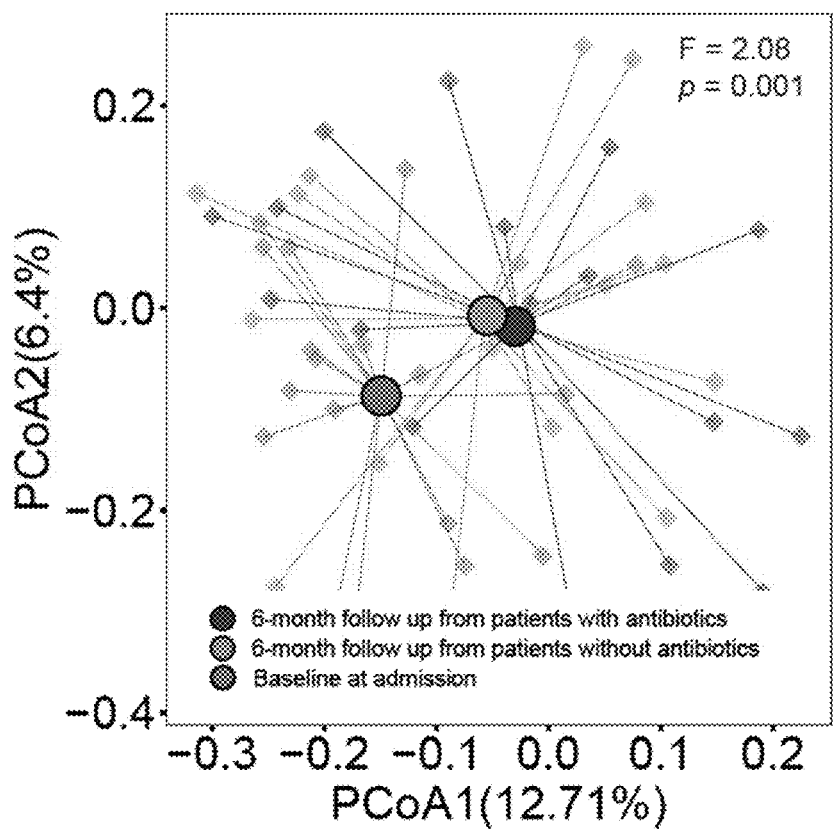
Figure 7A:
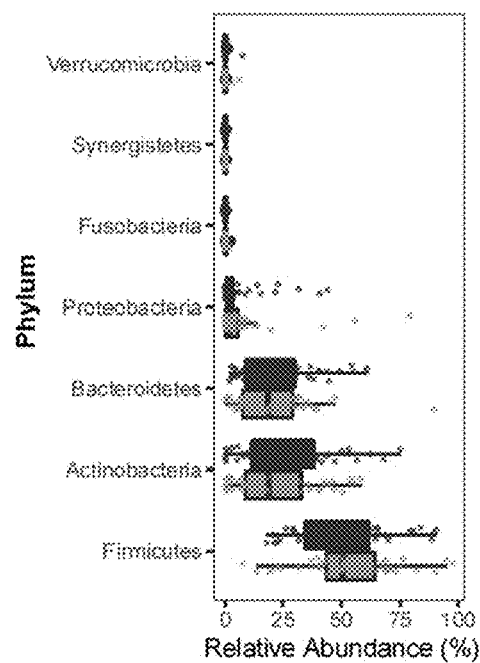
FIG. 7A-FIG. 7F Compositional differences in gut microbiota of follow-up samples at different time points after virus clearance.
Figure 7B:
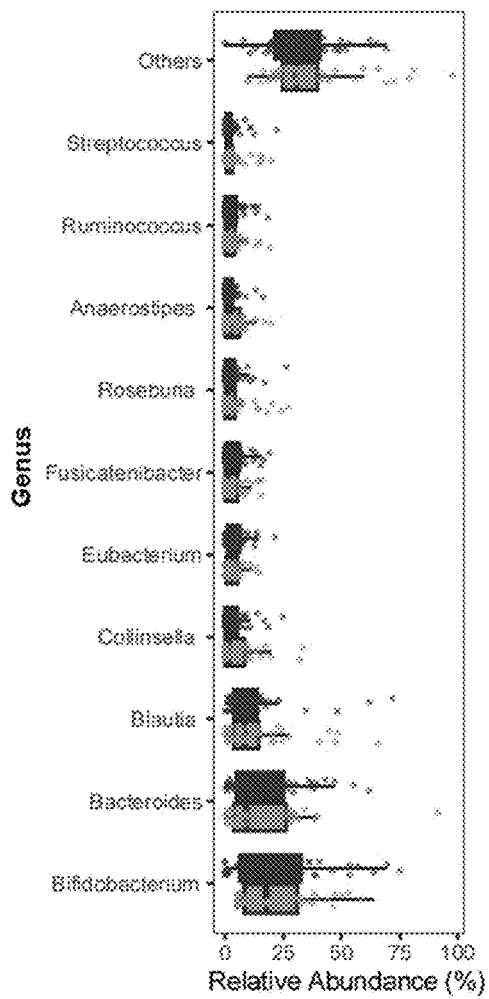
Figure 7C:
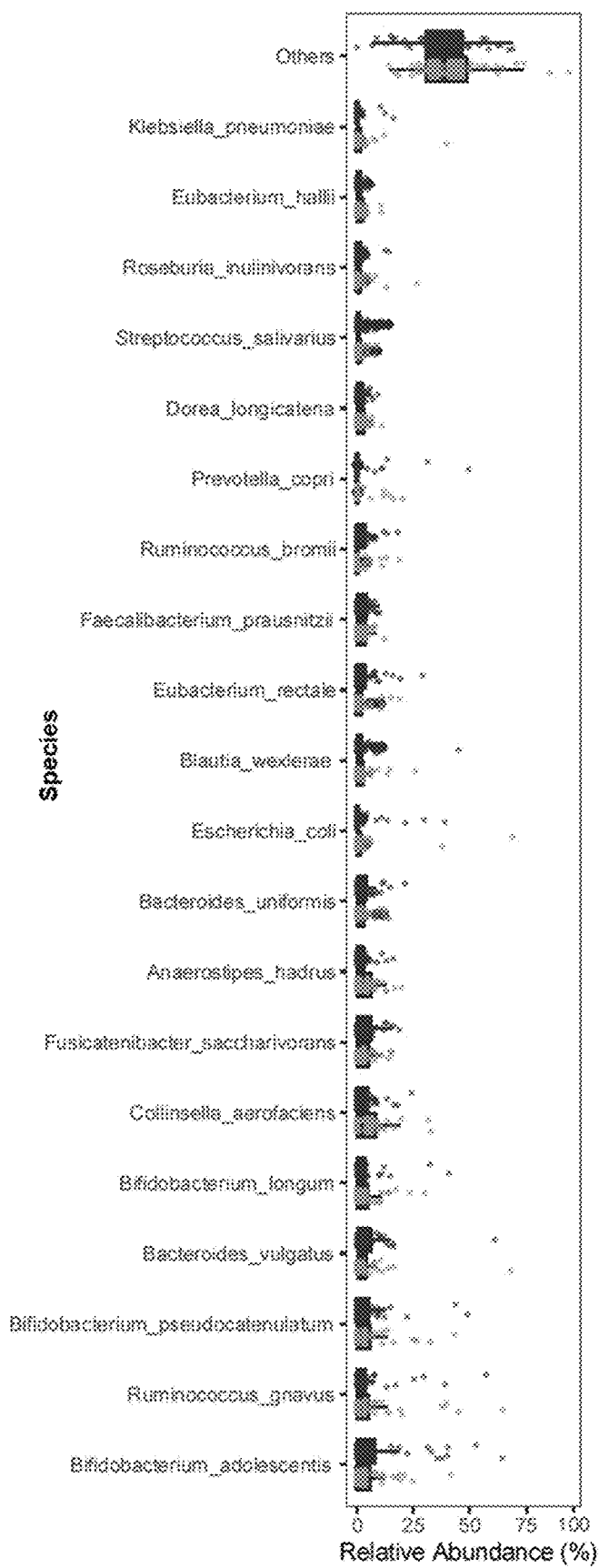
Figure 7D:
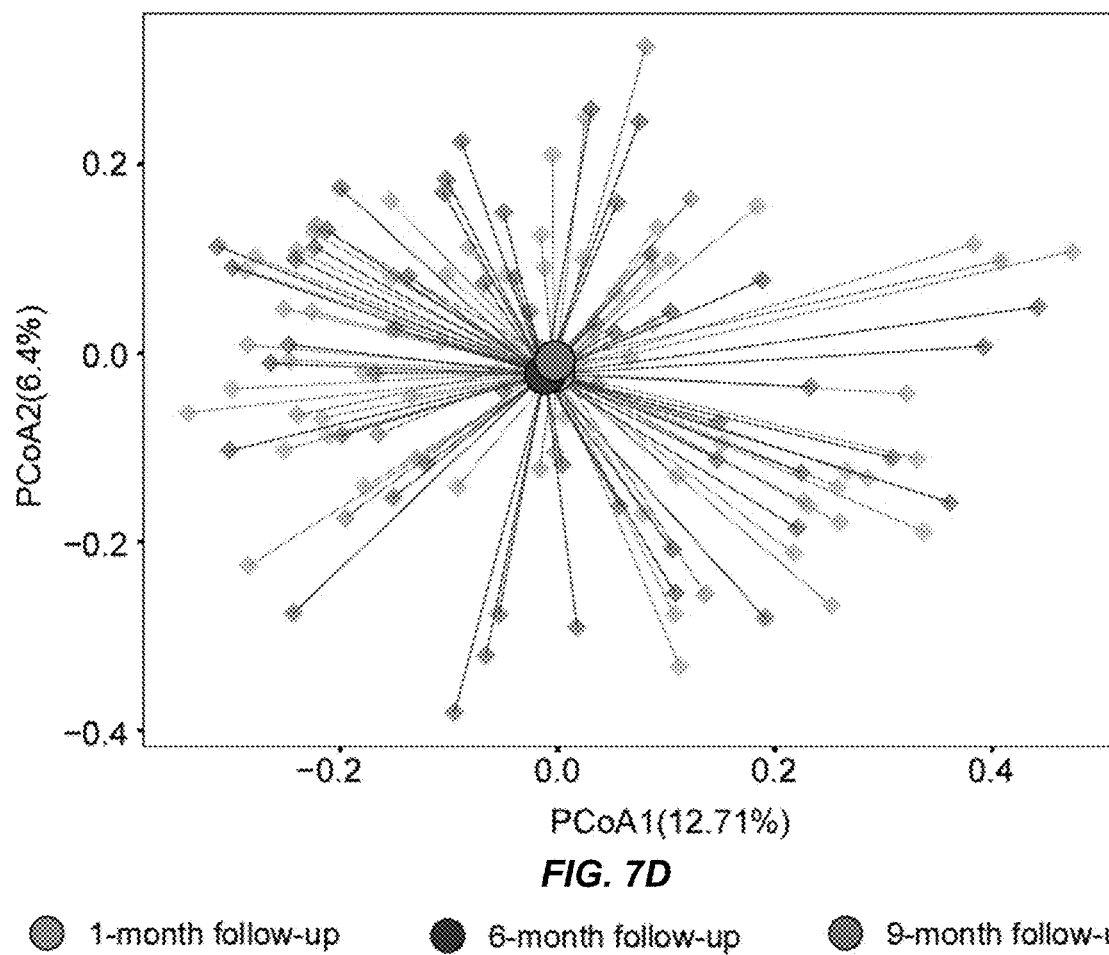
Figure 7E:
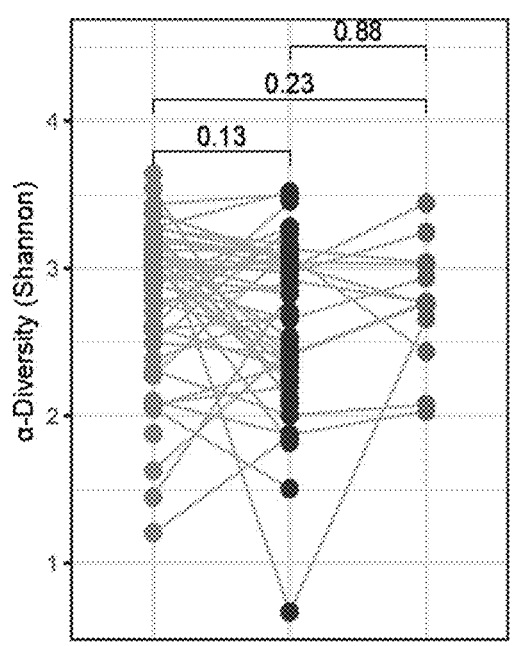
Figure 7F:
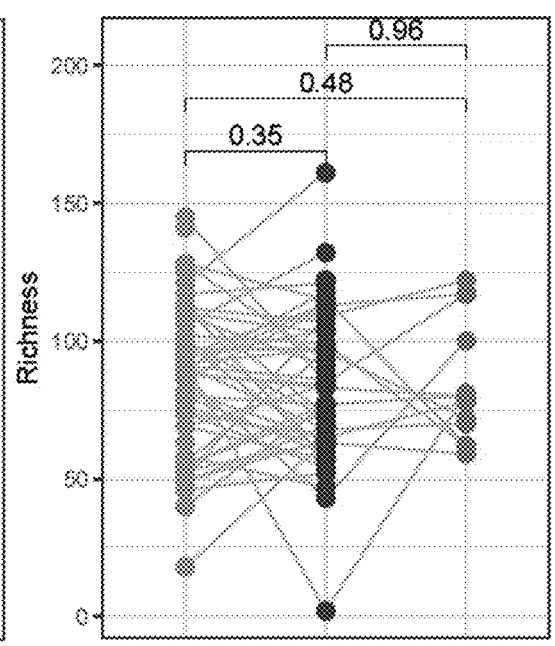
Figure 8A:
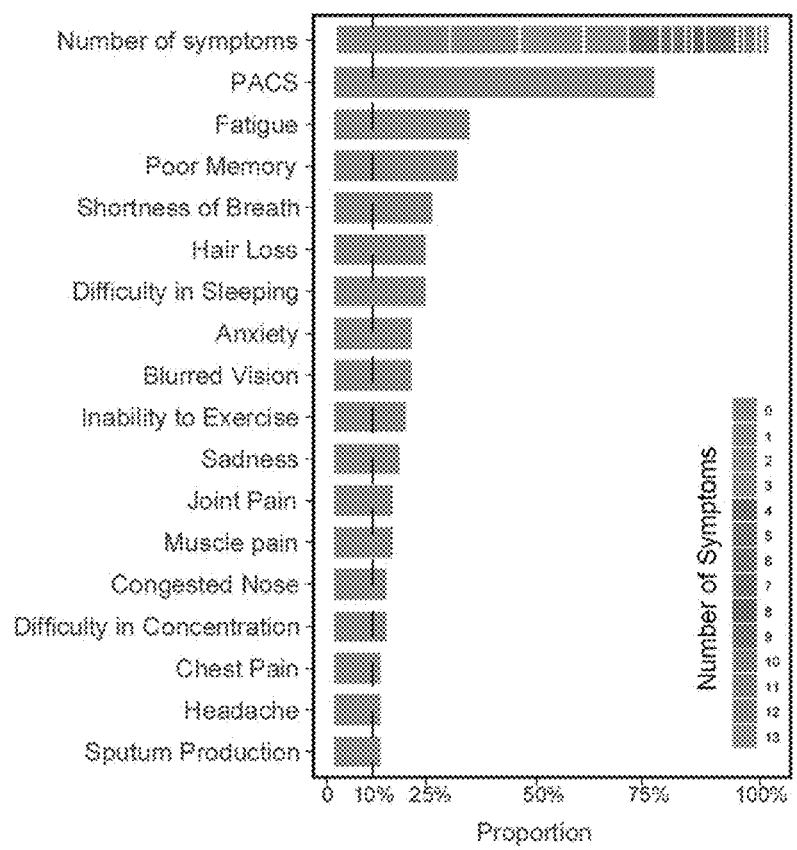
FIG. 8A-FIG. 8B Post-acute COVID-19 syndrome (PACS) after virus clearance in 68 patients with serial stool samples.
Figure 8B:
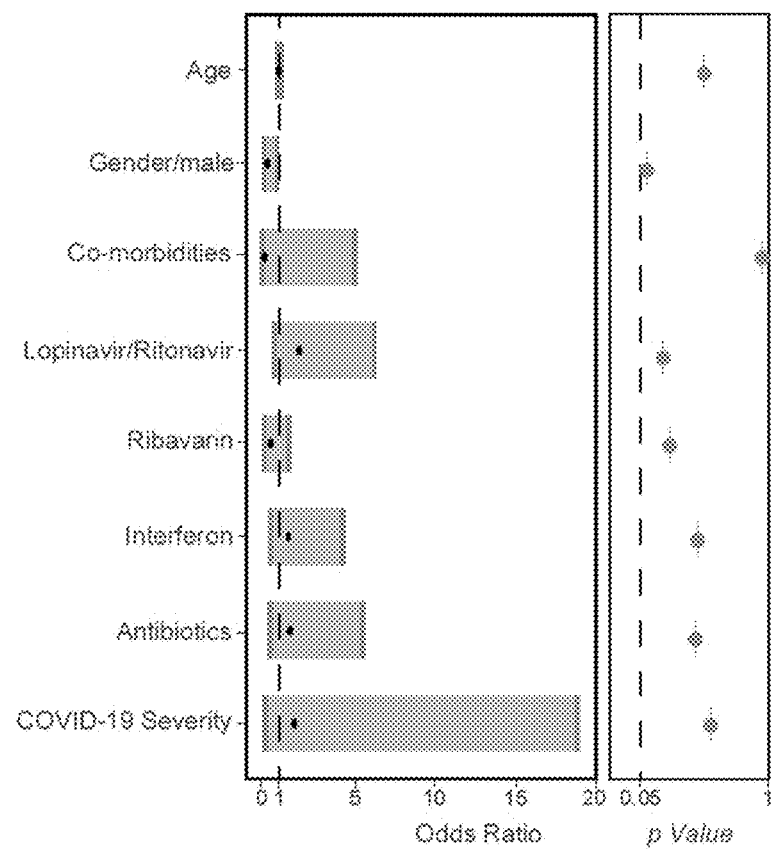

A total of 81 bacterial species were associated with different categories of PACS and many of the bacteria species were associated with more than two categories of persistent symptoms (FIG. 2C, Table 16). At six months, gut microbiome composition in patients with persistent respiratory symptoms were positively correlated with a number of opportunistic pathogens including *Streptococcus anginosus* group, *Streptococcus vestibularis*, *Streptococcus gordonii* and *Clostridium disporicum*, whereas abundance of nosocomial pathogens linked to opportunistic infections including *Clostridium innocuum*, and *Actinomyces naeslundii*, were correlated with neuropsychiatric symptoms and fatigue. Butyrate-producing species such as *Roseburia inulinivorans*, *Faecalibacterium prausnitzii*, and *Roseburia hominis* were significantly depleted in patients who had persistent hair loss at six months (n=23), compared with non-COVID-19 controls (P<0.05, Table 16). Furthermore, relative abundance of multiple bacterial species known to be beneficial to host immunity including *Bifidobacterium pseudocatenulatum*, *F. prausnitali*, *R. inulinivorans* and *Roseburia hominis* showed the largest inverse correlations with PACS at six months (FIG. 2C, Table 16, Table 17).

It was discovered that very few patients were admitted to an intensive care unit or required mechanical ventilation, yet many developed PACS suggesting that persistent symptoms are unlikely to be the result of post critical illness syndrome. Loss of several symbionts including the genera Bifidobacteria, *Roseburia*, and Faecalibacteria known to have immunomodulatory functions were especially associated with persistent symptoms among recovered COVID-19 patients. The latter two bacteria are important short-chain acid (SCFAs) producers and major players in maintenance of immune homeostasis. SCFAs have been shown to alter chemotaxis and phagocytosis, induce reactive oxygen species, change cell proliferation and function, and have antimicrobial and anti-inflammatory effects.

A method is therefore provided for preventing and alleviating these symptoms by supplementation of these beneficial bacterial listed in Table 1 and Table 3. As these symptoms can also occur in the any persons including people with no history of COVID-19, such a method can be applied to anyone concerning these symptoms.

Machine Learning Model to Predict Risk of PACS

Species listed in Table 2, and preferably *Bifidobacterium longum* (NCBI:txid216816), *Blautia wexlerae* (NCBI: txid418240), *Bifidobacterium pseudocatenulatum* (NCBI: txid28026), *Faecalibacterium prausnitzii* (NCBI:txid853), *Fusicatenibacter saccharivorans* (NCBI:txid1150298), can be used in different combinations to build a risk assessment model to determine whether a person is at risk of PACS of COVID-19 after the person was tested positive for COVID-19.

To determine the risk of PACS in a subject, the following steps will be carried out:

(1) Obtain a set of training data by determine the relative abundance of species selected from Table 12 in a cohort of COVID-19 patients with and without PACS at the time of initial diagnosis of COVID-19, such as at admission to hospital.

(2) Determine the relative abundance of these species in the subject who is being tested for the risk of PACS.

(3) Compare the relative abundance of these species in the subject with the training data using random forest model.

(4) Decision trees will be generated by random forest from the training data. The relative abundances will be run down the decision trees and generate a risk score. If at least 50% trees (possibility >0.5) in the model consider the subject as COVID-19 patients having PACS, the subject being tested is deemed to have an increased risk for PACS. If less than 50% trees (possibility <0.5) in the model consider the subject as COVID-19 patients not having PACS, the subject being tested is deemed to not have an increased risk for PACS.

Supplementation of Beneficial Bacterial to Improve Functional Capacity

Figure 10A:
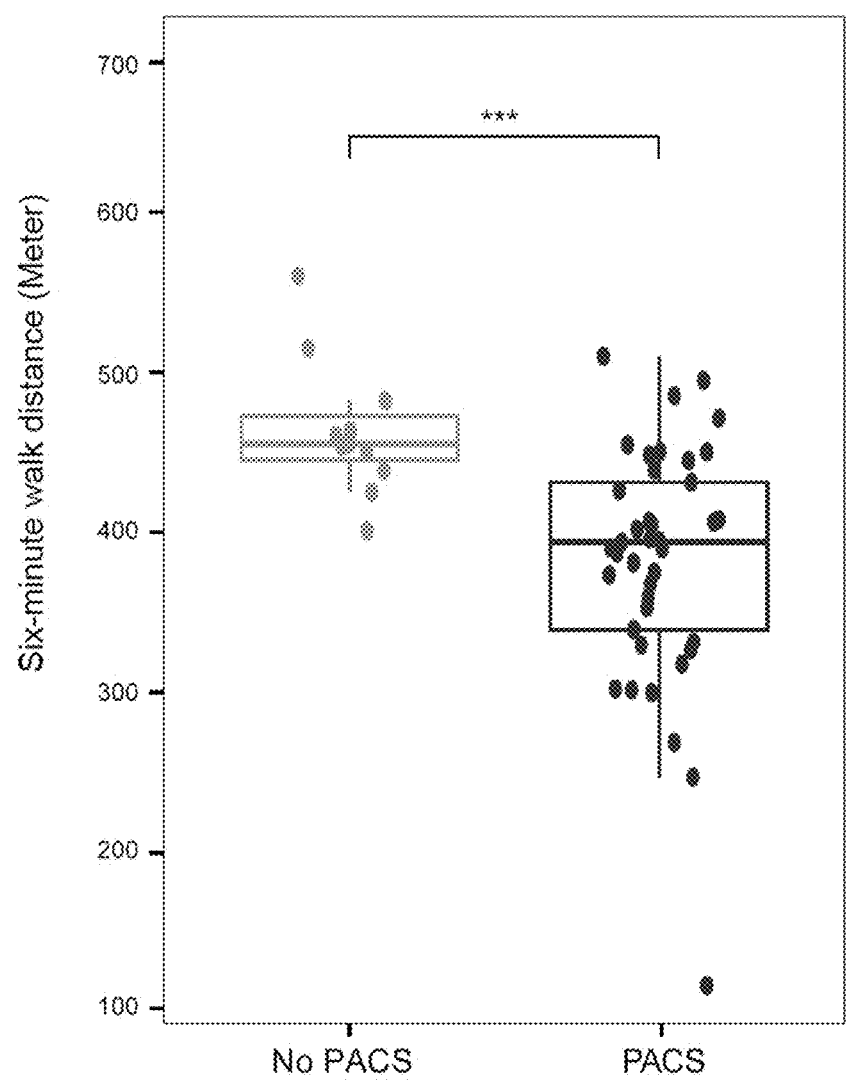
FIG. 10A-FIG. 10B Six-minute walk distance (6MWD) correlate with gut bacteria composition.

The 6-minute walk test (6MWT) is frequently used to determine functional capacity in patients[4]. Previous work has shown that post-convalescence patients with lower microbiota richness had impaired lung function[6], however, the cause of reduced 6-minute walk distance after COVID-19 remains unknown. Of the 68 COVID-19 patients who had provided stool samples at six-month follow up, 52 of them had 6-minute walk test assessment at six months. The median walking distance at 6 minutes in patients with PACS was significantly lower than those without PACS (mean 464 meter vs 382 meter, P<0.001, FIG. 10A). The walking distance was positively correlated with several short-chain fatty acid (SCFA) and butyrate producers of the gut microbiome including *Bifidobacterium pseudocatenulatum*[7], *Roseburia inulinivorans*[8] and *Bacteroides ovatus*[9], implying beneficial symbiosis between human and gut-lung-microbiome axis after clearing the virus. Supplementation of these SCFA and butyrate producers (*Bifidobacterium pseudocatenulatum, Roseburia inulinivorans* and *Bacteroides ovatus*) could therefore improve functional capacity.

Figure 10B:
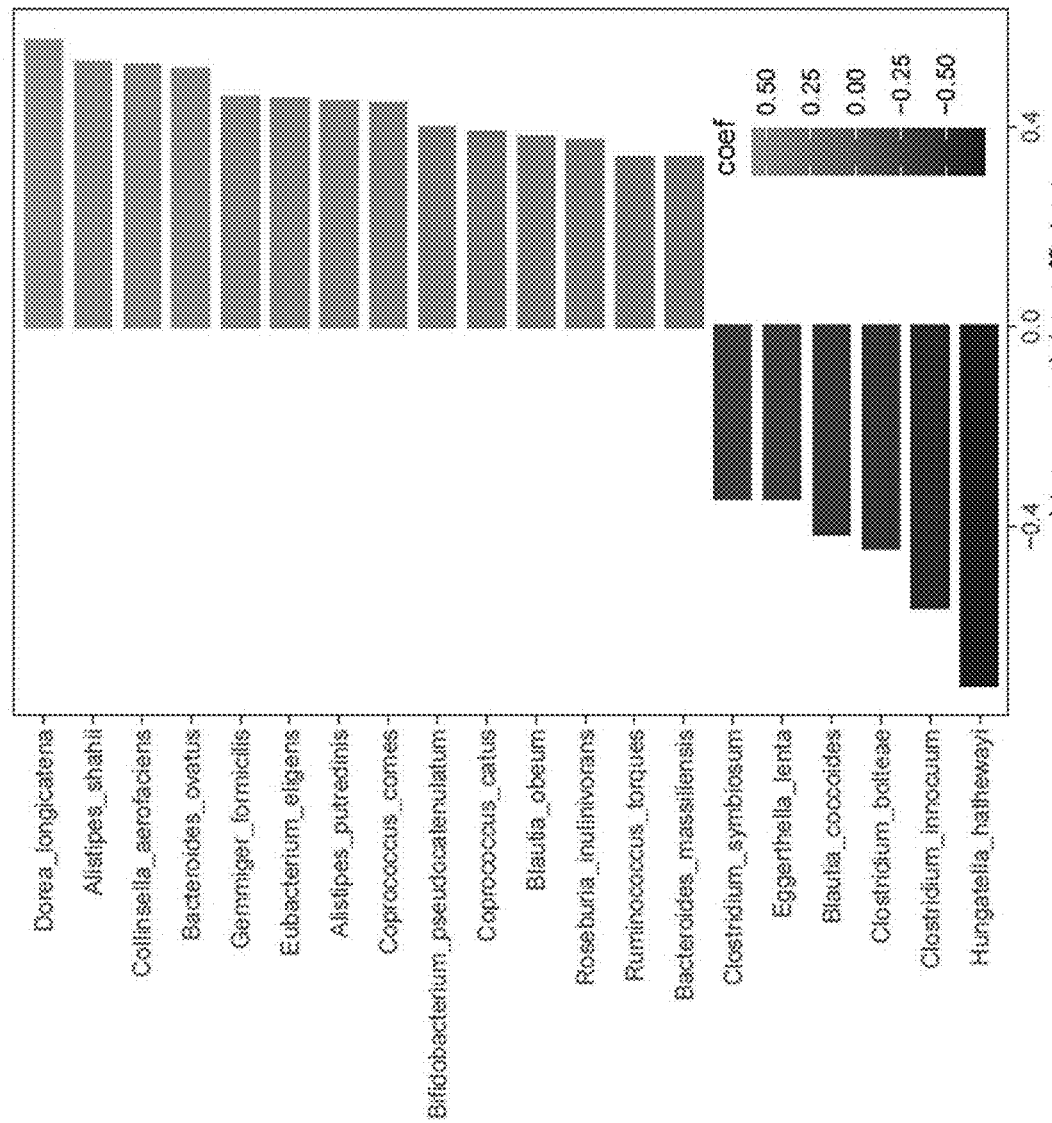

Significant inverse associations of walking distance with pathogenic bacteria species (for example, *Clostridium innocuum, Clostridium bolteae*) were also observed, which could confer pathogenicity or were associated with disease risk in different populations[10, 11] (P<0.05, FIG. 10B). Reducing the bacteria listed in FIG. 10B also could improve functional capacity.

Supplementation of Beneficial Bacteria to Prevent or Alleviate Overall PACS

Figure 1D:
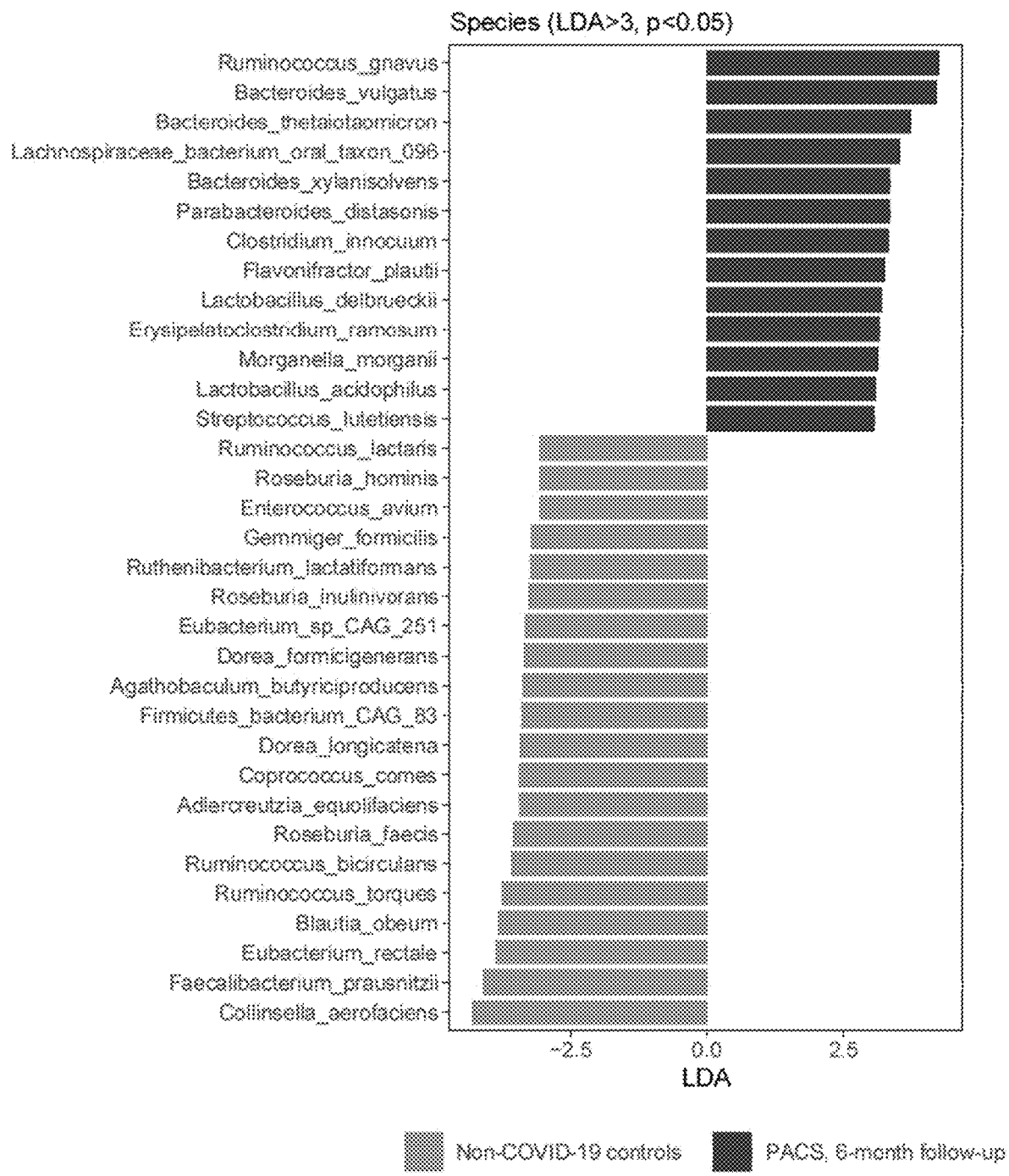
Figure 9A:
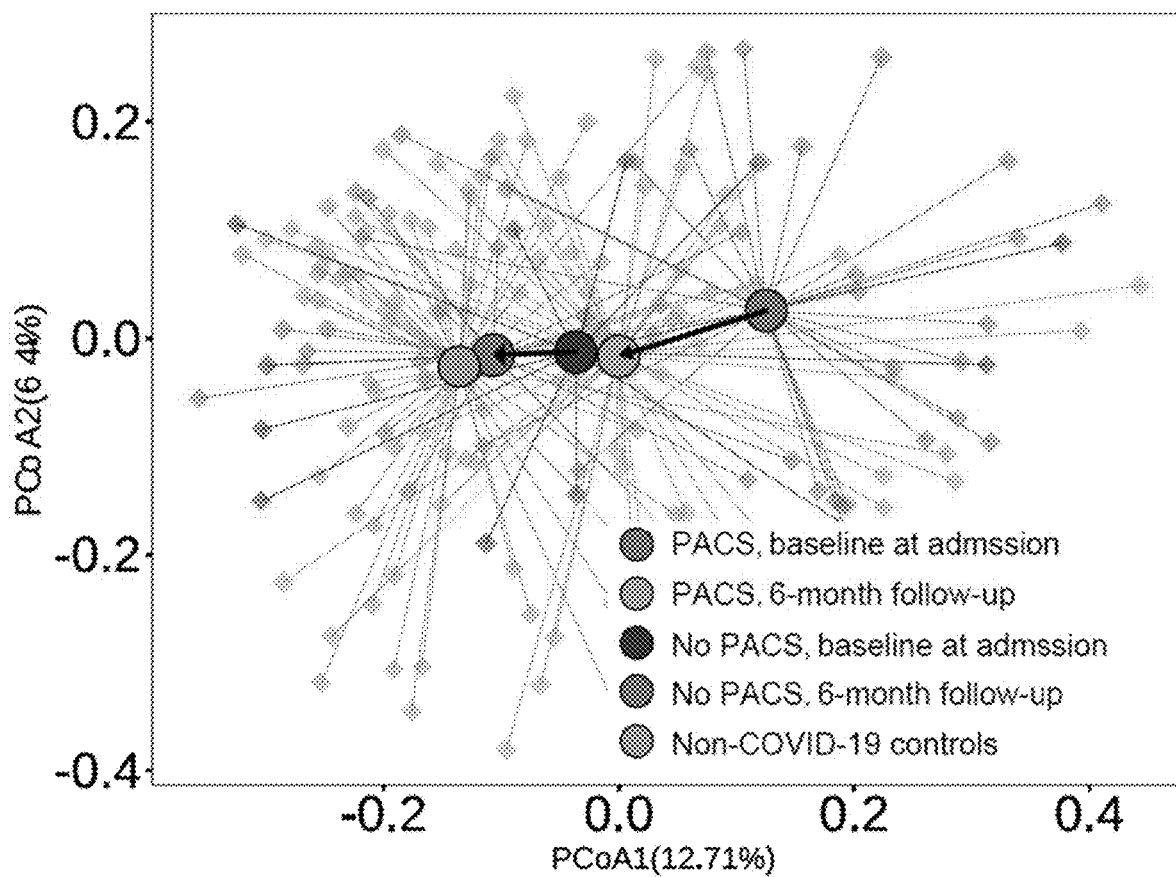
FIG. 9A-FIG. 9E Compositional differences in gut microbiota of baseline and follow-up samples at different time points after virus clearance.
Figure 9B:
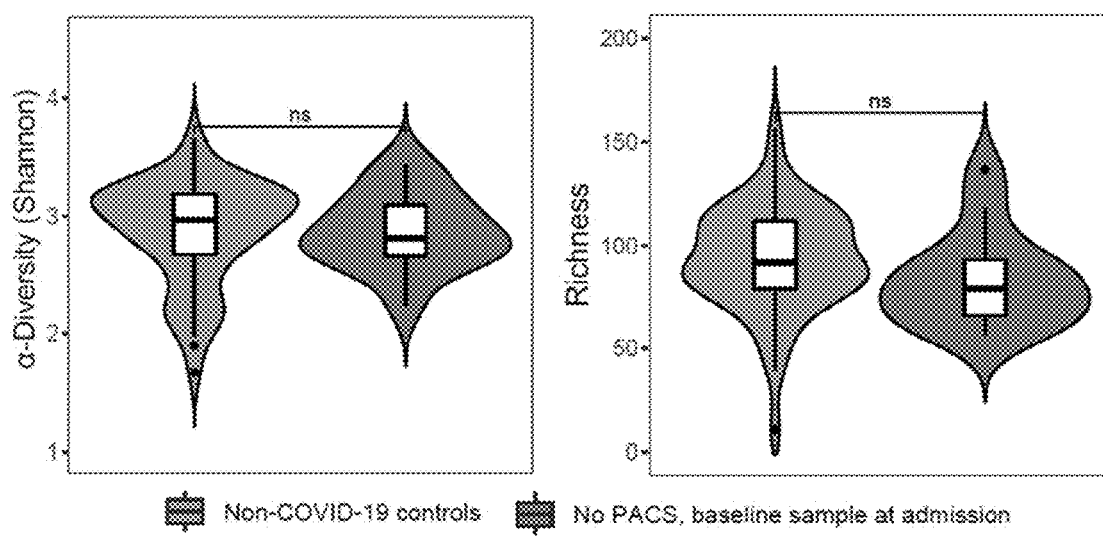
Figure 9C:
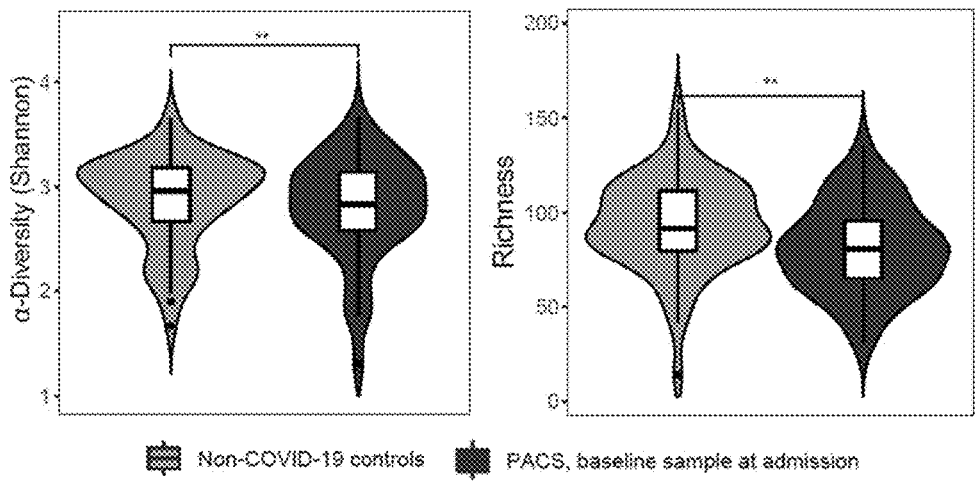
Figure 9D:
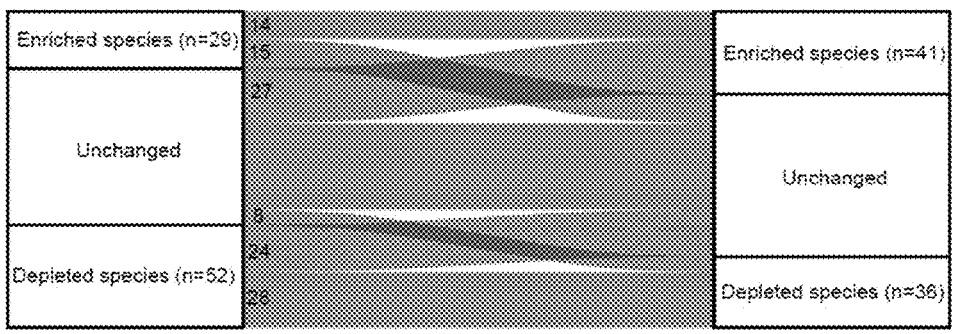
Figure 9D:
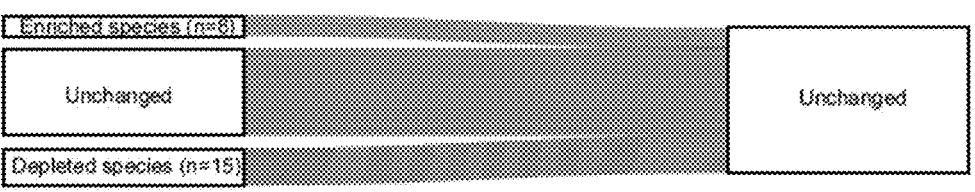
Figure 9E:
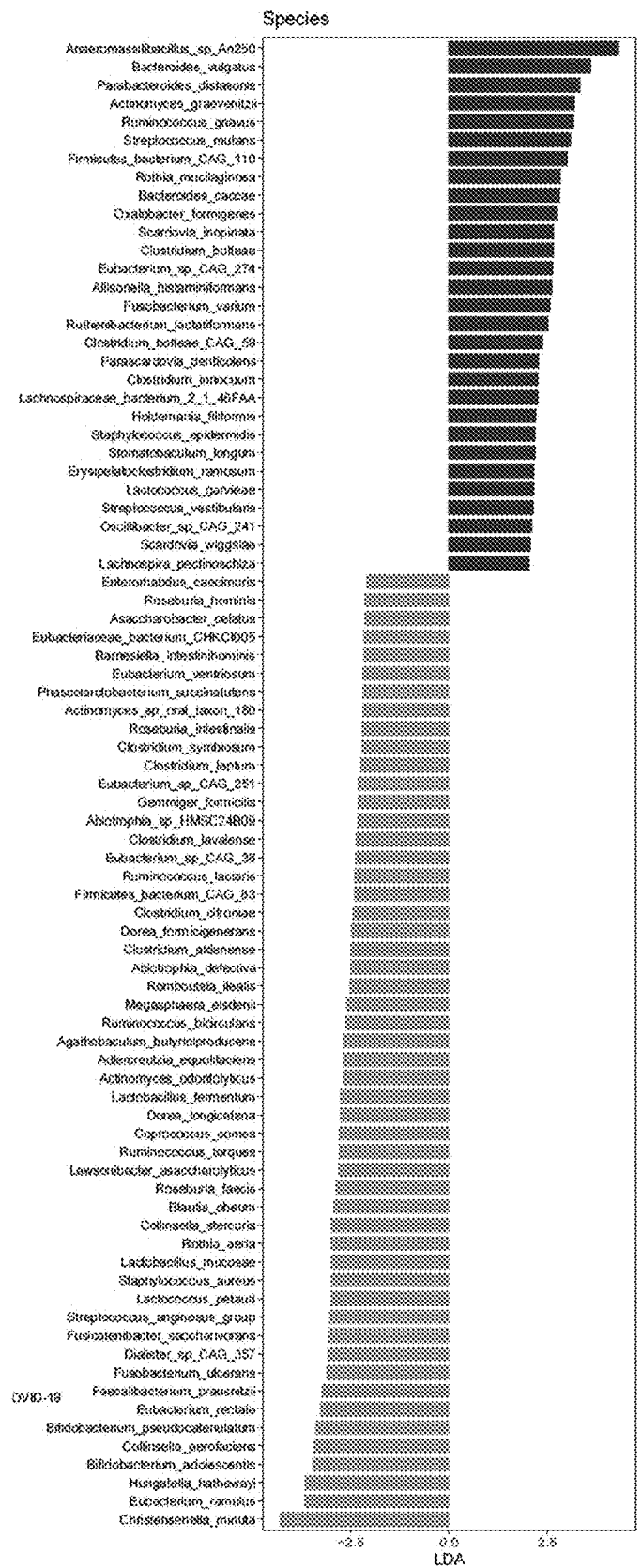

Amongst gut bacteria species detected in patients with PACS, 28 bacteria species were diminished and 14 were enriched at baseline and follow-up samples (FIG. 9D, 9E, Table 11, Table 12). At six months, patients with PACS showed significantly lower level of Collinsella aerofaciens, F. prausnitzii, Blautia obeum and higher level of Ruminococcus_gnavus, Bacteroides_vulgatus compared with non-COVID-19 controls (P<0.05, Linear discriminant analysis Effect Size >2, LefSe) (FIG. 1D, Table 12). Subjects without PACS only had 22 bacteria species alterations at admission which recovered completely by six months (FIG. 9D, Table 13).

Bacteria species such as Christensenella minuta, Eubacterium ramulus, Bifidobacterium adolescentis were found to be depleted at baseline sample of patients who developed PACS at six months (P<0.05, LefSe >2, FIG. 9E, Table 11). A total of 13 bacteria species including B. wexlerae and B. longum at admission negatively correlated with PACS at six months indicating the putative protective role of these species in the recovery from SARS-CoV-2 infection (FIG. 11B, FIG. 11C) whereas Actinomyces_sp_S6_Spd3. Actinomyces_johnsonii and Atopobium_parvulum were positively correlated with PACS. Overlap of bacteria species such as R. gnavus, C. innocuum, Erysipelatous ramosum was found that remained altered from baseline to follow-up and exhibited association with several PACS symptoms (FIG. 11D), further implying the link between altered gut microbiome and the recovery process in COVID-19 patients. These findings altogether suggest that an individual's gut microbiome configuration at admission may affect the subject's susceptibility to long-term complications of COVID-19.

Figure 11A:
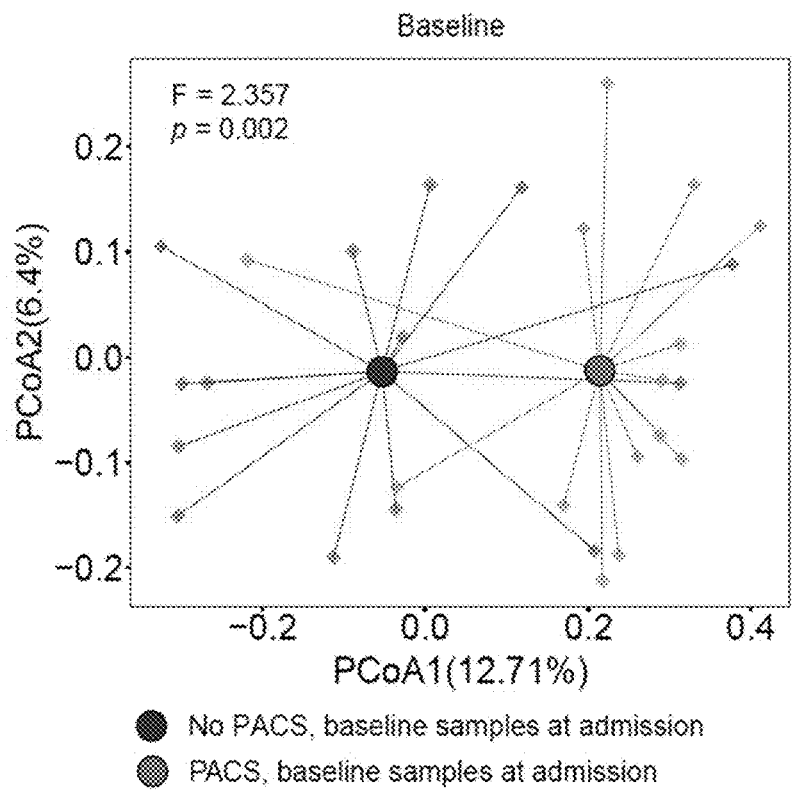
FIG. 11A-FIG. 11D Gut microbiota composition at admission of patients with COVID-19 who had or had not any persistent symptoms at six months.
Figure 11B:
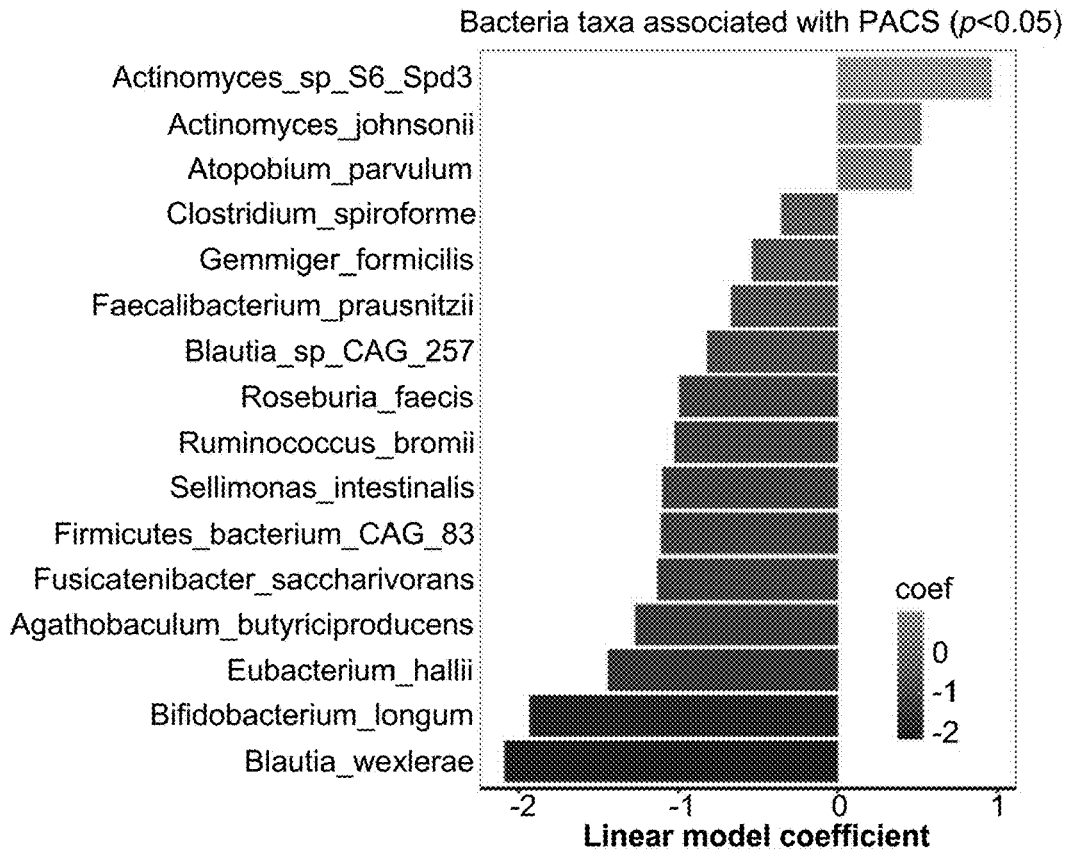
Figure 11C:
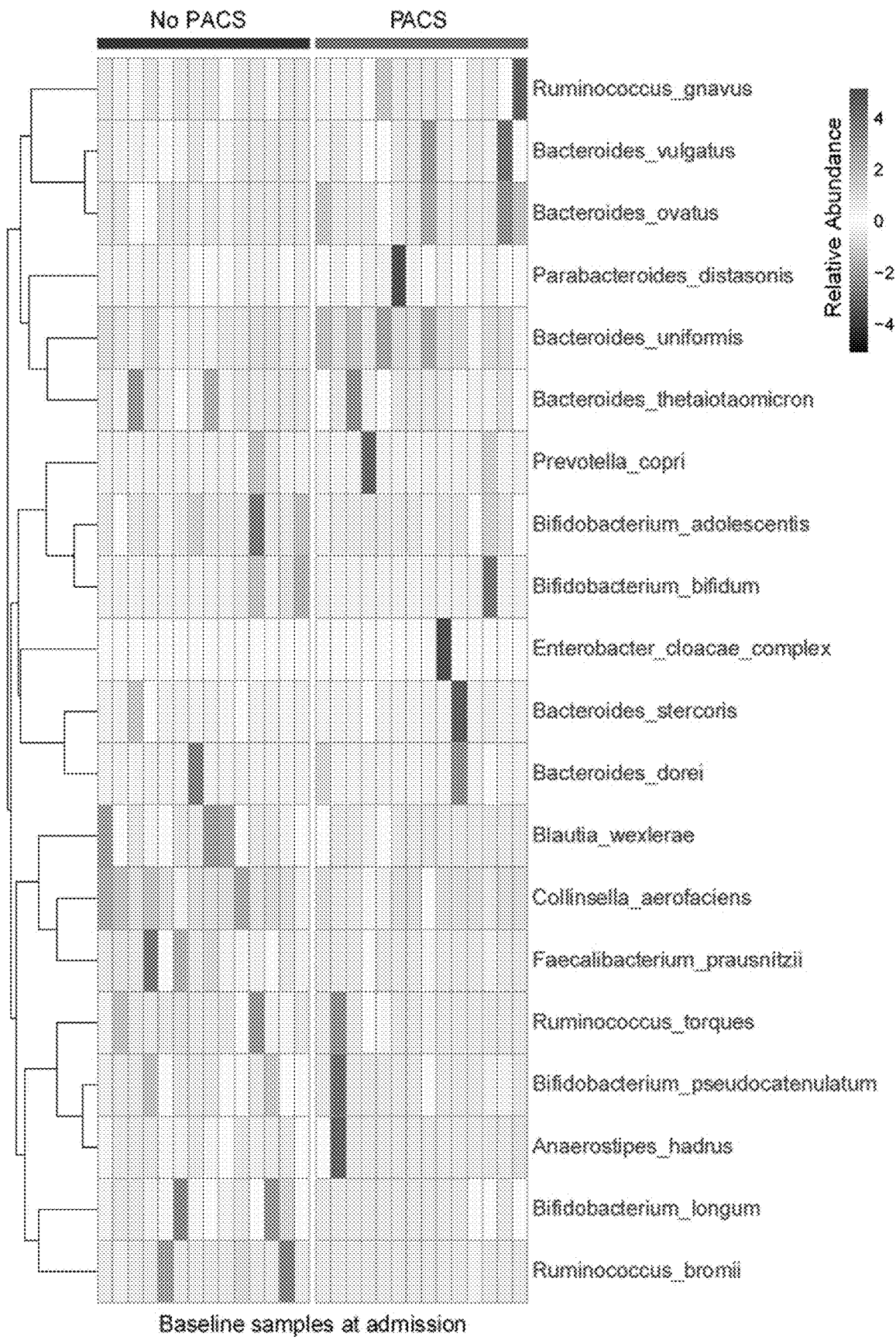
Figure 11D:
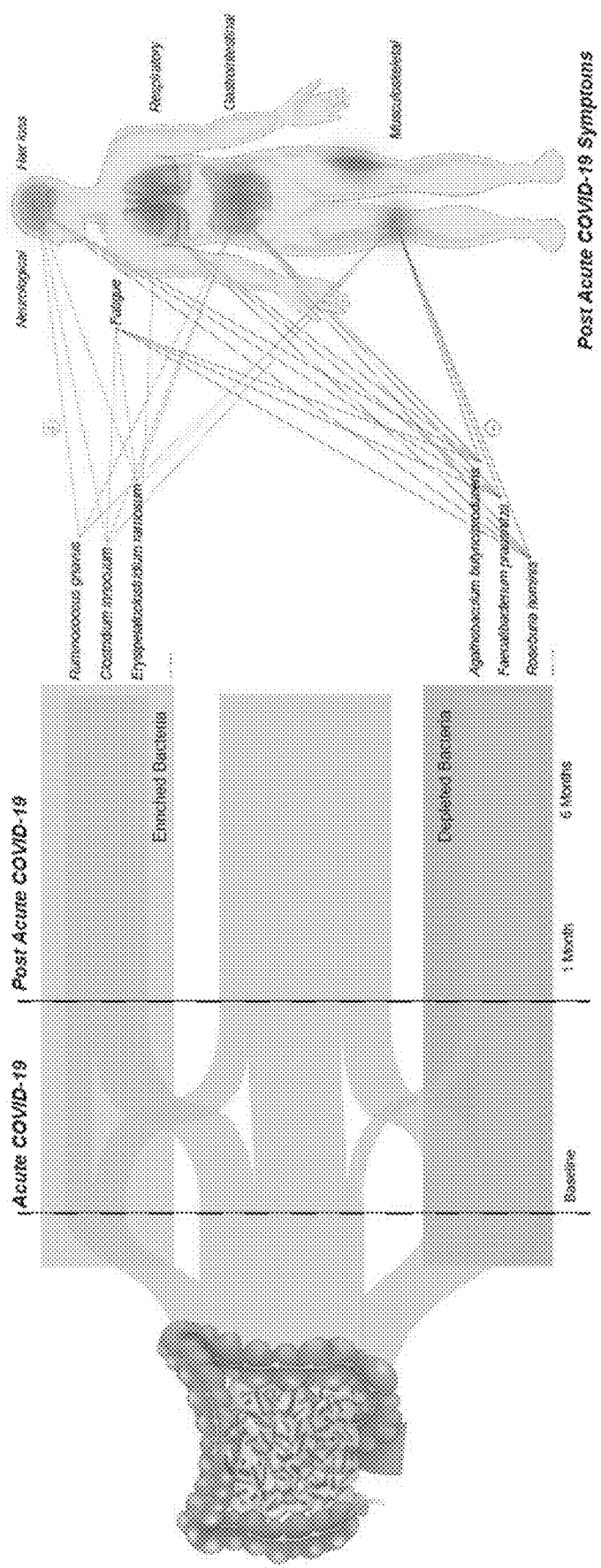

A composition comprising one or more beneficial bacteria selected from Table 3 or FIG. 9E (grey, Non-COVID-19 controls), Table 11 (group=Non-Covid-19 controls), FIG. 1D (orange, Non-COVID-19 controls), Table 12 (group=Non-Covid-19 controls), FIG. 11B (coef <0). These bacteria can be administered in combination or as single probiotic to prevent or alleviate symptoms of PACS in a subject. Preferably, the bacteria are selected from the group consisting of Bifidobacterium longum (NCBI:txid216816), Blautia wexlerae (NCBI:txid418240), Streptococcus salivarius (NCBI:txid1304), Fusicatenibacter_saccharivorans (NCBI:txid 1150298), Firmicutes_bacterium CAG 83 (NCBI:txid 1262992), Gemella_sanguinis (NCBI:txid 84135), Streptococcus_australis (NCBI:txid 113107), Eubacterium_hallii (NCBI:txid411469), Faecalibacterium_prausnitzii (NCBI:txid 853), Anaerostipes_hadrus (NCBI:txid 649756).

Methods

Study Population

This prospective cohort study was performed at three regional hospitals (Prince of Wales Hospital. United Christian Hospital and Yan Chai Hospital) in Hong Kong. China. All patients with a confirmed diagnosis of COVID-19, as evidenced by a positive SARS-CoV-2 by reverse transcriptase polymerase chain reaction test in nasopharyngeal swab, nasal swab, deep throat saliva, sputum, tracheal aspirate or stool, were recruited from 1 Feb. to 31 Aug. 2020. All patients with confirmed COVID-19 were required to be hospitalised according to local government policy. Patients could be discharged if they fit either one of the below criteria: two clinical specimens of the same type (i.e., respiratory or stool) tested negative for nucleic acid of SARS-CoV-2 by RT-PCR taken at least 24 hours apart or tested positive for SARS-CoV-2 antibody. Patients were excluded if they were unable to be contacted, declined to participate in study or died before the follow-up visit. Data including demographics, clinical and laboratory data were extracted from electronic medical records in the Clinical Management System of the Hong Kong Hospital Authority. Severity of COVID-19 infection was categorized as (1) mild, if there was no radiographic evidence of pneumonia; (2) moderate, if pneumonia was present along with fever and respiratory tract symptoms; (3) severe, if respiratory rate ≥30/min. oxygen saturation ≤93% when breathing ambient air, or $PaO_2/FiO_2 \leq 300$ mm Hg (1 mm Hg=0.133 kPa); or (4) critical, if there was respiratory failure requiring mechanical ventilation, shock, or organ failure requiring intensive care.[12] Stool samples were collected serially from admission, at one month and at six months after discharge from hospital. Stool samples from in-hospital patients were collected by hospital staff while discharged patients provided stools on day of follow-up at 1 month and 6 months after discharge or self-sampled at home and couriered to the hospital within 24 hours of collection. All samples were collected in collection tubes containing preservative media (cat. 63700. Norgen Biotek Corp. Ontario Canada) and stored immediately at −80° C. until processing. It was previously shown that data of gut microbiota composition generated from stools collected using this preservative medium were comparable with data obtained from samples that were immediately stored at −80° C.[13]. The presence of 30 most commonly reported symptoms post-COVID[14, 15] was assessed at three and six months after illness onset (Table 19). Post-acute COVID-19 syndrome (PACS) was defined as at least one persistent symptom which cannot be explained by alternative diagnosis four weeks after clearance of SARS-CoV-2. Six-minute walk distance test (6MWT), which is a simple functional assessment to assess the aerobic capacity and endurance, was performed at six months after discharge in a subset of recovered COVID-19 patient. The 6MWT distance data were correlated with the gut microbiota analysis. Controls were recruited before the COVID-19 pandemic (between 2019 and 2020) from the community through advertisement and from the endoscopy centre at the Prince of Wales Hospital in subjects who had a normal colonoscopy (stools collected before bowel preparation). Aged- and gender-matched controls with similar co-morbidities and standard dietary pattern were selected for comparison of gut microbiota composition between subjects with and without COVID-19 infection. Demographics and co-morbidities of controls were listed in Table 8. The exclusion criteria for non-COVID-19 controls were (1) the use of laxatives or anti-diarrheal drugs in the last 3 months; (2) recent dietary changes (e.g., becoming vegetarian/vegan); (3) known complex infections or sepsis; (4) known history of severe organ failure (including decompensated cirrhosis, malignant disease, kidney failure, epilepsy, active serious infection, acquired immunodeficiency syndrome); (5) bowel surgery in the last 6 months (excluding colonoscopy/procedure related to perianal disease); (6) presence of an ileostomy/stoma; and (7) current pregnancy. Given that diet is known to impact the gut microbiome, dietary records were documented for all COVID-19 patients during the time of hospitalisation. Standardized meals daily were provided by the department of hospital catering service of each hospital and the dietary component and pattern were consistent with the habitual diet commonly consumed by Hong Kong Chinese. After discharge, COVID-19 patients were advised to continue a diverse and standard Chinese diet that were consistent with habitual daily diets consumed by Hong Kong Chinese. The study was conducted in accordance with the declaration of Helsinki. All patients provided written informed consent. The study was approved by the Joint Chinese University of Hong Kong—New Territories East Cluster Clinical Research Ethics Committee (CREC Reference no.: 2020.076).

Stool DNA Extraction and Sequencing

Detailed methods are described in Zuo et al[16]. Briefly, DNA was extracted from 0.1 g of homogenised faecal samples using the Maxwell RSC PureFood GMO and Authentication Kit and a Maxwell RSC Instrument nucleic acid extraction platform (Promega. Wisconsin. USA) according to manufacturer's instructions. Sequencing libraries were prepared from extracted DNA using the Nextera DNA Flex Library Prep Kit (Illumina, California, USA) and sequenced on an Illumina NovaSeq 6000 System (2×150 bp) at the Centre for Gut Microbiota Research, Chinese University of Hong Kong Raw sequence data generated for this study are available in the Sequence Read Archive under BioProject accession: PRJNA714459.

Bioinformatics

Raw sequence data were quality filtered using Trimmomatic V.39 to remove adaptor and low-quality sequences and decontaminated against human genome (Reference: hg38) by Kneaddata (V.0.7.2 https://bitbucket.org/biobakery/kneaddata/wiki/Home). Following this, microbiota composition profiles were inferred from quality-filtered forward reads using MetaPhlAn3 version 3.0.5. GNU parallel[17] was used for parallel analysis jobs to accelerate data processing.

Statistical Analysis and Inferring Gut Microbiota Composition

Continuous variables were expressed in median (interquartile range) whereas categorical variables were presented as number (percentage). Qualitative and quantitative differences between subgroups were analysed using chi-squared or Fisher's exact tests for categorical parameters and Mann-Whitney test for continuous parameters, as appropriate. Odds ratio and adjusted odds ratio (aOR) with 95% confidence interval (CI) were estimated using logistic regression to examine clinical parameters associated with development of PACS. The site by species counts and relative abundance tables were input into R V.3.5.1 for statistical analysis. Principal Coordinates Analysis (PCoA) was used to visualise the clustering of samples based on their species level compositional profiles. Associations between gut community composition and patients' parameters were assessed using permutational multivariate analysis of variance (PERMANOVA). Associations of specific microbial species with patient parameters were identified using the linear discriminant analysis effect size (LEfSe) and the multivariate analysis by linear models (MaAsLin) statistical frameworks implemented in the Huttenhower Lab Galaxy instance (website: huttenhower.sph.harvard.edu/galaxy/). PCoA, PERMANOVA and Procrustes analysis are implemented in the vegan R package V.2.5-7.

Random Forest-Based Machine Learning Approach

A random forest was executed to create a predictive model for PACS using gut microbiome composition at admission. The machine learning model analysed the relative abundance of microbiome taxonomic species-level inferred by MetaPhlAn3 version 3.0.5. Machine learning experiments used random forest, as this algorithm has been shown to outperform other learning tools for microbiome data[18]. For the implementation of the model, the scikit-learn implementation[19] was used. An ensemble of 2,000 estimator trees and Shannon entropy were used to evaluate the quality of a split at each node of a tree. The two hyperparameters for the minimum number of samples per leaf and for the number of features per tree were set, as indicated elsewhere, to 5 and 30%, respectively. Hyperparameters for all methods were optimized by maximization of accuracy via 10-fold cross-validation.

All patents, patent applications, and other publications, including GenBank Accession Numbers and equivalents, cited in this application are incorporated by reference in the entirety for all purposes.

REFERENCES

1. Nalbandian A, Sehgal K, Gupta A, et al. Post-acute COVID-19 syndrome. Nature Medicine 2021:1-15.
2. Blomberg B, Mohn K, Brokstad K A, et al. Long COVID affects home-isolated young patients. 2021.
3. Agarwala P, Salzman S H. Six-minute walk test: clinical role, technique, coding, and reimbursement. Chest 2020: 157:603-611.
4. Huang C, Huang L, Wang Y, et al. 6-month consequences of COVID-19 in patients discharged from hospital: a cohort study. The Lancet 2021.
5. Lyons-Weiler J. Pathogenic priming likely contributes to serious and critical illness and mortality in COVID-19 via autoimmunity. Journal of translational autoimmunity 2020:3:100051.
6. Chen Y, Gu S, Chen Y, et al. Six-month follow-up of gut microbiota richness in patients with COVID-19. Gut 2021: gutjnl-2021-324090.
7. Salazar N, Dewulf E M, Neyrinck A M, et al. Inulin-type fructans modulate intestinal *Bifidobacterium* species populations and decrease fecal short-chain fatty acids in obese women. Clinical nutrition 2015:34:501-507.
8. Pichler M J, Yamada C, Shuoker B, et al. Butyrate producing colonic Clostridiales metabolise human milk oligosaccharides and cross feed on mucin via conserved pathways. Nature communications 2020:11:1-15.
9. Fu X, Liu Z, Zhu C, et al. Nondigestible carbohydrates, butyrate, and butyrate-producing bacteria. Critical reviews in food science and nutrition 2019:59:S130-S152.
10. Chia J-H, Wu T-S, Wu T-L, et al, *Clostridium innocuum* is a vancomycin-resistant pathogen that may cause antibiotic-associated diarrhoea. Clinical Microbiology and Infection 2018:24:1195-1199.
11. Pequegnat B, Monteiro M A. Carbohydrate Scaffolds for the Study of the Autism-associated Bacterium, *Clostridium bolteae*. Current medicinal chemistry 2019: 26:6341-6348.
12. Wu J, Liu J, Zhao X, et al. Clinical characteristics of imported cases of coronavirus disease 2019 (COVID-19) in Jiangsu Province: a multicenter descriptive study. Clinical Infectious Diseases 2020:71:706-712.
13. Chen Z, Hui P C, Hui M, et al. Impact of preservation method and 16S rRNA hypervariable region on gut microbiota profiling. Msystems 2019:4:e00271-18.
14. Lambert N, Corps S, El-Azab S A, et al. COVID-19 Survivors' Reports of the Timing, Duration, and Health Impacts of Post-Acute Sequelae of SARS-CoV-2 (PASC) Infection. medRxiv 2021.
15. Lambert N J, Corps S. COVID-19 "long hauler" symptoms survey report. 2020.
16. Zuo T, Zhang F, Lui G C, et al. Alterations in gut microbiota of patients with COVID-19 during time of hospitalization. Gastroenterology 2020; 159:944-955. e8.

17. Tange O. GNU Parallel 2018. 2018. https://doi.org/10.5281/zenodo.1146014
18. Pasolli E, Truong D T, Malik F, et al. Machine Learning Meta-analysis of Large Metagenomic Datasets: Tools and Biological Insights. PLOS Computational Biology 2016; 12: e1004977.
19. Pedregosa F, Varoquaux G, Gramfort A, et al. Scikit-learn: Machine learning in Python, the Journal of machine Learning research 2011; 12:2825-2830.

TABLE 1

List of beneficial bacterial for preventing and alleviating different categories of symptoms

| no | species | NCBI: txid | Fatigue | Gastrointestinal | Neurological | Respiratory | Musculoskeletal | Hair Loss |
|---|---|---|---|---|---|---|---|---|
| 1 | Agathobaculum_butyriciproducens | 1628085 | 1 | 1 | 1 | 1 | 1 | 1 |
| 2 | Bifidobacterium_pseudocatenulatum | 28026 | 1 | 1 | 0 | 1 | 0 | 0 |
| 3 | Roseburia_hominis | 301301 | 1 | 1 | 1 | 1 | 1 | 1 |
| 4 | Anaerostipes_hadrus | 649756 | 1 | 0 | 1 | 1 | 1 | 1 |
| 5 | Dialister_sp_CAG_357 | 1262869 | 1 | 0 | 1 | 1 | 1 | 1 |
| 6 | Eubacterium_rectale | 39491 | 1 | 0 | 1 | 1 | 1 | 1 |
| 7 | Collinsella_aerofaciens | 74426 | 1 | 1 | 0 | 1 | 0 | 0 |
| 8 | Gemmiger_formicilis | 745368 | 1 | 1 | 1 | 1 | 1 | 1 |
| 9 | Firmicutes_bacterium_CAG_83 | 1262992 | 1 | 0 | 1 | 1 | 0 | 0 |
| 10 | Coprococcus_comes | 410072 | 1 | 0 | 1 | 0 | 0 | 0 |
| 11 | Faecalibacterium_prausnitzii | 853 | 1 | 1 | 1 | 1 | 1 | 1 |
| 12 | Eubacterium_sp_CAG_274 | 1262888 | 1 | 0 | 1 | 1 | 1 | 0 |
| 13 | Ruthenibacterium_lactatiformans | 1550024 | 1 | 0 | 1 | 1 | 0 | 0 |
| 14 | Clostridium_leptum | 1535 | 1 | 1 | 0 | 1 | 0 | 0 |
| 15 | Alistipes_putredinis | 28117 | 1 | 0 | 0 | 1 | 1 | 0 |
| 16 | Eubacterium_ventriosum | 39496 | 1 | 0 | 1 | 1 | 1 | 1 |
| 17 | Oscillibacter_sp_57_20 | 1897011 | 1 | 1 | 1 | 1 | 1 | 0 |
| 18 | Fusicatenibacter_saccharivorans | 1150298 | 1 | 0 | 0 | 0 | 0 | 0 |
| 19 | Eubacterium_hallii | 39488 | 1 | 0 | 0 | 0 | 0 | 0 |
| 20 | Dorea_formicigenerans | 39486 | 1 | 0 | 0 | 0 | 1 | 1 |
| 21 | Asaccharobacter_celatus | 394340 | 0 | 1 | 1 | 0 | 1 | 0 |
| 22 | Adlercreutzia_equolifaciens | 446660 | 0 | 1 | 1 | 1 | 1 | 0 |
| 23 | Ruminococcus_torques | 33039 | 0 | 1 | 0 | 0 | 0 | 0 |
| 24 | Roseburia_inulinivorans | 360807 | 0 | 0 | 0 | 0 | 1 | 1 |
| 25 | Ruminococcus_lactaris | 46228 | 0 | 0 | 0 | 0 | 1 | 1 |
| 26 | Ruminococcus_bicirculans | 1160721 | 0 | 0 | 1 | 0 | 0 | 0 |
| 27 | Barnesiella_intestinihominis | 487174 | 0 | 0 | 1 | 0 | 0 | 0 |
| 28 | Eubacterium_ramulus | 39490 | 0 | 0 | 1 | 0 | 0 | 0 |
| 29 | Lactococcus_petauri | 1940789 | 0 | 0 | 1 | 0 | 0 | 0 |

"1" indicates that the bacteria is useful for preventing and mitigating the corresponding category of symptoms.

TABLE 2

Bacteria species for building a risk assessment model in descending order of importance

| species | score | NCBI: txid |
|---|---|---|
| s_Blautia_wexlerae | 0.044853018 | 418240 |
| s_Bifidobacterium_longum | 0.039271434 | 216816 |
| s_Streptococcus_salivarius | 0.036930763 | 1304 |
| s_Fusicatenibacter_saccharivorans | 0.026351186 | 1150298 |
| s_Firmicutes_bacterium_CAG_83 | 0.021478871 | 1262992 |
| s_Gemella_sanguinis | 0.021051858 | 84135 |
| s_Streptococcus_australis | 0.019761804 | 113107 |
| s_Eubacterium_hallii | 0.018000532 | 39488 |
| s_Faecalibacterium_prausnitzii | 0.016089614 | 853 |
| s_Anaerostipes_hadrus | 0.015924345 | 649756 |
| s_Intestinibacter_bartlettii | 0.014674211 | 261299 |
| s_Dorea_longicatena | 0.014600968 | 88431 |
| s_Erysipelatoclostridium_ramosum | 0.01335624 | 1547 |
| s_Bifidobacterium_pseudocatenulatum | 0.01314953 | 28026 |
| s_Phascolarctobacterium_faecium | 0.012391813 | 33025 |
| s_Bacteroides_xylanisolvens | 0.012266979 | 371601 |
| s_Roseburia_faecis | 0.012191856 | 301302 |
| s_Agathobaculum_butyriciproducens | 0.011140696 | 1628085 |
| s_Dorea_formicigenerans | 0.010857435 | 39486 |
| s_Roseburia_inulinivorans | 0.010290666 | 360807 |
| s_Collinsella_aerofaciens | 0.010238569 | 74426 |
| s_Actinomyces_naeslundii | 0.010154623 | 1655 |
| s_Escherichia_coli | 0.010118598 | 562 |

TABLE 3

Beneficial bacteria species for preventing or alleviating symptoms of PACS

| | Species | NCBI: txid |
|---|---|---|
| 1 | Christensenella minuta | 626937 |
| 2 | Eubacterium ramulus | 39490 |
| 3 | Bifidobacterium adolescentis | 1680 |
| 4 | Collinsella aerofaciens | 74426 |
| 5 | Bifidobacterium pseudocatenulatum | 28026 |
| 6 | Eubacterium rectale | 39491 |
| 7 | Faecalibacterium prausnitzii | 853 |
| 8 | Fusobacterium ulcerans | 861 |
| 9 | Dialister sp. CAG: 357 | 1262869 |
| 10 | Fusicatenibacter saccharivorans | 1150298 |
| 11 | Streptococcus anginosus group | 671232 |
| 12 | Lactococcus petauri | 1940789 |
| 13 | Staphylococcus aureus | 1280 |
| 14 | Rothia aeria | 172042 |
| 15 | Collinsella stercoris | 147206 |
| 16 | Blautia obeum | 40520 |
| 17 | Roseburia faecis | 301302 |
| 18 | Lawsonibacter asaccharolyticus | 2108523 |
| 19 | Ruminococcus torques | 33039 |
| 20 | Coprococcus comes | 410072 |
| 21 | Dorea longicatena | 88431 |
| 22 | Lactobacillus fermentum | 1613 |
| 23 | Actinomyces odontolyticus | 1660 |
| 24 | Adlercreutzia equolifaciens | 446660 |
| 25 | Agathobaculum butyriciproducens | 1628085 |
| 26 | Ruminococcus bicirculans | 1160721 |

TABLE 3-continued

Beneficial bacteria species for preventing or alleviating symptoms of PACS

| | Species | NCBI: txid |
|---|---|---|
| 27 | Megasphaera elsdenii | 907 |
| 28 | Romboutsia ilealis | 1115758 |
| 29 | Abiotrophia defectiva | 46125 |
| 30 | Dorea formicigenerans | 39486 |
| 31 | Clostridium citroniae | 358743 |
| 32 | Firmicutes bacterium CAG: 83 | 1262992 |
| 33 | Ruminococcus lactaris | 46228 |
| 34 | Eubacterium sp. CAG: 38 | 1262889 |
| 35 | Abiotrophia sp. HMSC24B09 | 1581061 |
| 36 | Gemmiger formicilis | 745368 |
| 37 | Eubacterium sp. CAG: 251 | 1262886 |
| 38 | Clostridium leptum | 1535 |
| 39 | Clostridium symbiosum | 1512 |
| 40 | Roseburia intestinalis | 166486 |
| 41 | Actinomyces sp. oral taxon 180 | 651609 |
| 42 | Phascolarctobacterium succinatutens | 626940 |
| 43 | Barnesiella intestinihominis | 487174 |
| 44 | Eubacteriaceae bacterium CHKCI005 | 1780381 |
| 45 | Asaccharobacter celatus | 394340 |
| 46 | Roseburia hominis | 301301 |
| 47 | Enterorhabdus caecimuris | 671266 |
| 48 | Enterococcus avium | 33945 |
| 49 | Roseburia inulinivorans | 360807 |
| 50 | Parabacteroides sp. CAG: 409 | 1262913 |
| 51 | Parabacteroides goldsteinii | 328812 |
| 52 | Coprococcus catus | 116085 |
| 53 | Oscillibacter sp. 57_20 | 1897011 |
| 54 | Actinomyces sp. oral taxon 181 | 712121 |
| 55 | Blautia wexlerae | 418240 |
| 56 | Bifidobacterium longum | 216816 |
| 57 | Eubacterium hallii | 39488 |
| 58 | Sellimonas intestinalis | 1653434 |
| 59 | Ruminococcus bromii | 40518 |
| 60 | Blautia sp. CAG: 257 | 1262756 |
| 61 | Clostridium spiroforme | 29348 |

The above compositions typically comprise no detectable amount of any bacterial species in Table 4.

TABLE 4

Unfavorable bacterial species that should be minimized in the composition for preventing or alleviating symptoms of PACS

| | Species | NCBI: txid |
|---|---|---|
| 1 | Lachnospira pectinoschiza | 28052 |
| 2 | Scardovia wiggsiae | 230143 |
| 3 | Oscillibacter sp. CAG: 241 | 1262911 |
| 4 | Streptococcus vestibularis | 1343 |
| 5 | Lactococcus garvieae | 1363 |
| 6 | Erysipelatoclostridium ramosum | 1547 |
| 7 | Stomatobaculum longum | 796942 |
| 8 | Staphylococcus epidermidis | 1282 |
| 9 | Holdemania filiformis | 61171 |
| 10 | Lachnospiraceae bacterium 2 1 46FAA | 2683689 |
| 11 | Clostridium innocuum | 1522 |
| 12 | Parascardovia denticolens | 78258 |
| 13 | Clostridium bolteae CAG 59 | 1263064 |
| 14 | Fusobacterium varium | 856 |
| 15 | Clostridium bolteae | 208479 |
| 16 | Scardovia inopinata | 78259 |
| 17 | Bacteroides caccae | 47678 |
| 18 | Rothia mucilaginosa | 43675 |
| 19 | Streptococcus mutans | 1309 |
| 20 | Ruminococcus gnavus | 33038 |
| 21 | Actinomyces graevenitzii | 55565 |
| 22 | Parabacteroides distasonis | 823 |
| 23 | Bacteroides vulgatus | 821 |
| 24 | Anaeromassilibacillus sp. An250 | 1965604 |
| 25 | Massiliomicrobiota timonensis | 1776392 |
| 26 | Lactobacillus acidophilus | 1579 |
| 27 | Peptostreptococcus anaerobius | 1261 |

TABLE 4-continued

Unfavorable bacterial species that should be minimized in the composition for preventing or alleviating symptoms of PACS

| | Species | NCBI: txid |
|---|---|---|
| 28 | Butyrivibrio sp. CAG: 318 | 1262761 |
| 29 | Lactobacillus plantarum | 1590 |
| 30 | Megamonas rupellensis | 491921 |
| 31 | Lactobacillus johnsonii | 33959 |
| 32 | Bifidobacterium animalis | 28025 |
| 33 | Morganella morganii | 582 |
| 34 | Lachnospiraceae bacterium oral taxon 096 | 712982 |
| 35 | Lactobacillus delbrueckii | 1584 |
| 36 | Blautia producta | 33035 |
| 37 | Turicimonas muris | 1796652 |
| 38 | Clostridiales bacterium 1_7_47FAA | 457421 |
| 39 | Bacteroides thetaiotaomicron | 818 |
| 40 | Bacteroides sp. CAG: 144 | 1262736 |
| 41 | Streptococcus lutetiensis | 150055 |
| 42 | Butyricicoccus pullicaecorum | 501571 |
| 43 | Blautia coccoides | 1532 |
| 44 | Anaerotignum lactatifermentans | 160404 |
| 45 | Megasphaera micronuciformis | 187326 |
| 46 | Bacteroides xylanisolvens | 371601 |
| 47 | Clostridium clostridioforme | 1531 |
| 48 | Pediococcus acidilactici | 1254 |
| 49 | Enterococcus casseliflavus | 37734 |
| 50 | Intestinibacter bartlettii | 261299 |
| 51 | Flavonifractor plautii | 292800 |
| 52 | Actinomyces johnsonii | 544581 |
| 53 | Atopobium parvulum | 1382 |

TABLE 5

Clinical characteristics of the 106 recovered COVID-19 patients

| | |
|---|---|
| Female, n (%) | 56 (52.9) |
| Age, years (IQR) | 61 (33-62) |
| Non-smokers, n (%) | 62 (75.6) |
| Presence of any co-morbidities, n (%) | 45 (42.5) |
| Types of co-morbidities | |
| Diabetes Mellitus | 16 (15.7) |
| Hypertension | 18 (17.0) |
| Hyperlipidaemia | 12 (11.3) |
| Length of stay in hospital, days (IQR) | 17 (10-25) |
| Severity of COVID-19, n (%) | |
| Asymptomatic | 4 (3.8) |
| Mild | 31 (29.3) |
| Moderate | 55 (51.8) |
| Severe | 10 (9.4) |
| Critical | 6 (5.7) |
| Pneumonia changes on CXR, n (%) | 67 (63.2) |
| ICU admission, n (%) | 6 (5.7) |
| Required oxygen supplementation, n (%) | 16 (15.1) |
| Required Mechanical Ventilation, n (%) | 3 (2.8) |
| Any Treatment for COVID-19, n (%) | 54 (50.9) |
| Treatment for COVID-19, n (%) | |
| Kaletra | 39 (36.8) |
| Ribavirin | 30 (28.3) |
| Interferon | 36 (34.0) |
| Remedesvir | 5 (4.7) |
| Antibiotics | 25 (23.6) |
| Number of persistent symptoms by 3 months, n (%) | 86 (81.1) |
| 1 | 21 (19.8) |
| 2-3 | 26 (24.5) |
| >3 | 39 (36.8) |
| Number of persistent symptoms by 6 months, n (%) | 81 (76.4) |
| 1 | 17 (16.0) |
| 2-3 | 29 (27.4) |
| >3 | 35 (33) |

IQR: interquartile range;
CXR: chest x-ray

TABLE 6

Univariate and multivariable analysis on factors associated with development of PACS

|  | Univariate Analysis | | Multivariate analysis | |
|---|---|---|---|---|
|  | Odds Ratio (95% CI) | p value | Adjusted OR (95% CI) | p value |
| Age | 1.002 (0.975-1.029) | 0.894 | 0.999 (0.961-1.039) | 0.976 |
| Gender-Male | 2.405 (0.950-6.091) | 0.064 | 2.567 (0.934-7.100) | 0.067 |
| Co-morbidities | 0.688 (0.272-1.739) | 0.429 | 0.493 (0.140-1.736) | 0.271 |
| Medications used during active COVID-19 | | | | |
| Antibiotics | 0.594 (0.2-1.766) | 0.349 | 2.681 (0.644-11.166) | 0.175 |
| Remedesvir | 3.545 (0.668-18.811) | 0.137 | 7.030 (0.711-69.528) | 0.095 |
| Lopinavir/Ritonavir | 0.533 (0.214-1.328) | 0.177 | 0.360 (0.113-1.152) | 0.085 |
| Interferon | 0.922 (0.370-2.298) | 0.861 | 1.229 (0.394-3.837) | 0.722 |
| Ribavarin | 1.276 (0.519-3.319) | 0.596 | 2.024 (0.630-6.496) | 0.236 |
| Severity of COVID-19 | 1.095 (0.319-3.756) | 0.885 | 2.056 (0.337-12.534) | 0.435 |

TABLE 7

Collection time and label name of stool samples collected from 68 COVID-19 patients

| Patients | At Admission | Month 1 | Month 6 | Month 9 |
|---|---|---|---|---|
| COV1 | AC1 | M1C1 | M6C1 | M9C1 |
| COV2 | AC2 | M1C2 | M6C2 | |
| COV3 | | M1C3 | M6C3 | |
| COV4 | AC4 | M1C4 | M6C4 | |
| COV5 | AC5 | M1C5 | M6C5 | |
| COV6 | AC6 | M1C6 | M6C6 | |
| COV7 | AC7 | | M6C7 | |
| COV8 | | M1C8 | M6C8 | |
| COV9 | AC9 | | M6C9 | |
| COV10 | AC10 | M1C10 | M6C10 | |
| COV11 | AC11 | M1C11 | M6C11 | |
| COV12 | | M1C12 | M6C12 | |
| COV13 | AC13 | M1C13 | M6C13 | |
| COV14 | | M1C14 | M6C14 | M9C14 |
| COV15 | AC15 | M1C15 | M6C15 | M9C15 |
| COV16 | | M1C16 | M6C16 | |
| COV17 | | M1C17 | M6C17 | |
| COV18 | AC18 | M1C18 | M6C18 | |
| COV19 | | M1C19 | M6C19 | M9C19 |
| COV20 | | M1C20 | M6C20 | |
| COV21 | | M1C21 | M6C21 | |
| COV22 | AC22 | M1C22 | M6C22 | M9C22 |
| COV23 | AC23 | M1C23 | M6C23 | |
| COV24 | AC24 | M1C24 | M6C24 | |
| COV25 | AC25 | M1C25 | M6C25 | |
| COV26 | AC26 | M1C26 | M6C26 | |
| COV27 | | M1C27 | M6C27 | |
| COV28 | AC28 | M1C28 | M6C28 | M9C28 |
| COV29 | AC29 | M1C29 | M6C29 | M9C29 |
| COV30 | AC30 | M1C30 | M6C30 | M9C30 |
| COV31 | | M1C31 | M6C31 | |
| COV32 | AC32 | M1C32 | M6C32 | |
| COV33 | AC33 | M1C33 | M6C33 | |
| COV34 | AC34 | M1C34 | M6C34 | |
| COV35 | AC35 | M1C35 | M6C35 | |
| COV36 | AC36 | | M6C36 | M9C36 |
| COV37 | AC37 | M1C37 | M6C37 | |
| COV38 | AC38 | M1C38 | M6C38 | |
| COV39 | AC39 | M1C39 | M6C39 | |
| COV40 | | M1C40 | M6C40 | |
| COV41 | AC41 | M1C41 | M6C41 | |
| COV42 | AC42 | M1C42 | M6C42 | |
| COV43 | AC43 | M1C43 | M6C43 | |
| COV44 | AC44 | M1C44 | M6C44 | |
| COV45 | AC45 | M1C45 | M6C45 | |
| COV46 | AC46 | M1C46 | M6C46 | |
| COV47 | AC47 | M1C47 | M6C47 | |
| COV48 | | M1C48 | M6C48 | |
| COV49 | AC49 | M1C49 | M6C49 | |
| COV50 | AC50 | M1C50 | M6C50 | |
| COV51 | AC51 | M1C51 | M6C51 | |
| COV52 | AC52 | | M6C52 | |
| COV53 | | M1C53 | M6C53 | M9C53 |
| COV54 | | M1C54 | M6C54 | |
| COV55 | AC55 | M1C55 | M6C55 | |
| COV56 | | M1C56 | M6C56 | |
| COV57 | | | M6C57 | |
| COV58 | AC58 | M1C58 | M6C58 | |
| COV59 | AC59 | M1C59 | M6C59 | |
| COV60 | | M1C60 | M6C60 | M9C60 |
| COV61 | AC61 | M1C61 | M6C61 | |
| COV62 | AC62 | M1C62 | M6C62 | |
| COV63 | AC63 | M1C63 | M6C63 | |
| COV64 | AC64 | M1C64 | M6C64 | |
| COV65 | | M1C65 | M6C65 | |
| COV66 | | M1C66 | M6C66 | |
| COV67 | | M1C67 | M6C67 | |
| COV68 | | M1C68 | M6C68 | |

TABLE 8

Characteristics of the COVID-19 and non-COVID-19 cohorts

| Cohorts | COVID-19 | Non-COVID-19 |
|---|---|---|
| Number, n | 68 | 68 |
| Female, n (%) | 34 (50%) | 36 (52.9%) |
| Median age, mean ± SD* | 49 ± 17.7 | 47.2 ± 16.8 |
| Comorbidities, n (%) | | |
| Hypertension | 12 (17.6%) | 11 (16.2%) |
| Hyperlipidaemia | 7 (10.3%) | 10 (14.7%) |
| Diabetes | 9 (13.23%) | 9 (13.23%) |
| Antibiotic therapy, n (%) | 18 (26.5%) | 0 |
| Antiviral therapy, n (%) | | |
| Lopinavir/Ritonavir | 40 (58.8%) | 0 |
| Ribavirin | 33 (48.6%) | 0 |
| Interferon Beta-1B | 21 (30.9%) | 0 |
| Disease Severity Category, n (%) | | |
| Mild | 18 (26.5%) | NA |
| Moderate | 34 (50%) | NA |
| Severe | 10 (14.7%) | NA |
| Critical | 6 (8.8%) | NA |
| PACS, n (%) | 50 (73.5%) | NA |

*p = 0.796
Abbreviations: NA, not available

TABLE 9

PERMANOVA of gut microbiota composition of COVID-19 patients during active
infection and after disease resolution compared with non-COVID-19 controls.

|  | Df | SumsOfSqs | MeanSqs | F. Model | R2 | Pr(>F) | |
|---|---|---|---|---|---|---|---|
| Overall | 3 | 3.082 | 1.02732 | 3.4156 | 0.05169 | 0.001 | *** |
| Baseline at admission vs 1-month follow-up | 1 | 0.9425 | 0.94251 | 2.9379 | 0.03127 | 0.001 | *** |
| Baseline at admission vs 6-month follow-up | 1 | 1.011 | 1.01085 | 3.1815 | 0.02941 | 0.001 | *** |
| 1-month follow-up vs 6-month follow-up | 1 | 0.2702 | 0.2702 | 0.90364 | 0.00973 | 0.555 | |
| Non-COVID-19 controls vs 1-month follow-up | 1 | 0.9457 | 0.94574 | 3.386 | 0.0392 | 0.001 | *** |
| Non-COVID-19 controls vs 6-month follow-up | 1 | 0.936 | 0.93598 | 3.3195 | 0.03309 | 0.001 | *** |
| Baseline at admission vs Non-COVID-19 controls | 1 | 2.015 | 2.01503 | 6.6624 | 0.0649 | 0.001 | *** |

TABLE 10

Gut microbiota compositional differences at phylum, genus and species level between
1 month and 6 months follow-up from COVID-19 patients after virus clearance.

| Species | Mean relative abundance of follow-up at 1 month | Mean relative abundance of follow-up at 6 months | p |
|---|---|---|---|
| Bifidobacterium_adolescentis | 6.318359516 | 7.120534259 | 0.054428 |
| Ruminococcus_gnavus | 6.416870484 | 4.807582037 | 0.463656 |
| Bifidobacterium_pseudocatenulatum | 5.021357903 | 4.526993148 | 0.77484 |
| Collinsella_aerofaciens | 4.800161613 | 3.325205 | 0.206583 |
| Bifidobacterium_longum | 4.130408871 | 4.380152407 | 0.853731 |
| Bacteroides_vulgatus | 3.979818065 | 4.877217963 | 0.593539 |
| Anaerostipes_hadrus | 3.662100645 | 2.227491852 | 0.054936 |
| Fusicatenibacter_saccharivorans | 3.023687581 | 3.775144074 | 0.369943 |
| Escherichia_coli | 2.768972419 | 2.672876296 | 0.953224 |
| Bacteroides_uniformis | 2.64162371 | 3.174495556 | 0.488834 |
| Blautia_wexlerae | 2.418245645 | 2.803695556 | 0.705193 |
| Eubacterium_rectale | 2.232464194 | 2.892056481 | 0.47049 |
| Faecalibacterium_prausnitzii | 2.108901613 | 2.289432593 | 0.719759 |
| Dorea_longicatena | 1.908688548 | 1.625454815 | 0.49127 |
| Klebsiella_pneumoniae | 1.734108065 | 0.973925556 | 0.359312 |
| Roseburia_inulinivorans | 1.724062258 | 1.163785741 | 0.386555 |
| Ruminococcus_bromii | 1.531714677 | 2.301826111 | 0.269612 |
| Streptococcus_salivarius | 1.440257258 | 1.542684259 | 0.822009 |
| Prevotella_copri | 1.398804355 | 2.404542407 | 0.400338 |
| Eubacterium_hallii | 1.370099677 | 1.441855741 | 0.863033 |
| Others | 41.27332661 | 37.64653648 | 0.21548 |

TABLE 11

LEfSe analysis of microbial communities of baseline samples from
COVID-19 patients with PACS compared with non-COVID-19 controls.

| Species | ra | group | LDA | p |
|---|---|---|---|---|
| Lachnospira_pectinoschiza | 2.662066 | Baseline at admission | 2.041103 | 0.02917 |
| Scardovia_wiggsiae | 2.366584 | Baseline at admission | 2.061504 | 0.042077 |
| Oscillibacter_sp_CAG_241 | 2.060583 | Baseline at admission | 2.104827 | 0.013277 |
| Streptococcus_vestibularis | 2.388228 | Baseline at admission | 2.119491 | 0.001698 |
| Lactococcus_garvieae | 1.222595 | Baseline at admission | 2.144591 | 0.02392 |
| Erysipelatoclostridium_ramosum | 2.540561 | Baseline at admission | 2.149007 | 0.001679 |
| Stomatobaculum_longum | 2.016039 | Baseline at admission | 2.171035 | 0.006196 |
| Staphylococcus_epidermidis | 2.368067 | Baseline at admission | 2.175591 | 0.002597 |
| Holdemania_filiformis | 1.337645 | Baseline at admission | 2.202201 | 0.014375 |
| Lachnospiraceae_bacterium_2_1_46FAA | 2.457545 | Baseline at admission | 2.243613 | 0.001085 |
| Clostridium_innocuum | 2.674212 | Baseline at admission | 2.248737 | 0.0425 |
| Parascardovia_denticolens | 1.301043 | Baseline at admission | 2.263001 | 0.006196 |
| Clostridium_bolteae_CAG_59 | 2.620008 | Baseline at admission | 2.364587 | 0.036732 |
| Ruthenibacterium_lactatiformans | 3.118544 | Baseline at admission | 2.512153 | 0.029686 |
| Fusobacterium_varium | 2.933172 | Baseline at admission | 2.56629 | 0.000202 |
| Allisonella_histaminiformans | 0.777189 | Baseline at admission | 2.615677 | 0.001258 |
| Eubacterium_sp_CAG_274 | 2.370278 | Baseline at admission | 2.634039 | 0.047203 |

TABLE 11-continued

LEfSe analysis of microbial communities of baseline samples from COVID-19 patients with PACS compared with non-COVID-19 controls.

| Species | ra | group | LDA | p |
|---|---|---|---|---|
| Clostridium_bolteae | 2.907103 | Baseline at admission | 2.645922 | 0.000133 |
| Scardovia_inopinata | 0.031558 | Baseline at admission | 2.667949 | 0.01479 |
| Oxalobacter_formigenes | 1.658304 | Baseline at admission | 2.74345 | 0.025495 |
| Bacteroides_caccae | 3.23481 | Baseline at admission | 2.81153 | 0.047984 |
| Rothia_mucilaginosa | 1.767019 | Baseline at admission | 2.816374 | 0.027913 |
| Firmicutes_bacterium_CAG_110 | 1.761268 | Baseline at admission | 2.994536 | 0.025286 |
| Streptococcus_mutans | 1.007893 | Baseline at admission | 3.089457 | 0.047071 |
| Ruminococcus_gnavus | 3.707892 | Baseline at admission | 3.165713 | 0.016031 |
| Actinomyces_graevenitzii | 1.736821 | Baseline at admission | 3.187091 | 0.013242 |
| Parabacteroides_distasonis | 3.693748 | Baseline at admission | 3.328771 | 6.49E−07 |
| Bacteroides_vulgatus | 4.07972 | Baseline at admission | 3.595267 | 2.16E−05 |
| Anaeromassilibacillus_sp_An250 | 1.107616 | Baseline at admission | 4.311554 | 0.012597 |
| Christensenella_minuta | 1.227747 | Non-COVID-19 controls | −4.31155 | 0.009708 |
| Eubacterium_ramulus | 2.567403 | Non-COVID-19 controls | −3.67379 | 0.003202 |
| Hungatella_hathewayi | 2.286886 | Non-COVID-19 controls | −3.65849 | 0.003409 |
| Bifidobacterium_adolescentis | 3.938295 | Non-COVID-19 controls | −3.45699 | 0.016984 |
| Collinsella_aerofaciens | 4.011515 | Non-COVID-19 controls | −3.44447 | 0.007536 |
| Bifidobacterium_pseudocatenulatum | 4.018657 | Non-COVID-19 controls | −3.39601 | 0.002948 |
| Eubacterium_rectale | 3.775804 | Non-COVID-19 controls | −3.26529 | 5.98E−05 |
| Faecalibacterium_prausnitzii | 3.799575 | Non-COVID-19 controls | −3.22697 | 2.19E−05 |
| Fusobacterium_ulcerans | 1.64475 | Non-COVID-19 controls | −3.09619 | 0.019634 |
| Dialister_sp_CAG_357 | 3.424291 | Non-COVID-19 controls | −3.08881 | 0.006483 |
| Fusicatenibacter_saccharivorans | 3.614425 | Non-COVID-19 controls | −3.06289 | 1.28E−05 |
| Streptococcus_anginosus_group | 1.508137 | Non-COVID-19 controls | −3.03595 | 0.030618 |
| Lactococcus_petauri | 1.502136 | Non-COVID-19 controls | −3.01067 | 0.002497 |
| Staphylococcus_aureus | 1.575224 | Non-COVID-19 controls | −3.00731 | 0.035582 |
| Lactobacillus_mucosae | 0.514818 | Non-COVID-19 controls | −3.00731 | 0.035582 |
| Rothia_aeria | 1.812678 | Non-COVID-19 controls | −3.00731 | 0.037819 |
| Collinsella_stercoris | 2.050498 | Non-COVID-19 controls | −2.99846 | 0.033138 |
| Blautia_obeum | 3.446459 | Non-COVID-19 controls | −2.92977 | 0.000421 |
| Roseburia_faecis | 3.372277 | Non-COVID-19 controls | −2.88697 | 4.37E−05 |
| Lawsonibacter_asaccharolyticus | 1.339051 | Non-COVID-19 controls | −2.82111 | 0.004664 |
| Ruminococcus_torques | 3.530717 | Non-COVID-19 controls | −2.79736 | 0.004323 |
| Coprococcus_comes | 3.293897 | Non-COVID-19 controls | −2.78332 | 0.00011 |
| Dorea_longicatena | 3.465248 | Non-COVID-19 controls | −2.77819 | 0.001453 |
| Lactobacillus_fermentum | 1.541037 | Non-COVID-19 controls | −2.76014 | 0.000823 |
| Actinomyces_odontolyticus | 2.12128 | Non-COVID-19 controls | −2.68134 | 0.030841 |
| Adlercreutzia_equolifaciens | 3.027229 | Non-COVID-19 controls | −2.67334 | 6.71E−08 |
| Agathobaculum_butyriciproducens | 3.190823 | Non-COVID-19 controls | −2.66275 | 1.66E−05 |
| Ruminococcus_bicirculans | 3.114601 | Non-COVID-19 controls | −2.62201 | 0.007377 |
| Megasphaera_elsdenii | 2.294488 | Non-COVID-19 controls | −2.58938 | 0.001417 |
| Romboutsia_ilealis | 0.888059 | Non-COVID-19 controls | −2.5261 | 0.034551 |
| Abiotrophia_defectiva | 0.976659 | Non-COVID-19 controls | −2.496 | 0.041632 |
| Clostridium_aldenense | 1.307197 | Non-COVID-19 controls | −2.49401 | 0.006784 |
| Dorea_formicigenerans | 3.226203 | Non-COVID-19 controls | −2.4677 | 0.005998 |
| Clostridium_citroniae | 2.008986 | Non-COVID-19 controls | −2.46299 | 0.009102 |
| Firmicutes_bacterium_CAG_83 | 3.011101 | Non-COVID-19 controls | −2.41462 | 0.00253 |
| Ruminococcus_lactaris | 2.949404 | Non-COVID-19 controls | −2.40823 | 0.000232 |
| Eubacterium_sp_CAG_38 | 2.271021 | Non-COVID-19 controls | −2.37595 | 0.002106 |
| Clostridium_lavalense | 1.094742 | Non-COVID-19 controls | −2.35217 | 0.002053 |
| Abiotrophia_sp_HMSC24B09 | 1.754694 | Non-COVID-19 controls | −2.33505 | 0.040479 |
| Gemmiger_formicilis | 2.763414 | Non-COVID-19 controls | −2.306 | 0.000873 |
| Eubacterium_sp_CAG_251 | 2.760954 | Non-COVID-19 controls | −2.30195 | 0.009485 |
| Clostridium_leptum | 2.569503 | Non-COVID-19 controls | −2.23689 | 1.17E−05 |
| Clostridium_symbiosum | 2.253018 | Non-COVID-19 controls | −2.21048 | 0.008256 |
| Roseburia_intestinalis | 2.627094 | Non-COVID-19 controls | −2.20585 | 0.002538 |
| Actinomyces_sp_oral_taxon_180 | 1.030178 | Non-COVID-19 controls | −2.20159 | 0.009463 |
| Phascolarctobacterium_succinatutens | 2.540848 | Non-COVID-19 controls | −2.20014 | 0.030488 |
| Eubacterium_ventriosum | 2.300968 | Non-COVID-19 controls | −2.18057 | 0.000131 |
| Barnesiella_intestinihominis | 2.400284 | Non-COVID-19 controls | −2.17332 | 0.022432 |
| Eubacteriaceae_bacterium_CHKCI005 | 0.126146 | Non-COVID-19 controls | −2.16971 | 0.037375 |
| Asaccharobacter_celatus | 2.511319 | Non-COVID-19 controls | −2.15192 | 5.85E−07 |
| Roseburia_hominis | 2.573063 | Non-COVID-19 controls | −2.14533 | 0.000324 |
| Enterorhabdus_caecimuris | 0.813749 | Non-COVID-19 controls | −2.09028 | 1.98E−05 |

TABLE 12

LEfSe analysis of microbial communities of 6 months follow-up from COVID-19 patients with PACS compared with non-COVID-19 controls.

| Species | ra | group | LDA | p |
|---|---|---|---|---|
| Oxalobacter_formigenes | 2.503402 | Non-COVID-19 controls | 2.261669 | 0.047088 |
| Collinsella_stercoris | 2.895596 | Non-COVID-19 controls | 2.347592 | 0.045724 |
| Eubacterium_sp_CAG_274 | 3.215376 | Non-COVID-19 controls | 2.583104 | 0.045596 |
| Enterococcus_avium | 3.419383 | Non-COVID-19 controls | 3.051719 | 0.04196 |
| Roseburia_inulinivorans | 3.947197 | Non-COVID-19 controls | 3.241366 | 0.040309 |
| Parabacteroides_sp_CAG_409 | 2.558447 | Non-COVID-19 controls | 2.508434 | 0.031885 |
| Dorea_longicatena | 4.310346 | Non-COVID-19 controls | 3.412411 | 0.030127 |
| Actinomyces_sp_S6_Spd3 | 1.699661 | Non-COVID-19 controls | 2.790593 | 0.030057 |
| Parabacteroides_goldsteinii | 2.880034 | Non-COVID-19 controls | 2.456916 | 0.029656 |
| Ruminococcus_lactaris | 3.794502 | Non-COVID-19 controls | 3.041964 | 0.018042 |
| Coprococcus_catus | 3.395037 | Non-COVID-19 controls | 2.529098 | 0.013888 |
| Eubacterium_sp_CAG_251 | 3.606052 | Non-COVID-19 controls | 3.311248 | 0.013264 |
| Allisonella_histaminiformans | 1.622287 | Non-COVID-19 controls | 2.578857 | 0.012195 |
| Enterorhabdus_caecimuris | 1.658847 | Non-COVID-19 controls | 2.477651 | 0.009605 |
| Oscillibacter_sp_57_20 | 3.235984 | Non-COVID-19 controls | 2.60015 | 0.009002 |
| Ruthenibacterium_lactatiformans | 3.837198 | Non-COVID-19 controls | 3.231341 | 0.008749 |
| Roseburia_faecis | 4.217375 | Non-COVID-19 controls | 3.534599 | 0.007139 |
| Eubacterium_ramulus | 3.412501 | Non-COVID-19 controls | 2.59505 | 0.006471 |
| Eubacterium_rectale | 4.620902 | Non-COVID-19 controls | 3.853853 | 0.006085 |
| Clostridium_leptum | 3.414602 | Non-COVID-19 controls | 2.940181 | 0.005082 |
| Actinomyces_sp_oral_taxon_181 | 1.632622 | Non-COVID-19 controls | 2.607737 | 0.005041 |
| Dorea_formicigenerans | 4.071301 | Non-COVID-19 controls | 3.347256 | 0.004481 |
| Barnesiella_intestinihominis | 3.245382 | Non-COVID-19 controls | 2.81273 | 0.002924 |
| Collinsella_aerofaciens | 4.856613 | Non-COVID-19 controls | 4.277675 | 0.002545 |
| Ruminococcus_bicirculans | 3.959699 | Non-COVID-19 controls | 3.559165 | 0.002258 |
| Firmicutes_bacterium_CAG_110 | 2.606366 | Non-COVID-19 controls | 2.407199 | 0.001425 |
| Firmicutes_bacterium_CAG_83 | 3.856199 | Non-COVID-19 controls | 3.391538 | 0.00052 |
| Asaccharobacter_celatus | 3.356417 | Non-COVID-19 controls | 2.905801 | 0.000369 |
| Agathobaculum_butyriciproducens | 4.035921 | Non-COVID-19 controls | 3.363939 | 0.000261 |
| Roseburia_hominis | 3.418161 | Non-COVID-19 controls | 3.051324 | 0.000179 |
| Adlercreutzia_equolifaciens | 3.872327 | Non-COVID-19 controls | 3.44168 | 8.29E−05 |
| Coprococcus_comes | 4.138995 | Non-COVID-19 controls | 3.441481 | 6.56E−05 |
| Blautia_obeum | 4.291557 | Non-COVID-19 controls | 3.811778 | 4.25E−05 |
| Gemmiger_formicilis | 3.608512 | Non-COVID-19 controls | 3.20193 | 3.06E−05 |
| Ruminococcus_torques | 4.375815 | Non-COVID-19 controls | 3.751223 | 2.69E−05 |
| Faecalibacterium_prausnitzii | 4.644673 | Non-COVID-19 controls | 4.085711 | 1.89E−05 |
| Massiliomicrobiota_timonensis | 1.410744 | PACS, 6-month follow-up | 2.291138 | 0.04833 |
| Lactobacillus_acidophilus | 2.700508 | PACS, 6-month follow-up | 3.083063 | 0.041631 |
| Peptostreptococcus_anaerobius | 1.994231 | PACS, 6-month follow-up | 2.486531 | 0.041631 |
| Butyrivibrio_sp_CAG_318 | 2.287376 | PACS, 6-month follow-up | 2.18923 | 0.041631 |
| Lactobacillus_plantarum | 1.452155 | PACS, 6-month follow-up | 2.649174 | 0.041631 |
| Megamonas_rupellensis | 2.534971 | PACS, 6-month follow-up | 2.557236 | 0.041631 |
| Lactobacillus_johnsonii | 2.468542 | PACS, 6-month follow-up | 2.823628 | 0.041631 |
| Bifidobacterium_animalis | 2.335044 | PACS, 6-month follow-up | 2.565207 | 0.041631 |
| Morganella_morganii | 3.2669 | PACS, 6-month follow-up | 3.125486 | 0.041631 |
| Lachnospiraceae_bacterium_oral_taxon_096 | 1.211174 | PACS, 6-month follow-up | 3.52759 | 0.041631 |
| Lactobacillus_delbrueckii | 1.289946 | PACS, 6-month follow-up | 3.186949 | 0.041631 |
| Blautia_producta | 3.006427 | PACS, 6-month follow-up | 2.645113 | 0.040141 |
| Clostridium_lavalense | 1.320479 | PACS, 6-month follow-up | 2.989671 | 0.037157 |
| Turicimonas_muris | 2.065453 | PACS, 6-month follow-up | 2.081054 | 0.036666 |
| Clostridiales_bacterium_1_7_47FAA | 1.556881 | PACS, 6-month follow-up | 2.883858 | 0.036102 |
| Bacteroides_thetaiotaomicron | 4.208205 | PACS, 6-month follow-up | 3.73705 | 0.034879 |
| Bacteroides_sp_CAG_144 | 2.00843 | PACS, 6-month follow-up | 2.521743 | 0.018155 |
| Streptococcus_lutetiensis | 3.275533 | PACS, 6-month follow-up | 3.059707 | 0.018155 |
| Butyricicoccus_pullicaecorum | 1.933932 | PACS, 6-month follow-up | 2.189865 | 0.018155 |
| Blautia_coccoides | 3.300568 | PACS, 6-month follow-up | 2.934761 | 0.016613 |
| Clostridium_aldenense | 1.948256 | PACS, 6-month follow-up | 2.471031 | 0.015847 |
| Anaerotignum_lactatifermentans | 2.981355 | PACS, 6-month follow-up | 2.443348 | 0.014595 |
| Megasphaera_micronuciformis | 2.615489 | PACS, 6-month follow-up | 2.342229 | 0.011551 |
| Bacteroides_xylanisolvens | 3.754041 | PACS, 6-month follow-up | 3.349487 | 0.009557 |
| Clostridium_clostridioforme | 3.145469 | PACS, 6-month follow-up | 2.78469 | 0.008496 |
| Pediococcus_acidilactici | 2.708659 | PACS, 6-month follow-up | 2.404562 | 0.008217 |
| Enterococcus_casseliflavus | 2.023796 | PACS, 6-month follow-up | 2.484483 | 0.007987 |
| Parabacteroides_distasonis | 3.909731 | PACS, 6-month follow-up | 3.344174 | 0.005963 |
| Hungatella_hathewayi | 2.982291 | PACS, 6-month follow-up | 2.536142 | 0.005292 |
| Bacteroides_vulgatus | 4.709232 | PACS, 6-month follow-up | 4.205795 | 0.004589 |
| Eubacterium_ventriosum | 3.18131 | PACS, 6-month follow-up | 2.556534 | 0.003931 |
| Intestinibacter_bartlettii | 3.275179 | PACS, 6-month follow-up | 2.729117 | 0.003585 |
| Clostridium_innocuum | 3.773594 | PACS, 6-month follow-up | 3.315425 | 0.002504 |
| Lachnospiraceae_bacterium_2_1_46FAA | 3.0353 | PACS, 6-month follow-up | 2.760839 | 0.001547 |
| Flavonifractor_plautii | 3.867593 | PACS, 6-month follow-up | 3.262406 | 0.001544 |
| Fusobacterium_varium | 2.560112 | PACS, 6-month follow-up | 2.361968 | 0.001015 |
| Lactobacillus_mucosae | 3.307126 | PACS, 6-month follow-up | 2.948678 | 0.000676 |
| Ruminococcus_gnavus | 4.748382 | PACS, 6-month follow-up | 4.24838 | 0.000412 |
| Streptococcus_mutans | 2.293884 | PACS, 6-month follow-up | 2.423506 | 0.000273 |

TABLE 12-continued

LEfSe analysis of microbial communities of 6 months follow-up from
COVID-19 patients with PACS compared with non-COVID-19 controls.

| Species | ra | group | LDA | p |
|---|---|---|---|---|
| *Clostridium_bolteae* | 3.030018 | PACS, 6-month follow-up | 2.626561 | 1.31E−05 |
| *Erysipelatoclostridium_ramosum* | 3.532908 | PACS, 6-month follow-up | 3.144547 | 7.61E−08 |

TABLE 13

LEfSe analysis of microbial communities of baseline samples from
patients without PACS compared with non-COVID-19 controls.

| Species | ra | group | LDA | p |
|---|---|---|---|---|
| *Asaccharobacter_celatus* | 3.589301 | Non-COVID-19 controls | 3.187274 | 0.007646 |
| *Propionibacterium_acidifaciens* | 2.259488 | Non-COVID-19 controls | 2.543664 | 0.042236 |
| *Klebsiella_pneumoniae* | 3.664402 | Non-COVID-19 controls | 3.211935 | 0.030184 |
| *Actinomyces_johnsonii* | 1.687132 | Non-COVID-19 controls | 2.788892 | 0.006817 |
| *Enterorhabdus_caecimuris* | 2.05471 | Non-COVID-19 controls | 2.535265 | 0.014033 |
| *Actinobaculum_sp_oral_taxon_183* | 2.159574 | Non-COVID-19 controls | 2.598551 | 0.017777 |
| *Gemella_morbillorum* | 1.962751 | Non-COVID-19 controls | 2.636828 | 0.00499 |
| *Blautia_obeum* | 4.649692 | Non-COVID-19 controls | 4.216888 | 0.022228 |
| *Klebsiella_quasipneumoniae* | 2.773263 | Non-COVID-19 controls | 2.408263 | 0.035876 |
| *Streptococcus_mitis* | 3.042367 | Non-COVID-19 controls | 2.769942 | 0.04122 |
| *Eubacterium_sp_CAG_38* | 2.056515 | Non-COVID-19 controls | 2.624635 | 0.042236 |
| *Olsenella_uli* | 1.171401 | Non-COVID-19 controls | 3.074099 | 0.042236 |
| *Ruminococcus_lactaris* | 3.622477 | Non-COVID-19 controls | 3.292806 | 0.03181 |
| *Streptococcus_cristatus* | 2.35577 | Non-COVID-19 controls | 2.466158 | 0.012874 |
| *Adlercreutzia_equolifaciens* | 4.112556 | Non-COVID-19 controls | 3.7258 | 0.001849 |
| *Catabacter_hongkongensis* | 2.345458 | Non-COVID-19 controls | 2.551125 | 0.020275 |
| *Actinomyces_sp_S6_Spd3* | 2.026612 | Non-COVID-19 controls | 2.7594 | 0.015406 |
| *Erysipelatoclostridium_ramosum* | 3.332633 | No PACS, baseline at admission | 3.049787 | 0.008409 |
| *Parabacteroides_distasonis* | 4.374644 | No PACS, baseline at admission | 4.003809 | 0.001028 |
| *Fusobacterium_ulcerans* | 2.846614 | No PACS, baseline at admission | 2.723018 | 0.03517 |
| *Bacteroides_vulgatus* | 4.635411 | No PACS, baseline at admission | 4.249452 | 0.008503 |
| *Bacteroides_thetaiotaomicron* | 4.345324 | No PACS, baseline at admission | 3.924016 | 0.04972 |
| *Flavonifractor_plautii* | 3.838596 | No PACS, baseline at admission | 3.345743 | 0.014055 |
| *Bacteroides_fragilis* | 4.298785 | No PACS, baseline at admission | 3.920648 | 0.033927 |
| *Clostridium_lavalense* | 2.262086 | No PACS, baseline at admission | 2.639733 | 0.013386 |

TABLE 14

Multifactorial PERMANOVA (Adonis) tests for significance and relative contribution
of factors on gut microbiome communities of 6 months follow-up.

| Characteristics | SumsOfSqs | MeanSqs | F. Model | R2 | p_value | p. adjust |
|---|---|---|---|---|---|---|
| Severity | 0.424432225 | 0.424432225 | 1.329145565 | 0.029322096 | 0.126 | 0.886 |
| Gender | 0.316257309 | 0.316257309 | 0.982819831 | 0.021848782 | 0.486 | 0.886 |
| Age | 0.300906112 | 0.300906112 | 0.934100764 | 0.020788238 | 0.553 | 0.886 |
| Ribavarin | 0.29601955 | 0.29601955 | 0.918614743 | 0.020450648 | 0.562 | 0.886 |
| Antibiotic | 0.271017263 | 0.271017263 | 0.839546648 | 0.018723354 | 0.671 | 0.886 |
| Co_morbidities | 0.2708723 | 0.2708723 | 0.839089022 | 0.018713338 | 0.655 | 0.886 |
| Interferon | 0.246286249 | 0.246286249 | 0.761609803 | 0.0170148 | 0.78 | 0.886 |
| Lopinavir/Ritonavir | 0.219978857 | 0.219978857 | 0.679002024 | 0.015197342 | 0.886 | 0.886 |

TABLE 15

Multifactorial PERMANOVA (Adonis) tests for associations of different
subgroups of PACS to gut microbiome communities of 6 months follow-up

| Characteristics | SumsOfSqs | MeanSqs | F. Model | R2 | p_value | p. adjust |
|---|---|---|---|---|---|---|
| Gastrointestinal | 0.6247 | 0.62466 | 2.2083 | 0.06856 | 0.006 | 0.0072 |
| Respiratory | 0.7862 | 0.78624 | 2.699 | 0.06176 | 0.002 | 0.004 |
| Fatigue | 0.776 | 0.77605 | 2.5627 | 0.05751 | 0.001 | 0.003 |

TABLE 15-continued

Multifactorial PERMANOVA (Adonis) tests for associations of different
subgroups of PACS to gut microbiome communities of 6 months follow-up

| Characteristics | SumsOfSqs | MeanSqs | F. Model | R2 | p_value | p. adjust |
|---|---|---|---|---|---|---|
| Musculoskeletal | 0.6622 | 0.66217 | 2.252 | 0.05737 | 0.004 | 0.006 |
| Hairloss | 0.5152 | 0.51515 | 1.8087 | 0.04914 | 0.013 | 0.013 |
| Neurological | 0.7493 | 0.74931 | 2.54 | 0.04414 | 0.001 | 0.003 | to

TABLE 16

Associations between different subgroups of PACS and gut microbiota
composition at 6 months follow up using MaAsLin analysis.

| no | species | Fatigue | Gastrointestinal | Neurological | Respiratory | Musculoskeletal | HairLoss |
|---|---|---|---|---|---|---|---|
| 1 | *Actinomyces_odontolyticus* | 1 | 1 | 1 | 1 | 1 | 1 |
| 2 | *Agathobaculum_butyriciproducens* | 1 | 1 | 1 | 1 | 1 | 1 |
| 3 | *Faecalibacterium_prausnitzii* | 1 | 1 | 1 | 1 | 1 | 1 |
| 4 | *Gemmiger_formicilis* | 1 | 1 | 1 | 1 | 1 | 1 |
| 5 | *Intestinibacter_bartlettii* | 1 | 1 | 1 | 1 | 1 | 1 |
| 6 | *Roseburia_hominis* | 1 | 1 | 1 | 1 | 1 | 1 |
| 7 | *Actinomyces_naeslundii* | 1 | 1 | 1 | 1 | 1 | 0 |
| 8 | *Erysipelatoclostridium_ramosum* | 1 | 1 | 1 | 1 | 1 | 0 |
| 9 | *Oscillibacter_sp_57_20* | 1 | 1 | 1 | 1 | 1 | 0 |
| 10 | *Actinobaculum_sp_oral_taxon_183* | 1 | 1 | 1 | 1 | 0 | 0 |
| 11 | *Bifidobacterium_pseudocatenulatum* | 1 | 1 | 0 | 1 | 0 | 0 |
| 12 | *Clostridium_leptum* | 1 | 1 | 0 | 1 | 0 | 0 |
| 13 | *Collinsella_aerofaciens* | 1 | 1 | 0 | 1 | 0 | 0 |
| 14 | *Lactobacillus_salivarius* | 1 | 1 | 0 | 0 | 0 | 0 |
| 15 | *Actinomyces_oris* | 1 | 0 | 1 | 1 | 1 | 1 |
| 16 | *Actinomyces_sp_oral_taxon_414* | 1 | 0 | 1 | 1 | 1 | 1 |
| 17 | *Anaerostipes_hadrus* | 1 | 0 | 1 | 1 | 1 | 1 |
| 18 | *Bifidobacterium_dentium* | 1 | 0 | 1 | 1 | 1 | 1 |
| 19 | *Dialister_sp_CAG_357* | 1 | 0 | 1 | 1 | 1 | 1 |
| 20 | *Eubacterium_rectale* | 1 | 0 | 1 | 1 | 1 | 1 |
| 21 | *Eubacterium_ventriosum* | 1 | 0 | 1 | 1 | 1 | 1 |
| 22 | *Olsenella_uli* | 1 | 0 | 1 | 1 | 1 | 1 |
| 23 | *Streptococcus_anginosus_group* | 1 | 0 | 1 | 1 | 1 | 1 |
| 24 | *Actinomyces_sp_oral_taxon_448* | 1 | 0 | 1 | 1 | 1 | 0 |
| 25 | *Eubacterium_sp_CAG_274* | 1 | 0 | 1 | 1 | 1 | 0 |
| 26 | *Rothia_mucilaginosa* | 1 | 0 | 1 | 1 | 1 | 0 |
| 27 | *Streptococcus_infantis* | 1 | 0 | 1 | 1 | 1 | 0 |
| 28 | *Streptococcus_vestibularis* | 1 | 0 | 1 | 1 | 1 | 0 |
| 29 | *Actinomyces_massiliensis* | 1 | 0 | 1 | 1 | 0 | 0 |
| 30 | *Corynebacterium_durum* | 1 | 0 | 1 | 1 | 0 | 0 |
| 31 | *Firmicutes_bacterium_CAG_83* | 1 | 0 | 1 | 1 | 0 | 0 |
| 32 | *Ruthenibacterium_lactatiformans* | 1 | 0 | 1 | 1 | 0 | 0 |
| 33 | *Streptococcus_gordonii* | 1 | 0 | 1 | 1 | 0 | 0 |
| 34 | *Coprococcus_comes* | 1 | 0 | 1 | 0 | 0 | 0 |
| 35 | *Faecalicoccus_pleomorphus* | 1 | 0 | 0 | 1 | 1 | 1 |
| 36 | *Alistipes_putredinis* | 1 | 0 | 0 | 1 | 1 | 0 |
| 37 | *Actinomyces_sp_oral_taxon_897* | 1 | 0 | 0 | 1 | 0 | 0 |
| 38 | *Propionibacterium_acidifaciens* | 1 | 0 | 0 | 1 | 0 | 0 |
| 39 | *Dorea_formicigenerans* | 1 | 0 | 0 | 0 | 1 | 1 |
| 40 | *Lactobacillus_mucosae* | 1 | 0 | 0 | 0 | 1 | 0 |
| 41 | *Anaerostipes_caccae* | 1 | 0 | 0 | 0 | 0 | 0 |
| 42 | *Eubacterium_hallii* | 1 | 0 | 0 | 0 | 0 | 0 |
| 43 | *Fusicatenibacter_saccharivorans* | 1 | 0 | 0 | 0 | 0 | 0 |
| 44 | *Megasphaera_micronuciformis* | 1 | 0 | 0 | 0 | 0 | 0 |
| 45 | *Streptococcus_parasanguinis* | 1 | 0 | 0 | 0 | 0 | 0 |
| 46 | *Adlercreutzia_equolifaciens* | 0 | 1 | 1 | 1 | 1 | 0 |
| 47 | *Clostridium_innocuum* | 0 | 1 | 1 | 0 | 1 | 1 |
| 48 | *Asaccharobacter_celatus* | 0 | 1 | 1 | 0 | 1 | 0 |
| 49 | *Ruminococcus_gnavus* | 0 | 1 | 1 | 0 | 1 | 0 |
| 50 | *Eisenbergiella_tayi* | 0 | 1 | 0 | 0 | 1 | 1 |
| 51 | *Eubacterium_limosum* | 0 | 1 | 0 | 0 | 1 | 1 |
| 52 | *Blautia_sp_CAG_257* | 0 | 1 | 0 | 0 | 0 | 0 |
| 53 | *Ruminococcus_torques* | 0 | 1 | 0 | 0 | 0 | 0 |
| 54 | *Blautia_producta* | 0 | 0 | 1 | 1 | 1 | 0 |
| 55 | *Streptococcus_mutans* | 0 | 0 | 1 | 1 | 1 | 0 |
| 56 | *Actinomyces_sp_ICM47* | 0 | 0 | 1 | 1 | 0 | 0 |
| 57 | *Clostridium_disporicum* | 0 | 0 | 1 | 1 | 0 | 0 |
| 58 | *Clostridium_bolteae* | 0 | 0 | 1 | 0 | 1 | 1 |
| 59 | *Bacteroides_massiliensis* | 0 | 0 | 1 | 0 | 0 | 0 |
| 60 | *Bacteroides_vulgatus* | 0 | 0 | 1 | 0 | 0 | 0 |

TABLE 16-continued

Associations between different subgroups of PACS and gut microbiota composition at 6 months follow up using MaAsLin analysis.

| no | species | Fatigue | Gastrointestinal | Neurological | Respiratory | Musculoskeletal | HairLoss |
|---|---|---|---|---|---|---|---|
| 61 | Barnesiella_intestinihominis | 0 | 0 | 1 | 0 | 0 | 0 |
| 62 | Eubacterium_ramulus | 0 | 0 | 1 | 0 | 0 | 0 |
| 63 | Lactococcus_petauri | 0 | 0 | 1 | 0 | 0 | 0 |
| 64 | Romboutsia_ilealis | 0 | 0 | 1 | 0 | 0 | 0 |
| 65 | Ruminococcus_bicirculans | 0 | 0 | 1 | 0 | 0 | 0 |
| 66 | Actinomyces_graevenitzii | 0 | 0 | 0 | 1 | 0 | 0 |
| 67 | Pseudopropionibacterium_propionicum | 0 | 0 | 0 | 1 | 0 | 0 |
| 68 | Streptococcus_cristatus | 0 | 0 | 0 | 1 | 0 | 0 |
| 69 | Veillonella_parvula | 0 | 0 | 0 | 1 | 0 | 0 |
| 70 | Hungatella_hathewayi | 0 | 0 | 0 | 0 | 1 | 1 |
| 71 | Roseburia_inulinivorans | 0 | 0 | 0 | 0 | 1 | 1 |
| 72 | Ruminococcus_lactaris | 0 | 0 | 0 | 0 | 1 | 1 |
| 73 | Bacteroides_thetaiotaomicron | 0 | 0 | 0 | 0 | 1 | 0 |
| 74 | Eubacterium_callanderi | 0 | 0 | 0 | 0 | 1 | 0 |
| 75 | Haemophilus_parainfluenzae | 0 | 0 | 0 | 0 | 1 | 0 |
| 76 | Eisenbergiella_massiliensis | 0 | 0 | 0 | 0 | 0 | 1 |
| 77 | Faecalitalea_cylindroides | 0 | 0 | 0 | 0 | 0 | 1 |
| 78 | Firmicutes_bacterium_CAG_94 | 0 | 0 | 0 | 0 | 0 | 1 |
| 79 | Lactonifactor_longoviformis | 0 | 0 | 0 | 0 | 0 | 1 |
| 80 | Massiliomicrobiota_timonensis | 0 | 0 | 0 | 0 | 0 | 1 |
| 81 | Pseudoflavonifractor_sp_An184 | 0 | 0 | 0 | 0 | 0 | 1 |

1 = significantly associated
0 = not significantly associated

TABLE 17

Bacteria species positively correlated with different post-COVID sequelaes ($P < 0.05$, from linear mixed models in MaAsLin).

| Symptoms | Number of patients affected | Bacteria species positively correlated with PACS ($P < 0.05$) |
|---|---|---|
| Respiratory symptoms | | |
| Cough | 9 | Actinomyces_naeslundii |
| Sputum | 13 | Intestinibacter_bartlettii |
| Nasal congestion/runny nose | 15 | Actinomyces_oris |
|  |  | Actinomyces_sp_ICM47 |
| Shortness of breath | 18 | Actinomyces_odontolyticus |
|  |  | Streptococcus_anginosus_group |
|  |  | Streptococcus_vestibularis |
|  |  | Streptococcus_gordonii |
|  |  | Rothia_mucilaginosa |
|  |  | Clostridium_disporicum |
|  |  | Actinobaculum_sp_oral_taxon_183 |
|  |  | Erysipelatoclostridium_ramosum |
|  |  | Veillonella_parvula |
|  |  | Streptococcus_mutans |
|  |  | Streptococcus_infantis |
|  |  | Lactobacillus_mucosae |
|  |  | Bifidobacterium_dentium |
|  |  | Actinomyces_graevenitzii |
|  |  | Olsenella_uli |
|  |  | Faecalicoccus_pleomorphus |
|  |  | Blautia_producta |
|  |  | Propionibacterium_acidifaciens |
|  |  | Actinomyces_sp_oral_taxon_448 |
|  |  | Pseudopropionibacterium_propionicum |
|  |  | Actinomyces_massiliensis |
|  |  | Actinomyces_sp_oral_taxon_897 |
|  |  | Streptococcus_cristatus |
|  |  | Actinomyces_sp_oral_taxon_414 |
|  |  | Corynebacterium_durum |
| Gastrointestinal symptoms | | |
| Nausea | 3 | Ruminococcus_gnavus |
| Diarrhoea | 5 | Actinomyces_naeslundii |
| Epi pain | 6 | Clostridium_innocuum |
| Abdomanial pain | 3 | Blautia_sp_CAG_257 |
|  |  | Intestinibacter_bartlettii |
|  |  | Eubacterium_limosum |
|  |  | Actinomyces_odontolyticus |
|  |  | Actinobaculum_sp_oral_taxon_183 |
|  |  | Lactobacillus_salivarius |
|  |  | Eisenbergiella_tayi |
|  |  | Erysipelatoclostridium_ramosum |
| Neuropsychiatric symptoms | | |
| Headache | 12 | Erysipelatoclostridium_ramosum |
| Dizziness | 9 | Ruminococcus_gnavus |
| Loss of taste | 5 | Clostridium_innocuum |
| Loss of smell | 9 | Actinomyces_sp_ICM47 |
| Difficulty in concentration | 15 | Intestinibacter_bartlettii |
|  |  | Actinomyces_naeslundii |
| Difficulty in sleeping | 22 | Actinomyces_oris |
|  |  | Bacteroides_vulgatus |
| Anxiety | 22 | Actinomyces_odontolyticus |
| Sadness | 15 | Clostridium_bolteae |
| Poor memory | 30 | Streptococcus_mutans |
| Blurred vision | 19 | Streptococcus_anginosus_group |
|  |  | Rothia_mucilaginosa |
|  |  | Streptococcus_gordonii |
|  |  | Bacteroides_massiliensis |
|  |  | Streptococcus_vestibularis |
|  |  | Bifidobacterium_dentium |
|  |  | Actinobaculum_sp_oral_taxon_183 |
|  |  | Streptococcus_infantis |
|  |  | Clostridium_disporicum |
|  |  | Blautia_producta |
|  |  | Romboutsia_ilealis |
|  |  | Actinomyces_sp_oral_taxon_448 |
|  |  | Actinomyces_sp_oral_taxon_414 |
|  |  | Olsenella_uli |
|  |  | Corynebacterium_durum |
|  |  | Actinomyces_massiliensis |
| Dermatological symptoms | | |
| Hair loss | 23 | Intestinibacter_bartlettii |
|  |  | Clostridium_innocuum |
|  |  | Streptococcus_anginosus_group |

TABLE 17-continued

Bacteria species positively correlated with different post-COVID sequelaes (P < 0.05, from linear mixed models in MaAsLin).

| Symptoms | Number of patients affected | Bacteria species positively correlated with PACS (P < 0.05) |
|---|---|---|
| | | Eisenbergiella_massiliensis |
| | | Hungatella_hathewayi |
| | | Faecalitalea_cylindroides |
| | | Eubacterium_limosum |
| | | Bifidobacterium_dentium |
| | | Clostridium_bolteae |
| | | Pseudoflavonifractor_sp_An184 |
| | | Faecalicoccus_pleomorphus |
| | | Actinomyces_odontolyticus |
| | | Actinomyces_oris |
| | | Eisenbergiella_tayi |
| | | Lactonifactor_longoviformis |
| | | Firmicutes_bacterium_CAG_94 |
| | | Olsenella_uli |
| | | Massiliomicrobiota_timonensis |
| | | Actinomyces_sp_oral_taxon_414 |
| Musculoskeletal symptoms | | |
| Joint pain | 11 | Intestinibacter_bartlettii |
| Muscle pain | 16 | Hungatella_hathewayi |
| | | Streptococcus_anginosus_group |
| | | Clostridium_innocuum |
| | | Eubacterium_limosum |
| | | Actinomyces_oris |
| | | Ruminococcus_gnavus |
| | | Clostridium_bolteae |
| | | Bifidobacterium_dentium |
| | | Erysipelatoclostridium_ramosum |
| | | Bacteroides_thetaiotaomicron |
| | | Actinomyces_odontolyticus |
| | | Streptococcus_mutans |
| | | Streptococcus_vestibularis |
| | | Eisenbergiella_tayi |
| | | Haemophilus_parainfluenzae |
| | | Eubacterium_callanderi |
| Fatigue | 32 | Streptococcus_infantis |
| | | Actinomyces_naeslundii |
| | | Blautia_producta |
| | | Olsenella_uli |
| | | Actinomyces_sp_oral_taxon_448 |
| | | Rothia_mucilaginosa |
| | | Faecalicoccus_pleomorphus |
| | | Lactobacillus_mucosae |
| | | Actinomyces_sp_oral_taxon_414 |
| | | Actinomyces_naeslundii |
| | | Clostridium_innocuum |
| | | Actinomyces_oris |
| | | Intestinibacter_bartlettii |
| | | Actinomyces_odontolyticus |
| | | Streptococcus_parasanguinis |
| | | Bifidobacterium_dentium |
| | | Erysipelatoclostridium_ramosum |
| | | Streptococcus_anginosus_group |
| | | Megasphaera_micronuciformis |
| | | Rothia_mucilaginosa |
| | | Streptococcus_vestibularis |
| | | Anaerostipes_caccae |
| | | Streptococcus_gordonii |
| | | Actinobaculum_sp_oral_taxon_183 |
| | | Lactobacillus_mucosae |
| | | Propionibacterium_acidifaciens |
| | | Actinomyces_sp_oral_taxon_448 |
| | | Olsenella_uli |
| | | Streptococcus_infantis |
| | | Actinomyces_sp_oral_taxon_414 |
| | | Faecalicoccus_pleomorphus |
| | | Actinomyces_sp_oral_taxon_897 |
| | | Lactobacillus_salivarius |
| | | Actinomyces_massiliensis |
| | | Corynebacterium_durum |

TABLE 18

Baseline Bacteria species associated with post-acute COVID-19 syndrome at month 6

| Species# | Phylum | Mean relative abundance (%) | Association cohort |
|---|---|---|---|
| Bifidobacterium_longum | Actinobacteria | 5.00 | No Symptoms |
| Bifidobacterium_pseudocatenulatum | Actinobacteria | 4.68 | No Symptoms |
| Blautia_wexlerae | Firmicutes | 4.67 | No Symptoms |
| Faecalibacterium_prausnitzii | Firmicutes | 4.51 | No Symptoms |
| Fusicatenibacter_saccharivorans | Firmicutes | 4.43 | No Symptoms |
| Anaerostipes_hadrus | Firmicutes | 4.30 | No Symptoms |
| Eubacterium_hallii | Firmicutes | 4.29 | No Symptoms |
| Roseburia_inulinivorans | Firmicutes | 4.16 | No Symptoms |
| Dorea_longicatena | Firmicutes | 4.13 | No Symptoms |
| Coprococcus_comes | Firmicutes | 3.94 | No Symptoms |
| Firmicutes_bacterium_CAG_83 | Firmicutes | 3.94 | No Symptoms |
| Streptococcus_salivarius | Firmicutes | 3.85 | No Symptoms |
| Agathobaculum_butyriciproducens | Firmicutes | 3.82 | No Symptoms |
| Roseburia_faecis | Firmicutes | 3.76 | No Symptoms |
| Sellimonas_intestinalis | Firmicutes | 3.44 | No Symptoms |
| Eubacterium_ramulus | Firmicutes | 3.19 | No Symptoms |
| Clostridium_disporicum | Firmicutes | 2.50 | No Symptoms |
| Actinomyces_naeslundii | Firmicutes | 2.28 | No Symptoms |
| Holdemania_filiformis | Firmicutes | 2.05 | No Symptoms |
| Phascolarctobacterium_faecium | Firmicutes | 3.77 | PACS# |

*Mean relative abundance >1% in either cohort
PACS: Post-acute COVID-19 syndrome
Ordered by logarithmic discriminant analysis score reported by linear discriminant analysis effect size

TABLE 19

Questionnaire used for symptom assessment

| Symptoms | Month 3 | Month 6 |
| --- | --- | --- |
| Fever | | |
| Chills | | |
| Cough | | |
| Sputum Production | | |
| Sore throat | | |
| Congested or runny nose | | |
| Fatigue | | |
| Joint pain | | |
| Muscle pain | | |
| Shortness of breath | | |
| Headache | | |
| Dizziness | | |
| Nausea | | |
| Vomiting | | |
| Diarrhoea | | |
| Loss of taste | | |
| Loss of smell | | |
| Abdominal pain | | |
| Epigastric pain | | |
| Difficulty in concentration | | |
| Inability to exercise | | |
| Difficulty in sleeping | | |
| Anxiety | | |
| Sadness | | |
| Memory problem | | |
| Chest pain | | |
| Palpitations | | |
| Night sweats | | |
| Hair loss | | |
| Blurred vision | | |
| Any other symptoms | | |

What is claimed is:

1. A method for treating post-acute COVID-19 syndrome (PACS) in a subject who has been diagnosed with COVID-19, comprising administering to the subject a composition comprising an effective amount of *Bifidobacterium pseudocatenulatum* and not comprising *Lactobacillus acidophilus*, *Lactobacillus plantarum*, or *Bifidobacterium animalis*.

2. The method of claim 1, wherein the administering step further comprises administering to the subject an effective amount of *Bifidobacterium longum*.

3. The method of claim 2, wherein the administering step comprises administering to the subject two or more compositions, each comprising one or more of *Bifidobacterium pseudocatenulatum* and *Bifidobacterium longum* and not comprising *Lactobacillus acidophilus*, *Lactobacillus plantarum*, or *Bifidobacterium animalis*.

4. The method of claim 2, wherein the administering step comprises oral ingestion of one or more compositions comprising *Bifidobacterium pseudocatenulatum* and *Bifidobacterium longum* and not comprising *Lactobacillus acidophilus*, *Lactobacillus plantarum*, or *Bifidobacterium animalis*.

5. The method of claim 1, further comprising administering to the subject *Bifidobacterium adolescentis*.

6. The method of claim 2, comprising administering to the subject a total of about $10^6$ to about $10^{12}$ colony-forming unit (CFU) of *Bifidobacterium pseudocatenulatum* and *Bifidobacterium longum*.

7. The method of claim 1, wherein the composition does not comprise any bacterial species selected from the group consisting of *Lachnospira pectinoschiza*, *Scardovia wiggsiae*, *Oscillibacter* sp. CAG:241, *Streptococcus vestibularis*, *Lactococcus garvieae*, *Erysipelatoclostridium ramosum*, *Stomatobaculum longum*, *Staphylococcus epidermidis*, *Holdemaniafiliformis*, Lachnospiraceae bacterium 2_1_46FAA, *Clostridium innocuum*, *Parascardovia denticolens*, *Clostridium bolteae* CAG_59, *Fusobacterium varium*, *Clostridium bolteae*, *Scardovia inopinata*, *Bacteroides caccae*, *Rothia mucilaginosa*, *Streptococcus mutans*, *Ruminococcus gnavus*, *Actinomyces graevenitzii*, *Parabacteroides distasonis*, *Bacteroides vulgatus*, *Anaeromassilibacillus* sp. An250, *Massiliomicrobiota timonensis*, *Lactobacillus acidophilus*, *Peptostreptococcus anaerobius*, *Butyrivibrio* sp. CAG:318, *Lactobacillus plantarum*, *Megamonas rupellensis*, *Lactobacillus johnsonii*, *Bifidobacterium animalis*, *Morganella morganii*, Lachnospiraceae bacterium oral taxon 096, *Lactobacillus delbrueckii*, *Blautia producta*, *Turicimonas muris*, Clostridiales bacterium 1_7_47F AA, *Bacteroides thetaiotaomicron*, *Bacteroides* sp. CAG:144, *Streptococcus lutetiensis*, *Butyricicoccus pullicaecorum*, *Blautia coccoides*, *Anaerotignum lactatifermentans*, *Megasphaera micronuciformis*, *Bacteroides xylanisolvens*, *Clostridium clostridioforme*, *Pediococcus acidilactici*, *Enterococcus casseliflavus*, *Intestinibacter bartlettii*, *Flavonifractor plautii*, *Actinomyces johnsonii*, and *Atopobium parvulum*.

8. The method of claim 1, further comprising administering to the subject an effective amount of one or more of *Blautia wexlerae*, *Faecalibacterium prausnitzii*, and *Fusicatenibacter saccharivorans*.

9. The method of claim 1, further comprising administering to the subject an effective amount of:
(i) *Agathobaculum butyriciproducens*, *Roseburia hominis*, *Anaerostipes hadrus*, *Dialister* sp. CAG:357, and *Eubacterium rectale*;
(ii) *Agathobaculum butyriciproducens*, *Roseburia hominis*, and *Asaccharobacter celatus*;
(iii) *Agathobaculum butyriciproducens*, *Roseburia hominis*, *Anaerostipes hadrus*, and *Coprococcus comes*;
(iv) *Agathobaculum butyriciproducens*, *Roseburia hominis*, *Anaerostipes hadrus*, and *Alistipes putredinis*;
(v) *Agathobaculum butyriciproducens*, *Anaerostipes hadrus*, *Eubacterium* sp. CAG:274, and *Dorea formicigenerans*; or
(vi) *Agathobaculum butyriciproducens*, *Roseburia hominis*, *Eubacterium rectale*, *Gemmiger formicilis*, *Eubacterium ventriosum*, and *Dorea formicigenerans*.

10. The method of claim 1, further comprising administering to the subject an effective amount of one or more different butyrate-producing bacterial species of *Roseburia inulinivorans*, *Faecalibacterium prausnitzii*, and *Roseburia hominis*.

11. The method of claim 1, wherein the subject is administered a composition comprising (1) an effective amount of *Bifidobacterium pseudocatenulatum* and *Bifidobacterium longum* and not comprising *Lactobacillus acidophilus*, *Lactobacillus plantarum*, or *Bifidobacterium animalis*; and (2) one or more physiologically acceptable excipients.

12. The method of claim 4, wherein each of the composition(s) is in the form of a food or beverage item.

13. The method of claim 1, wherein the administering comprises direct deposit of the composition to the subject's gastrointestinal tract.

14. The method of claim 3, wherein the subject is administered two or more compositions, each comprising (1) an effective amount of one or more of *Bifidobacterium pseudocatenulatum* and *Bifidobacterium longum* and not comprising *Lactobacillus acidophilus*, *Lactobacillus plantarum*, or *Bifidobacterium animalis*; and (2) one or more physiologically acceptable excipients.

15. The method of claim 2, wherein the subject is administered the composition by oral ingestion.

16. The method of claim 15, wherein the composition is in the form of a food or beverage item.

17. The method of claim 1, wherein the subject is administered a composition comprising (1) an effective amount of *Bifidobacterium pseudocatenulatum*, *Bifidobacterium longum*, and *Blautia wexlerae* and not comprising *Lactobacillus acidophilus*, *Lactobacillus plantarum*, or *Bifidobacterium animalis*; and (2) one or more physiologically acceptable excipients.

\* \* \* \* \*